(12) United States Patent
Betz et al.

(10) Patent No.: US 11,691,599 B2
(45) Date of Patent: Jul. 4, 2023

(54) LEANING CONTROL SCHEME FOR A FIRE APPARATUS

(71) Applicant: Oshkosh Corporation, Oshkosh, WI (US)

(72) Inventors: Eric D. Betz, Clintonville, WI (US); David W. Archer, Hortonville, WI (US)

(73) Assignee: Oshkosh Corporation, Oshkosh, WI (US)

( * ) Notice: Subject to any disclaimer, the term of this patent is extended or adjusted under 35 U.S.C. 154(b) by 89 days.

(21) Appl. No.: 17/491,898

(22) Filed: Oct. 1, 2021

(65) Prior Publication Data

US 2022/0017048 A1 Jan. 20, 2022

Related U.S. Application Data

(63) Continuation of application No. 16/725,729, filed on Dec. 23, 2019, now Pat. No. 11,161,483, which is a
(Continued)

(51) Int. Cl.
*B60S 9/02* (2006.01)
*E06C 5/04* (2006.01)
(Continued)

(52) U.S. Cl.
CPC ........... *B60S 9/02* (2013.01); *A62C 27/00* (2013.01); *E06C 5/04* (2013.01); *B60S 9/04* (2013.01); *B60S 9/10* (2013.01)

(58) Field of Classification Search
CPC ... A62C 27/00; B60S 9/02; B60S 9/04; B60S 9/10; B66C 23/78; B66C 23/90; B66F 17/006; E06C 5/04; E06C 5/16; E06C 5/38; E06C 5/42; E06C 5/18; E06C 5/36; E06C 5/40
(Continued)

(56) References Cited

U.S. PATENT DOCUMENTS 2,086,255 A  7/1937  Cashier
4,834,215 A *  5/1989  Smeal ........................ E06C 5/40
                                                            182/127
(Continued)

OTHER PUBLICATIONS

Avsec, Robert. Support Systems: Stabilizing aerials, Nov. 25, 2013, FireRescue1, https://www.firerescue1.com/fire-products/fire-apparatus/articles/1616289-Support-systems-Stabilizing-aerial, 4 pages (Year: 2013).
(Continued)

*Primary Examiner* — Kevin Hurley
*Assistant Examiner* — Felicia L. Brittman
(74) *Attorney, Agent, or Firm* — Foley & Lardner LLP

(57) ABSTRACT

A fire apparatus includes a chassis, a front axle coupled to the chassis, a rear axle coupled to the chassis, a ladder assembly coupled to the chassis, and a stability system. The stability system includes at least one of (i) a front downrigger coupled to the chassis, (ii) a rear downrigger coupled the chassis, or an outrigger coupled to the chassis. The stability system is controllable to facilitate leaning the fire apparatus at least two degrees relative to a ground surface while maintaining full operational capability of the ladder assembly.

20 Claims, 42 Drawing Sheets

Related U.S. Application Data continuation of application No. 16/389,653, filed on Apr. 19, 2019, now Pat. No. 10,532,722.

(60) Provisional application No. 62/661,420, filed on Apr. 23, 2018.

(51) Int. Cl.
  *A62C 27/00* (2006.01)
  *B60S 9/04* (2006.01)
  *B60S 9/10* (2006.01)

(58) Field of Classification Search
  USPC .......................................... 280/765.1; 182/19
  See application file for complete search history.

(56) References Cited

U.S. PATENT DOCUMENTS

| | | | |
|---|---|---|---|
| 5,538,274 A | 7/1996 | Schmitz et al. | |
| 5,713,424 A | 2/1998 | Christenson | |
| 5,820,150 A | 10/1998 | Archer et al. | |
| 5,897,123 A | 4/1999 | Cherney et al. | |
| 6,086,074 A | 7/2000 | Braun | |
| 6,123,347 A | 9/2000 | Christenson | |
| 6,138,845 A | 10/2000 | Kaspar | |
| 6,561,718 B1 | 5/2003 | Archer et al. | |
| 6,811,161 B1 | 11/2004 | Anderson | |
| 6,860,332 B1 | 3/2005 | Archer et al. | |
| 6,883,815 B2 | 4/2005 | Archer | |
| 7,006,902 B2 | 2/2006 | Archer et al. | |
| 7,055,880 B2 | 6/2006 | Archer | |
| 7,387,348 B2 | 6/2008 | Archer et al. | |
| 7,683,564 B2 * | 3/2010 | Harris .................... | B66C 23/80 318/565 |
| 9,302,129 B1 | 4/2016 | Betz et al. | |
| 9,492,695 B2 | 11/2016 | Betz et al. | |
| 9,579,530 B2 | 2/2017 | Betz et al. | |
| 9,580,960 B2 | 2/2017 | Aiken et al. | |
| 9,580,962 B2 | 2/2017 | Betz et al. | |
| 9,677,334 B2 | 6/2017 | Aiken et al. | |
| 9,981,803 B2 | 5/2018 | Davis et al. | |
| 10,196,205 B2 | 2/2019 | Betz et al. | |
| 2002/0014364 A1 | 2/2002 | Bartlett | |
| 2004/0245039 A1 | 12/2004 | Braun et al. | |
| 2005/0001400 A1 | 1/2005 | Archer et al. | |
| 2005/0236824 A1 * | 10/2005 | Wissler .................... | B60S 9/10 280/765.1 |
| 2005/0253344 A1 | 11/2005 | Trinkner et al. | |
| 2006/0021764 A1 | 2/2006 | Archer et al. | |
| 2006/0249325 A1 | 11/2006 | Braun et al. | |
| 2014/0246265 A1 | 9/2014 | Archer et al. | |
| 2016/0144211 A1 | 5/2016 | Betz et al. | |
| 2016/0145941 A1 | 5/2016 | Betz et al. | |
| 2016/0304051 A1 | 10/2016 | Archer et al. | |
| 2018/0026289 A1 | 1/2018 | Finnerty et al. | |
| 2018/0215597 A1 | 8/2018 | Linsmeier et al. | |
| 2018/0297597 A1 | 10/2018 | Linsmeier et al. | |
| 2019/0106083 A1 | 4/2019 | Archer et al. | |
| 2019/0161272 A1 | 5/2019 | Betz et al. | |

OTHER PUBLICATIONS

Command Fire Apparatus, 1984 75' Mack Aerialscope Tower Ladder—Refurbish Opportunity, commandfireapparatus.com/listing/1984-75-aerialscope-tower-ladder/.
Commandfireapparatus.com/listing/1984-75-aerialscope-tower-ladder/,2016, Command Fire Apparatus, pp. 1-6 (Year: 2016).

* cited by examiner

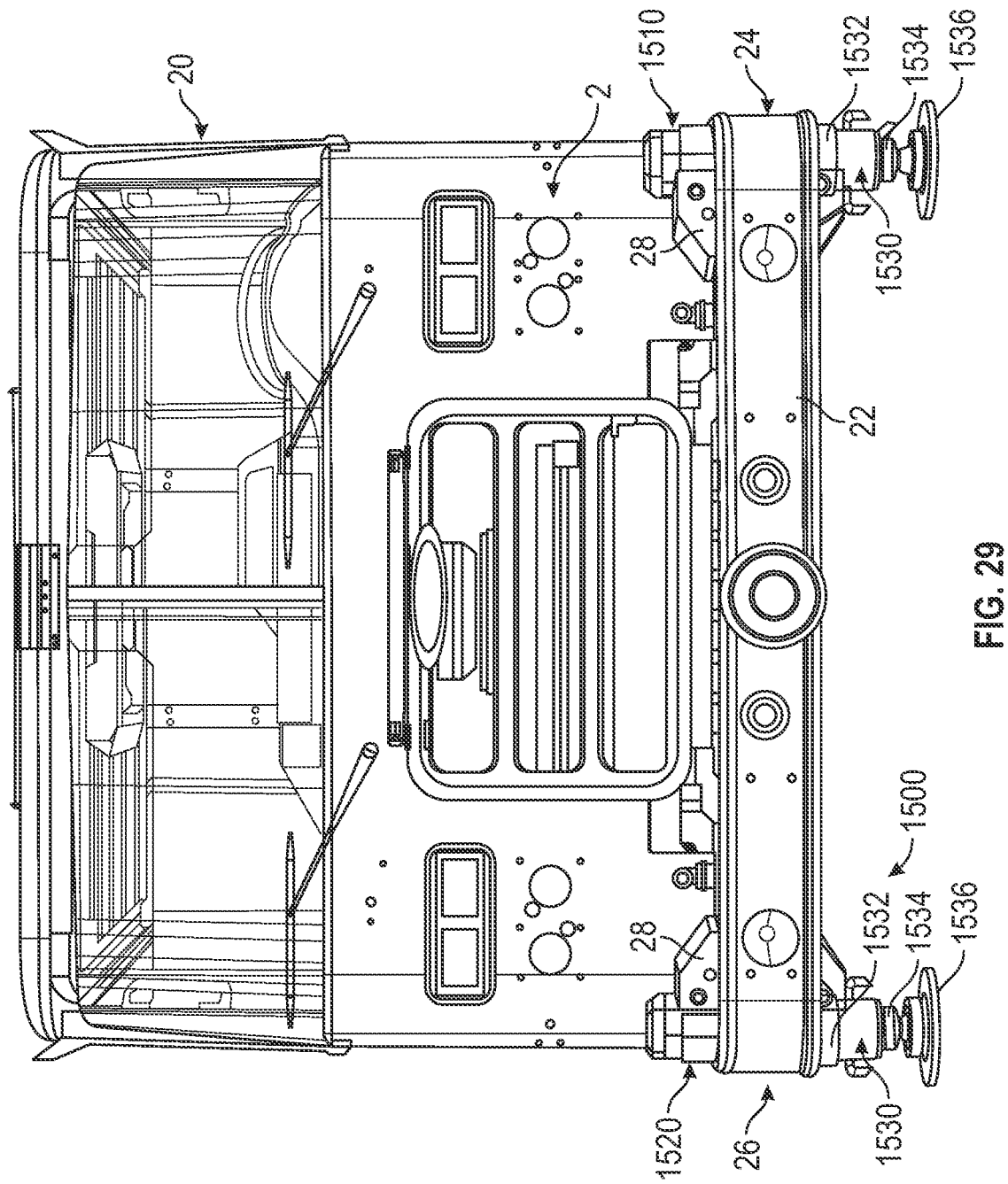

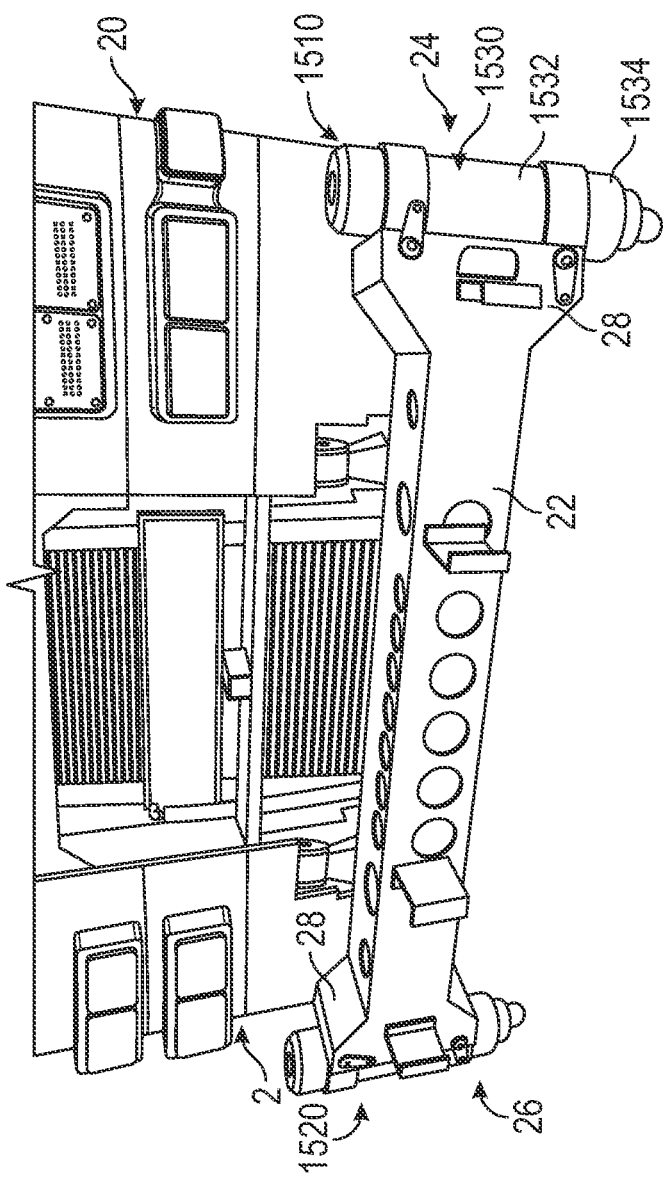
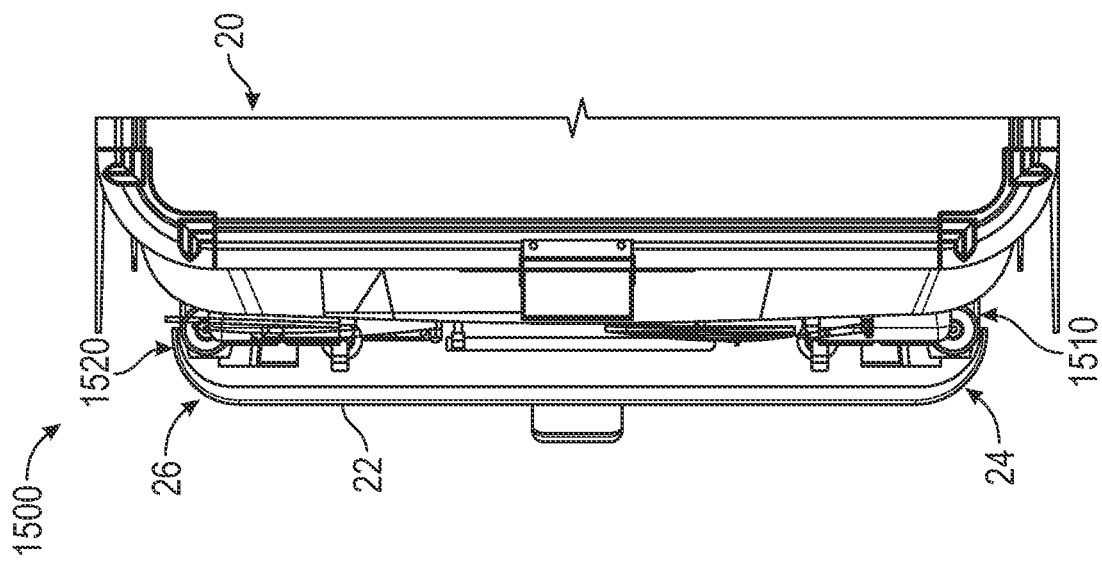
FIG. 31
FIG. 30

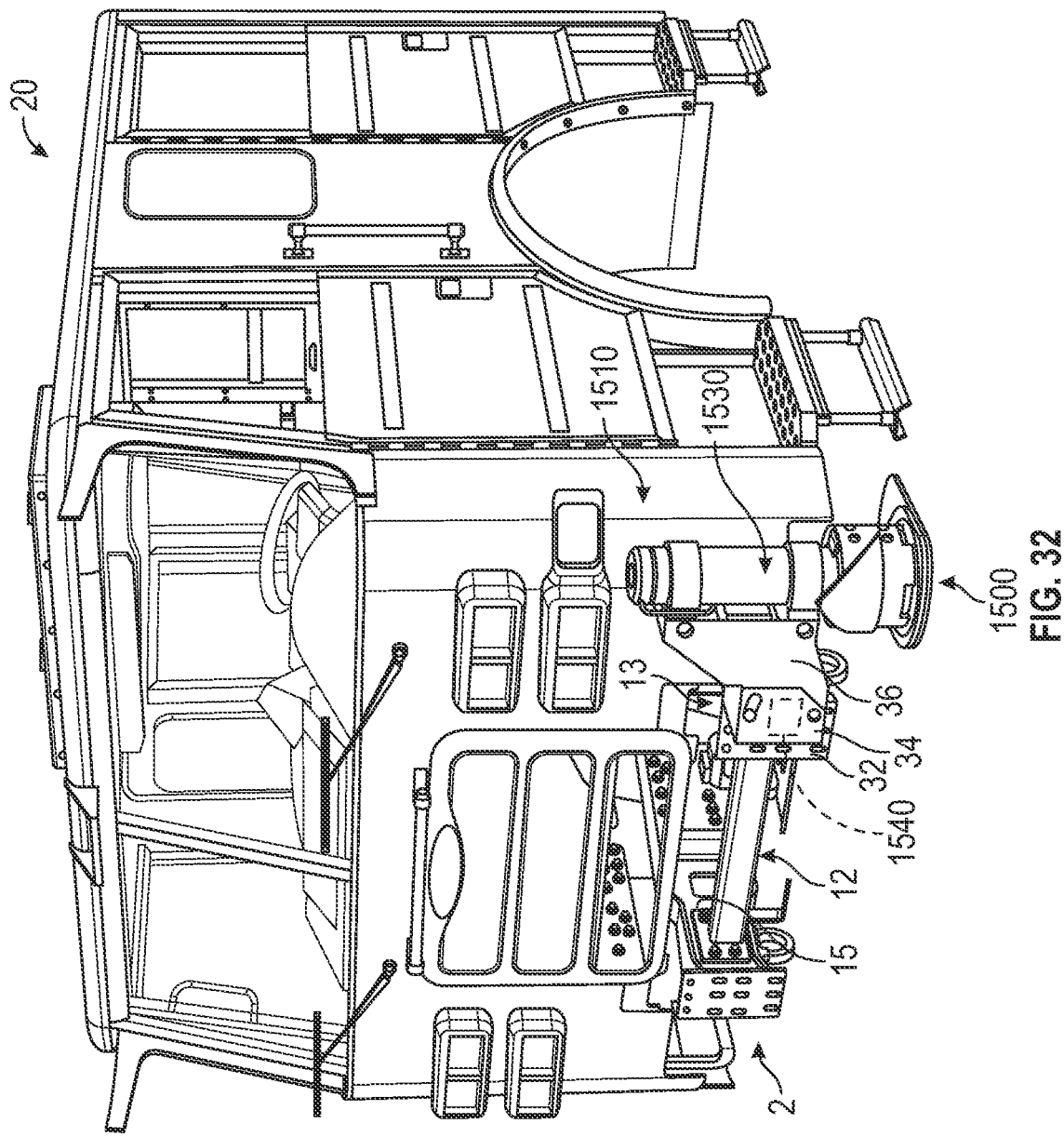

LEANING CONTROL SCHEME FOR A FIRE APPARATUS

CROSS-REFERENCE TO RELATED PATENT APPLICATIONS

This application is a continuation of U.S. patent application Ser. No. 16/725,729, filed Dec. 23, 2019, which is a continuation of U.S. patent application Ser. No. 16/389,653, filed Apr. 19, 2019, which (a) claims the benefit of U.S. Provisional Patent Application No. 62/661,420, filed Apr. 23, 2018, and (b) is related to (i) U.S. patent application Ser. No. 16/389,630, filed Apr. 19, 2019, which claims the benefit of U.S. Provisional Patent Application No. 62/661,382, filed Apr. 23, 2018, (ii) U.S. patent application Ser. No. 16/389,570, filed Apr. 19, 2019, which claims the benefit of U.S. Provisional Patent Application No. 62/661,384, filed Apr. 23, 2018, (iii) U.S. patent application Ser. No. 16/389,600, filed Apr. 19, 2019, which claims the benefit of U.S. Provisional Patent Application No. 62/661,414, filed Apr. 23, 2018, (iv) U.S. patent application Ser. No. 16/389,143, filed Apr. 19, 2019, which claims the benefit of U.S. Provisional Patent Application No. 62/661,419, filed Apr. 23, 2018, (v) U.S. patent application Ser. No. 16/389,176, filed Apr. 19, 2019, which claims the benefit of U.S. Provisional Patent Application No. 62/661,426, filed Apr. 23, 2018, (vi) U.S. patent application Ser. No. 16/389,029, filed Apr. 19, 2019, which claims the benefit of U.S. Provisional Patent Application No. 62/661,335, filed Apr. 23, 2018, and U.S. Provisional Patent Application No. 62/829,922, filed Apr. 5, 2019, and (vii) U.S. patent application Ser. No. 16/389,072, filed Apr. 19, 2019, which claims the benefit of U.S. Provisional Patent Application No. 62/661,330, filed Apr. 23, 2018, all of which are incorporated herein by reference in their entireties.

BACKGROUND

Fire apparatuses may be configured as rear-mount aerial fire apparatuses or mid-mount aerial fire apparatuses. Further, such fire apparatuses may be configured as quint configuration fire apparatuses including an aerial ladder, a water tank, a water pump, ground ladder storage, and hose storage. Typically, such fire apparatuses may also include outriggers and/or downriggers. However, such outriggers and downriggers are typically used for manually leveling the fire apparatuses only.

SUMMARY

One embodiment relates to a fire apparatus. The fire apparatus includes a chassis, a front axle coupled to the chassis, a rear axle coupled to the chassis, a ladder assembly coupled to the chassis, and a stability system. The stability system includes at least one of (i) a front downrigger coupled to the chassis, (ii) a rear downrigger coupled the chassis, or an outrigger coupled to the chassis. The stability system is controllable to facilitate leaning the fire apparatus at least two degrees relative to a ground surface while maintaining full operational capability of the ladder assembly.

Another embodiment relates to a vehicle. The vehicle includes a chassis, a ladder assembly coupled to the chassis, a stability system coupled to the chassis, and a control system. The stability system includes extendable components that selectively engage a ground surface. The control system is configured to control the stability system to level the vehicle and enable the stability system to lean the vehicle when an operational capability of the ladder assembly is at a limit thereof while the vehicle is level to effectively improve the operational capability relative to when the vehicle is level.

Still another embodiment relates to a vehicle. The vehicle includes a chassis, a ladder coupled to the chassis, and a stability system coupled to the chassis. The stability system includes a plurality of front downriggers, a plurality of rear downriggers, and a plurality of outriggers. The stability system is controllable to facilitate leaning the fire apparatus at least two degrees relative to a ground surface to effectively improve an operational capability of the ladder.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 29 is a front view of the front downrigger assembly of FIG. 28, according to an exemplary embodiment.

FIG. 30 is a top view of the front downrigger assembly of FIG. 28, according to an exemplary embodiment.

FIG. 31 is a perspective front view of the front downrigger assembly of FIG. 28, according to an exemplary embodiment.

FIG. 32 is a perspective view of a front downrigger assembly of the of the mid-mount fire apparatus of FIG. 1 in a first orientation, according to another exemplary embodiment.

DETAILED DESCRIPTION

Figure 1:
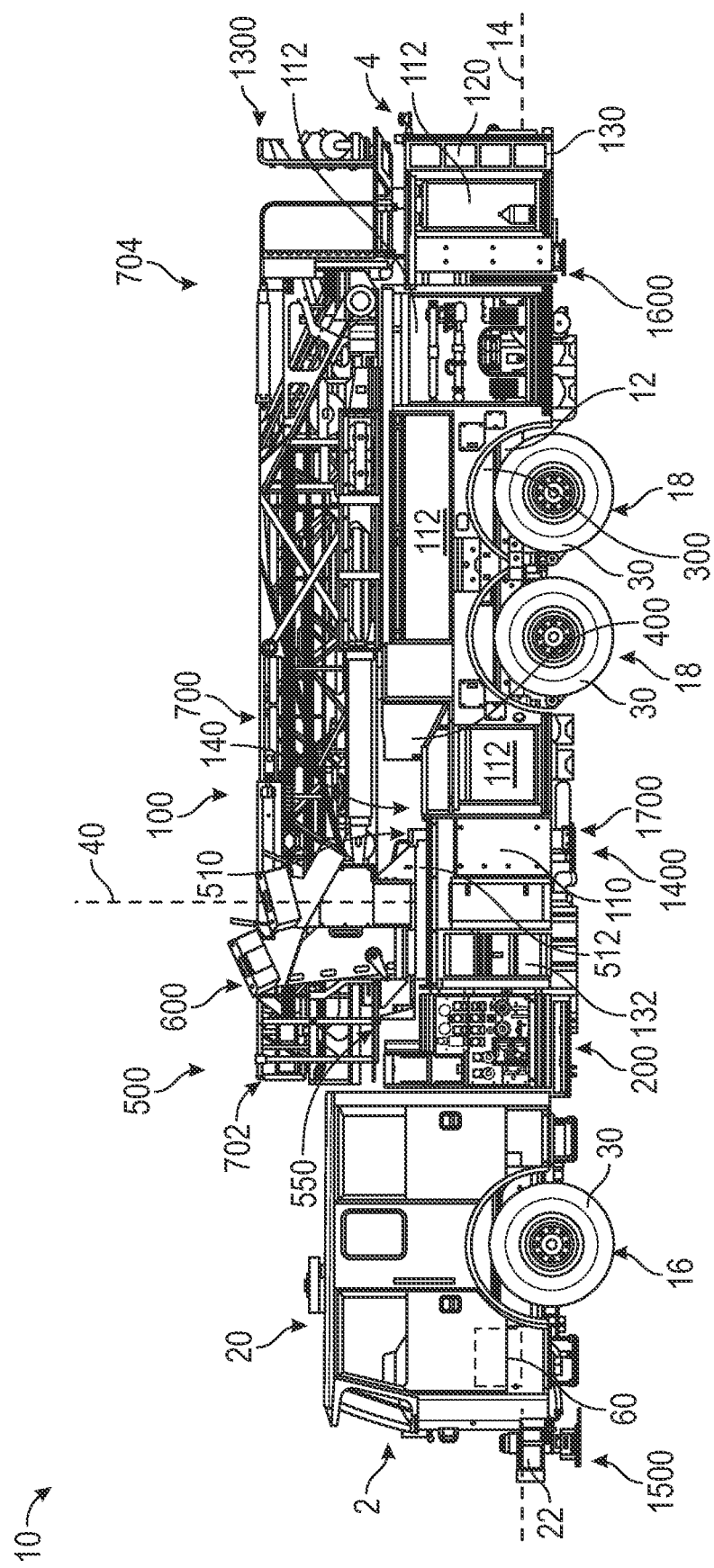
FIG. 1 is a left side view of a mid-mount fire apparatus, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes various components that improve performance relative to traditional systems. In one embodiment, the vehicle is a mid-mount quint configuration fire apparatus that includes a water tank, an aerial ladder, hose storage, ground ladder storage, and a water pump. The fire apparatus includes a stability system including front downriggers coupled to a front end of the fire apparatus, rear downriggers coupled to a rear end of the fire apparatus, and outriggers coupled to the fire apparatus rearward of a vertical pivot axis of the aerial ladder. In some embodiments, the stability system is controllable to automatically level the fire apparatus. In some embodiments, the stability system is selectively controllable (e.g., based on an operator input, command, etc.) to improve an operating parameter of the aerial ladder. By way of example, the stability system may be controlled to (i) effectively increase a horizontal reach of the aerial ladder, (ii) effectively increase a vertical reach of the aerial ladder, (iii) effectively increase a depression angle at which the aerial ladder is orientable relative to a horizontal surface, (iv) effectively increase an elevation angle at which the aerial ladder is orientable relative to the horizontal surface, (v) effectively decrease a distance between a distal end of the aerial ladder and the horizontal surface, and/or (vi) effectively increase a tip load rating of the aerial ladder.

Overall Vehicle

According to the exemplary embodiment shown in FIGS. 1-21, a vehicle, shown as fire apparatus 10, is configured as a mid-mount quint fire truck having a tandem rear axle. A "quint" fire truck as used herein may refer to a fire truck that includes a water tank, an aerial ladder, hose storage, ground ladder storage, and a water pump. In other embodiments, the fire apparatus 10 is configured as a mid-mount quint fire truck having a single rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. In still other embodiments, the fire apparatus 10 is configured as a non-quint mid-mount fire truck having a single rear axle or a tandem rear axle. In yet other embodiments, the fire apparatus 10 is configured as a rear-mount, quint or non-quint, single rear axle or tandem rear axle, fire truck.

As shown in FIGS. 1-7,10-13,17, and 18, the fire apparatus 10 includes a chassis, shown as frame 12, having longitudinal frame rails that define an axis, shown as longitudinal axis 14, that extends between a first end, shown as front end 2, and an opposing second end, shown as rear end 4, of the fire apparatus 10; a first axle, shown as front axle 16, coupled to the frame 12; one or more second axles, shown as rear axles 18, coupled to the frame 12; a first assembly, shown as front cabin 20, coupled to and supported by the frame 12 and having a bumper, shown as front bumper 22; a prime mover, shown as engine 60, coupled to and supported by the frame 12; and a second assembly, shown as rear assembly 100, coupled to and supported by the frame 12.

As shown in FIGS. 1-7,10, and 12, the front axle 16 and the rear axles 18 include tractive assemblies, shown as wheel and tire assemblies 30. As shown in FIGS. 1-4, the front cabin 20 is positioned forward of the rear assembly 100 (e.g., with respect to a forward direction of travel for the fire apparatus 10 along the longitudinal axis 14, etc.). According to an alternative embodiment, the cab assembly may be positioned behind the rear assembly 100 (e.g., with respect to a forward direction of travel for the fire apparatus 10 along the longitudinal axis 14, etc.). The cab assembly may be positioned behind the rear assembly 100 on, by way of example, a rear tiller fire apparatus. In some embodiments, the fire apparatus 10 is a ladder truck with a front portion that includes the front cabin 20 pivotally coupled to a rear portion that includes the rear assembly 100.

According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., the front axle 16, the rear axles 18, the wheel and tire assemblies 30, etc.). The final drive then propels or moves the fire apparatus 10. According to an exemplary embodiment, the engine 60 is a compression-ignition internal combustion engine that utilizes diesel fuel. In alternative embodiments, the engine 60 is another type of prime mover (e.g., a spark-ignition engine, a fuel cell, an electric motor, etc.) that is otherwise powered (e.g., with gasoline, compressed natural gas, propane, hydrogen, electricity, etc.).

As shown in FIGS. 1-7,10-13, and 17-19, the rear assembly 100 includes a body assembly, shown as body 110, coupled to and supported by the frame 12; a fluid driver, shown as pump system 200, coupled to and supported by the frame 12; a chassis support member, shown as torque box 300, coupled to and supported by the frame 12; a fluid reservoir, shown as water tank 400, coupled to the body 110 and supported by the torque box 300 and/or the frame 12; and an aerial assembly, shown as aerial assembly 500, pivotally coupled to the torque box 300 and supported by the torque box 300 and/or the frame 12. In some embodiments, the rear assembly 100 does not include the water tank 400. In some embodiments, the rear assembly 100 additionally or alternatively includes an agent or foam tank (e.g., that receives and stores a fire suppressing agent, foam, etc.).

As shown in FIGS. 1,2, and 10-12, the sides of the body 110 define a plurality of compartments, shown as storage compartments 112. The storage compartments 112 may receive and store miscellaneous items and gear used by emergency response personnel (e.g., helmets, axes, oxygen tanks, hoses, medical kits, etc.). As shown in FIGS. 5,6, and 10-12, the rear end 4 of the body 110 defines a longitudinal storage compartment that extends along the longitudinal axis 14, shown as ground ladder compartment 114. The ground ladder compartment 114 may receive and store one or more ground ladders. As shown in FIGS. 3,5, and 10-13, a top surface, shown as top platform 122, of the body 110 defines a cavity, shown as hose storage platform 116, and a channel, shown as hose chute 118, extending from the hose storage platform 116 to the rear end 4 of the body 110. The hose storage platform 116 may receive and store one or more hoses (e.g., up to 1000 feet of 5 inch diameter hose, etc.), which may be pulled from the hose storage platform 116 though the hose chute 118.

As shown in FIGS. 1-6 and 10-13, the rear end 4 of the body 110 has notched or clipped corners, shown as chamfered corners 120. In other embodiments, the rear end 4 of the body 110 does not have notched or clipped corners (e.g., the rear end 4 of the body 110 may have square corners, etc.). According to an exemplary embodiment, the chamfered corners 120 provide for increased turning clearance relative to fire apparatuses that have non-notched or non-clipped (e.g., square, etc.) corners. As shown in FIGS. 1-3, 5, 6, and 10-13, the rear assembly 100 includes a first selectively deployable ladder, shown as rear ladder 130, coupled to each of the chamfered corners 120 of the body 110. According to an exemplary embodiment, the rear ladders 130 are hingedly coupled to the chamfered corners 120 and repositionable between a stowed position (see, e.g., FIGS. 1-3, 5, 12, 13, etc.) and a deployed position (see, e.g., FIGS. 6, 10, 11, etc.). The rear ladders 130 may be selectively deployed such that a user may climb the rear ladder 130 to access the top platform 122 of the body 110 and/or one or more components of the aerial assembly 500 (e.g., a work basket, an implement, an aerial ladder assembly, the hose storage platform 116, etc.). In other embodiments, the body 110 has stairs in addition to or in place of the rear ladders 130.

As shown in FIGS. 1, 12, 17, and 18, the rear assembly 100 includes a second selectively deployable ladder, shown as side ladder 132, coupled to a side (e.g., a left side, a right side, a driver's side, a passenger's side, etc.) of the body 110. In some embodiments, the rear assembly 100 includes two side ladders 132, one coupled to each side of the body 110. According to an exemplary embodiment, the side ladder 132 is hingedly coupled to the body 110 and repositionable between a stowed position (see, e.g., FIGS. 1, 2, 17, 18, etc.) and a deployed position. The side ladder 132 may be selectively deployed such that a user may climb the side ladder 132 to access one or more components of the aerial assembly 500 (e.g., a work platform, an aerial ladder assembly, a control console, etc.).

As shown in FIGS. 1, 2, 12 and 13, the body 110 defines a recessed portion, shown as aerial assembly recess 140, positioned (i) rearward of the front cabin 20 and (ii) forward of the water tank 400 and/or the rear axles 18. The aerial assembly recess 140 defines an aperture, shown as pedestal opening 142, rearward of the pump system 200.

According to an exemplary embodiment the water tank 400 is coupled to the frame 12 with a superstructure (e.g., disposed along a top surface of the torque box 300, etc.). As shown in FIGS. 1, 2, 12, and 13, the water tank 400 is positioned below the aerial ladder assembly 700 and forward of the hose storage platform 116. As shown in FIGS. 1, 2, 12 and 13, the water tank 400 is positioned such that the water tank 400 defines a rear wall of the aerial assembly recess 140. In one embodiment, the water tank 400 stores up to 300 gallons of water. In another embodiment, the water tank 400 stores more than or less than 300 gallons of water (e.g., 100, 200, 250, 350, 400, 500, etc. gallons). In other embodiments, fire apparatus 10 additionally or alternatively includes a second reservoir that stores another firefighting agent (e.g., foam, etc.). In still other embodiments, the fire apparatus 10 does not include the water tank 400 (e.g., in a non-quint configuration, etc.).

As shown in FIGS. 1-3, 5-7, 10, 17, and 18, the aerial assembly 500 includes a turntable assembly, shown as turntable 510, pivotally coupled to the torque box 300; a platform, shown work platform 550, coupled to the turntable 510; a console, shown as control console 600, coupled to the turntable 510; a ladder assembly, shown as aerial ladder assembly 700, having a first end (e.g., a base end, a proximal end, a pivot end, etc.), shown as proximal end 702, pivotally coupled to the turntable 510, and an opposing second end (e.g., a free end, a distal end, a platform end, an implement end, etc.), shown as distal end 704; and an implement, shown as work basket 1300, coupled to the distal end 704.

Figure 12:
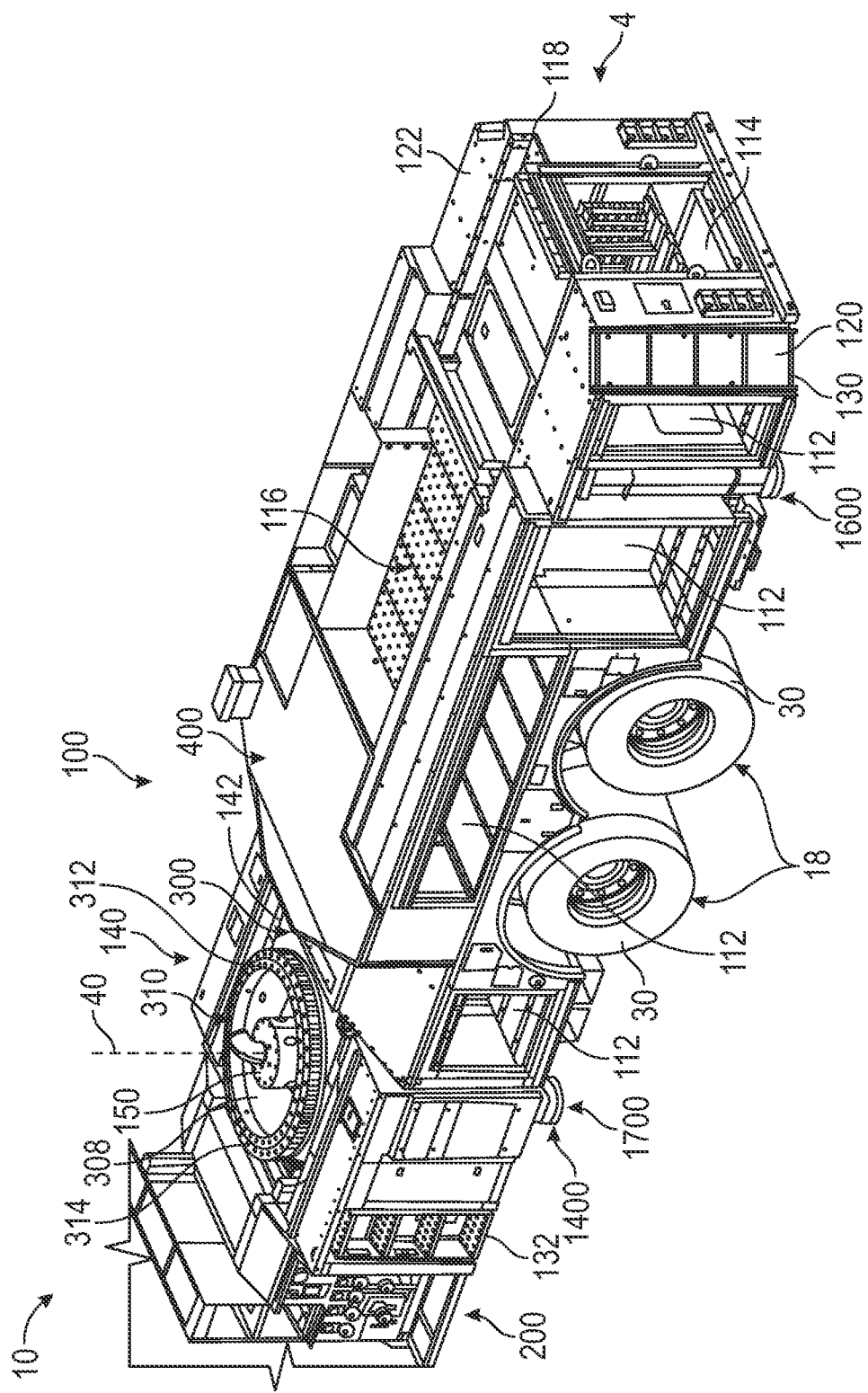
FIG. 12 is another rear perspective view of the rear assembly of FIG. 10 without a ladder assembly, according to an exemplary embodiment.
Figure 13:
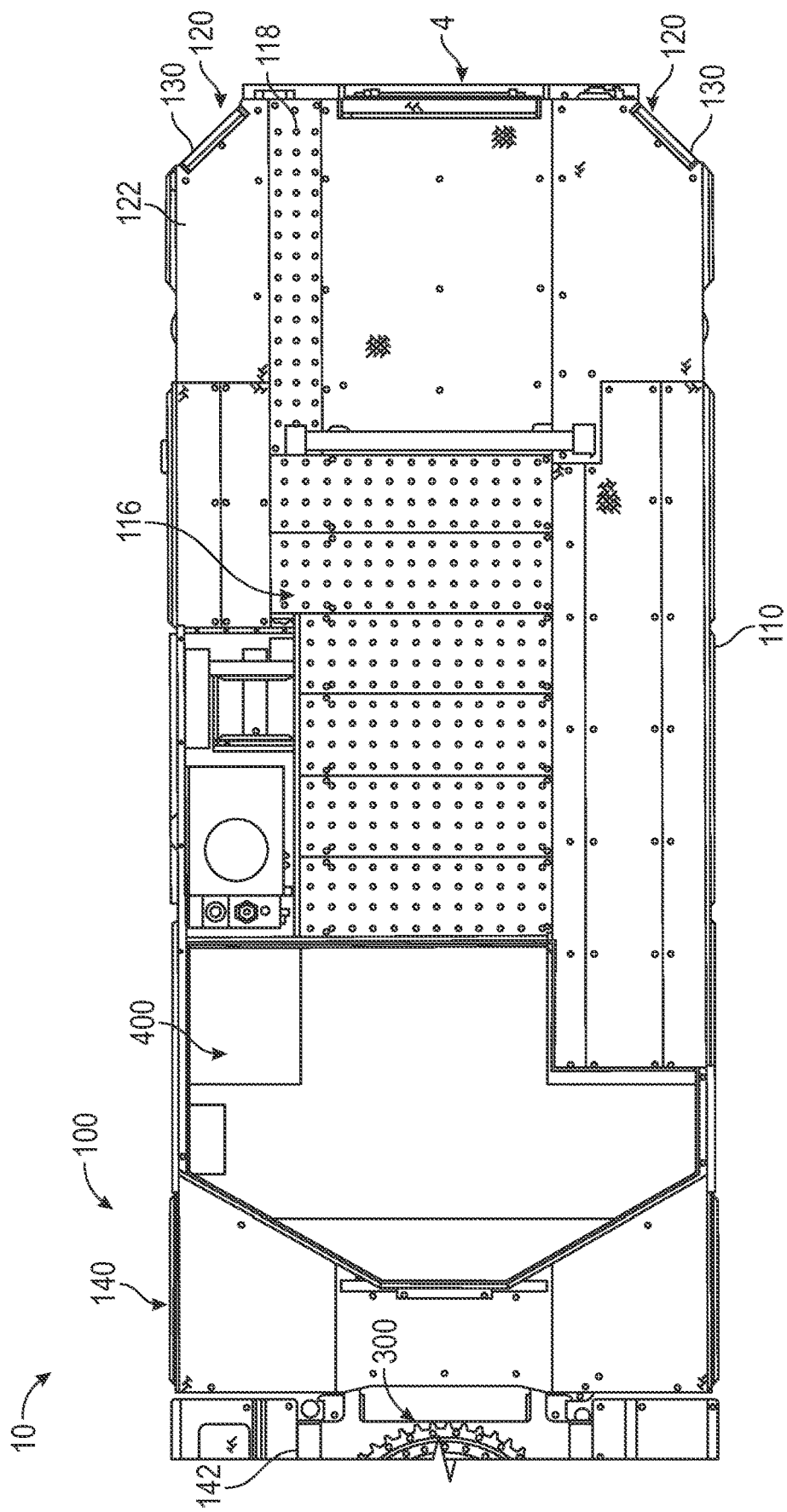
FIG. 13 is a top view of the rear assembly of FIG. 12, according to an exemplary embodiment.
Figure 14:
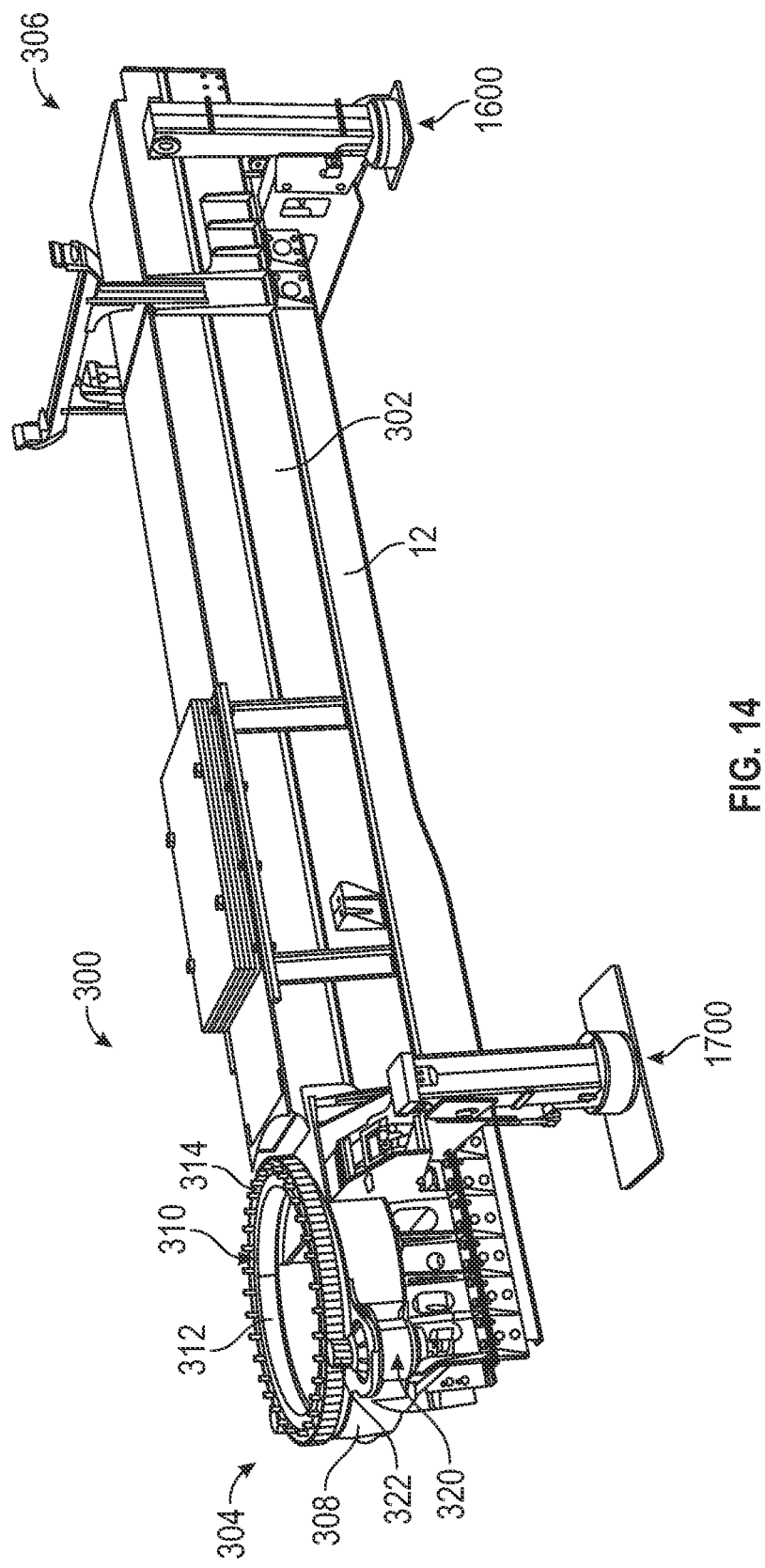
FIG. 14 is a perspective view of a torque box of the mid-mount fire apparatus of FIG. 1, according to an exemplary embodiment.
Figure 15:
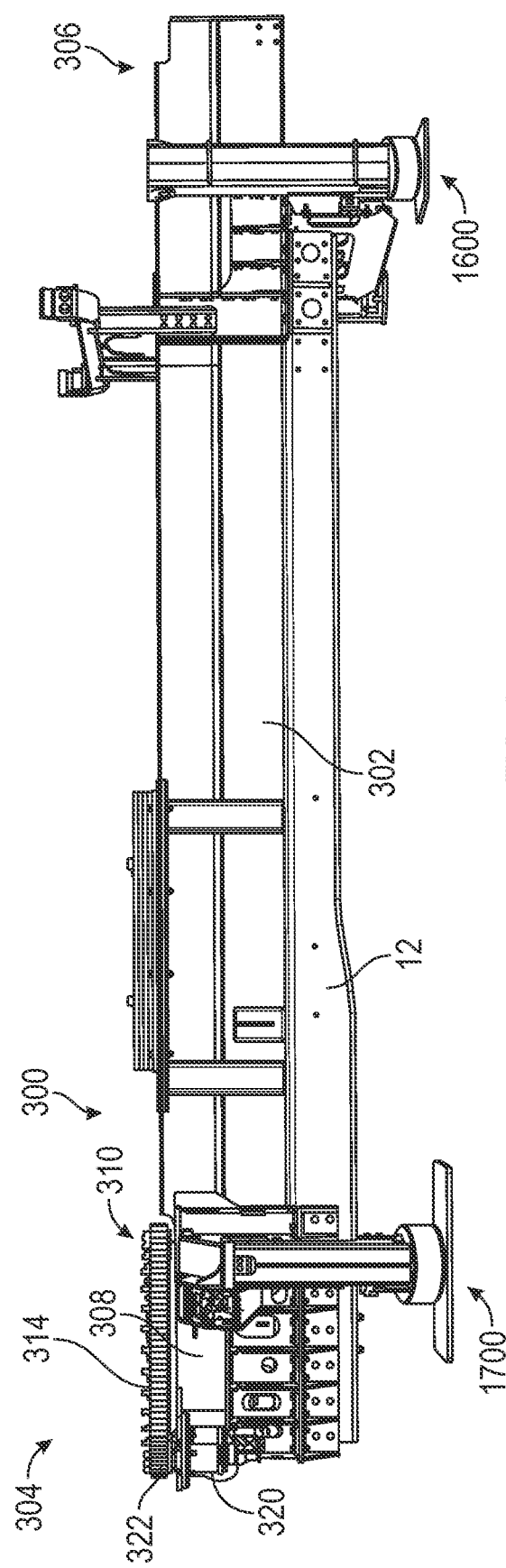
FIG. 15 is a side view of the torque box of FIG. 14, according to an exemplary embodiment.

As shown in FIGS. 1, 2, 4, 14, and 15, the torque box 300 is coupled to the frame 12. In one embodiment, the torque box 300 extends laterally the full width between the lateral outsides of the frame rails of the frame 12. As shown in FIGS. 14 and 15, the torque box 300 includes a body portion, shown as body 302, having a first end, shown as front end 304, and an opposing second end, shown as rear end 306. As shown in FIGS. 12, 14, and 15, the torque box 300 includes a support, shown as pedestal 308, coupled (e.g., attached, fixed, bolted, welded, etc.) to the front end 304 of the torque box 300. As shown in FIG. 12, the pedestal 308 extends through the pedestal opening 142 into the aerial assembly recess 140 such that the pedestal 308 is positioned (i) forward of the water tank 400 and the rear axles 18 and (ii) rearward of pump system 200, the front axle 16, and the front cabin 20.

Figure 2:
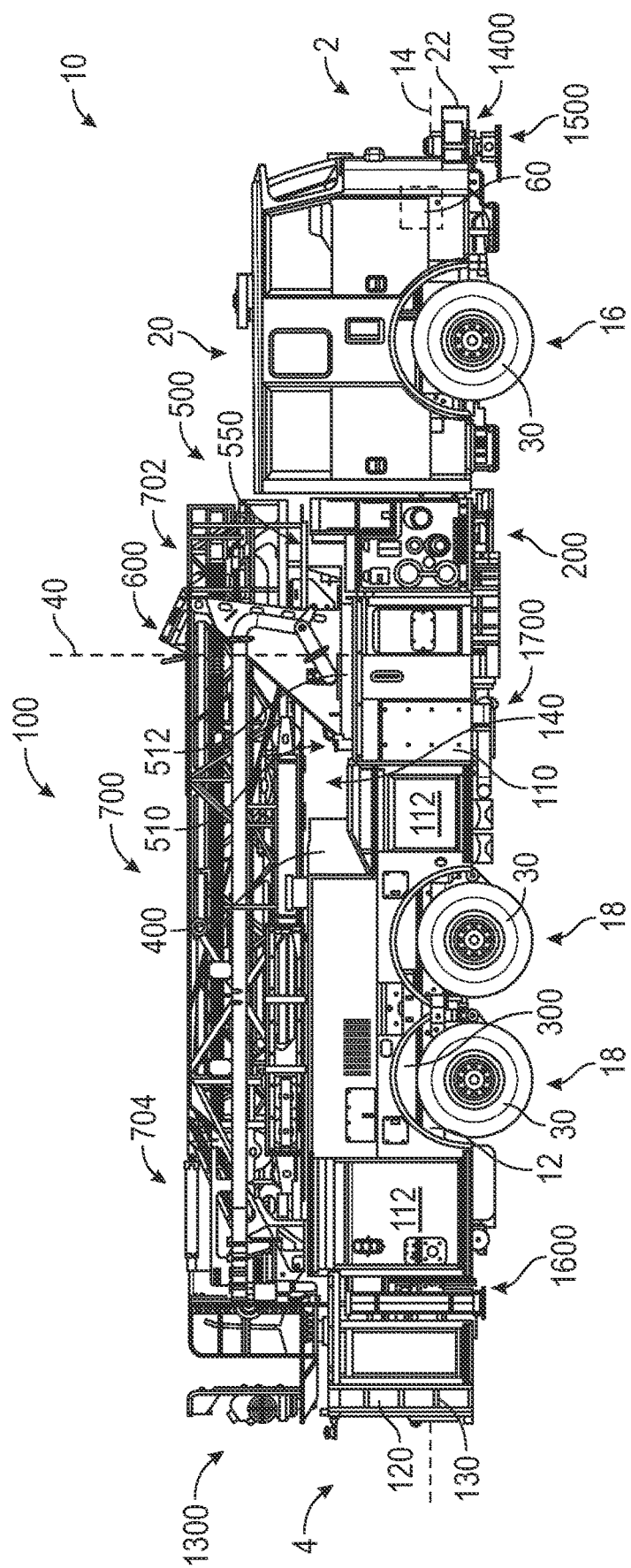
FIG. 2 is a right side view of the mid-mount fire apparatus of FIG. 1, according to an exemplary embodiment.

According to the exemplary embodiment shown in FIGS. 1, 2, and 12, the aerial assembly 500 (e.g., the turntable 510, the work platform 550, the control console 600, the aerial ladder assembly 700, the work basket 1300, etc.) is rotatably coupled to the pedestal 308 such that the aerial assembly 500 is selectively repositionable into a plurality of operating orientations about a vertical axis, shown as vertical pivot axis 40. As shown in FIGS. 12, 14, and 15, the torque box 300 includes a pivotal connector, shown as slewing bearing 310, coupled to the pedestal 308. The slewing bearing 310 is a rotational rolling-element bearing with an inner element, shown as bearing element 312, and an outer element, shown as driven gear 314. The bearing element 312 may be coupled to the pedestal 308 with a plurality of fasteners (e.g., bolts, etc.).

As shown in FIGS. 14 and 15, a drive actuator, shown as rotation actuator 320, is coupled to the pedestal 308 (e.g., by an intermediate bracket, etc.). The rotation actuator 320 is positioned to drive (e.g., rotate, turn, etc.) the driven gear 314 of the slewing bearing 310. In one embodiment, the rotation actuator 320 is an electric motor (e.g., an alternating current (AC) motor, a direct current motor (DC), etc.) configured to convert electrical energy into mechanical energy. In other embodiments, the rotation actuator 320 is powered by air (e.g., pneumatic, etc.), a fluid (e.g., a hydraulic cylinder, etc.), mechanically (e.g., a flywheel, etc.), or still another power source.

As shown in FIGS. 14 and 15, the rotation actuator 320 includes a driver, shown as drive pinion 322. The drive pinion 322 is mechanically coupled with the driven gear 314 of the slewing bearing 310. In one embodiment, a plurality of teeth of the drive pinion 322 engage a plurality of teeth on the driven gear 314. By way of example, when the rotation actuator 320 is engaged (e.g., powered, turned on, etc.), the rotation actuator 320 may provide rotational energy (e.g., mechanical energy, etc.) to an output shaft. The drive pinion 322 may be coupled to the output shaft such that the rotational energy of the output shaft drives (e.g., rotates, etc.) the drive pinion 322. The rotational energy of the drive pinion 322 may be transferred to the driven gear 314 in response to the engaging teeth of both the drive pinion 322 and the driven gear 314. The driven gear 314 thereby rotates about the vertical pivot axis 40, while the bearing element 312 remains in a fixed position relative to the driven gear 314.

As shown in FIGS. 1, 2, and 16-18, the turntable 510 includes a first portion, shown as rotation base 512, and a second portion, shown as side supports 514, that extend vertically upward from opposing lateral sides of the rotation base 512. According to an exemplary embodiment, (i) the work platform 550 is coupled to the side supports 514, (ii) the aerial ladder assembly 700 is pivotally coupled to the side supports 514, (iii) the control console 600 is coupled to the rotation base 512, and (iv) the rotation base 512 is disposed within the aerial assembly recess 140 and interfaces with and is coupled to the driven gear 314 of slewing bearing 310 such that (i) the aerial assembly 500 is selectively pivotable about the vertical pivot axis 40 using the rotation actuator 320, (ii) at least a portion of the work platform 550 and the aerial ladder assembly 700 is positioned below the roof of the front cabin 20, and (iii) the turntable 510 is coupled rearward of the front cabin 20 and between the front axle 16 and the tandem rear axles 18 (e.g., the turntable 510 is coupled to the frame 12 such that the vertical pivot axis 40 is positioned rearward of a centerline of the front axle 16, forward of a centerline of the tandem rear axle 18, rearward of a rear edge of a tire of the front axle 16, forward of a front edge of a wheel of the front axle of the tandem rear axles 18, rearward of a front edge of a tire of the front axle 16, forward of a rear edge of a wheel of the rear axle of the tandem rear axles 18, etc.). Accordingly, loading from the work basket 1300, the aerial ladder assembly 700, and/or the work platform 550 may transfer through the turntable 510 into the torque box 300 and the frame 12.

As shown in FIG. 12, the rear assembly 100 includes a rotation swivel, shown as rotation swivel 316, that includes a conduit. According to an exemplary embodiment, the conduit of the rotation swivel 316 extends upward from the pedestal 308 and into the turntable 510. The rotation swivel 316 may couple (e.g., electrically, hydraulically, fluidly, etc.) the aerial assembly 500 with other components of the fire apparatus 10. By way of example, the conduit may define a passageway for water to flow into the aerial ladder assembly 700. Various lines may provide electricity, hydraulic fluid, and/or water to the aerial ladder assembly 700, actuators, and/or the control console 600.

According to an exemplary embodiment, the work platform 550 provides a surface upon which operators (e.g., fire fighters, rescue workers, etc.) may stand while operating the aerial assembly 500 (e.g., with the control console 600, etc.). The control console 600 may be communicably coupled to various components of the fire apparatus 10 (e.g., actuators of the aerial ladder assembly 700, rotation actuator 320, water turret, etc.) such that information or signals (e.g., command signals, fluid controls, etc.) may be exchanged from the control console 600. The information or signals may relate to one or more components of the fire apparatus 10. According to an exemplary embodiment, the control console 600 enables an operator (e.g., a fire fighter, etc.) of the fire apparatus 10 to communicate with one or more components of the fire apparatus 10. By way of example, the control console 600 may include at least one of an interactive display, a touchscreen device, one or more buttons (e.g., a stop button configured to cease water flow through a water nozzle, etc.), joysticks, switches, and voice command receivers. An operator may use a joystick associated with the control console 600 to trigger the actuation of the turntable 510 and/or the aerial ladder assembly 700 to a desired angular position (e.g., to the front, back, or side of fire apparatus 10, etc.). By way of another example, an operator may engage a lever associated with the control console 600 to trigger the extension or retraction of the aerial ladder assembly 700.

Figure 16:
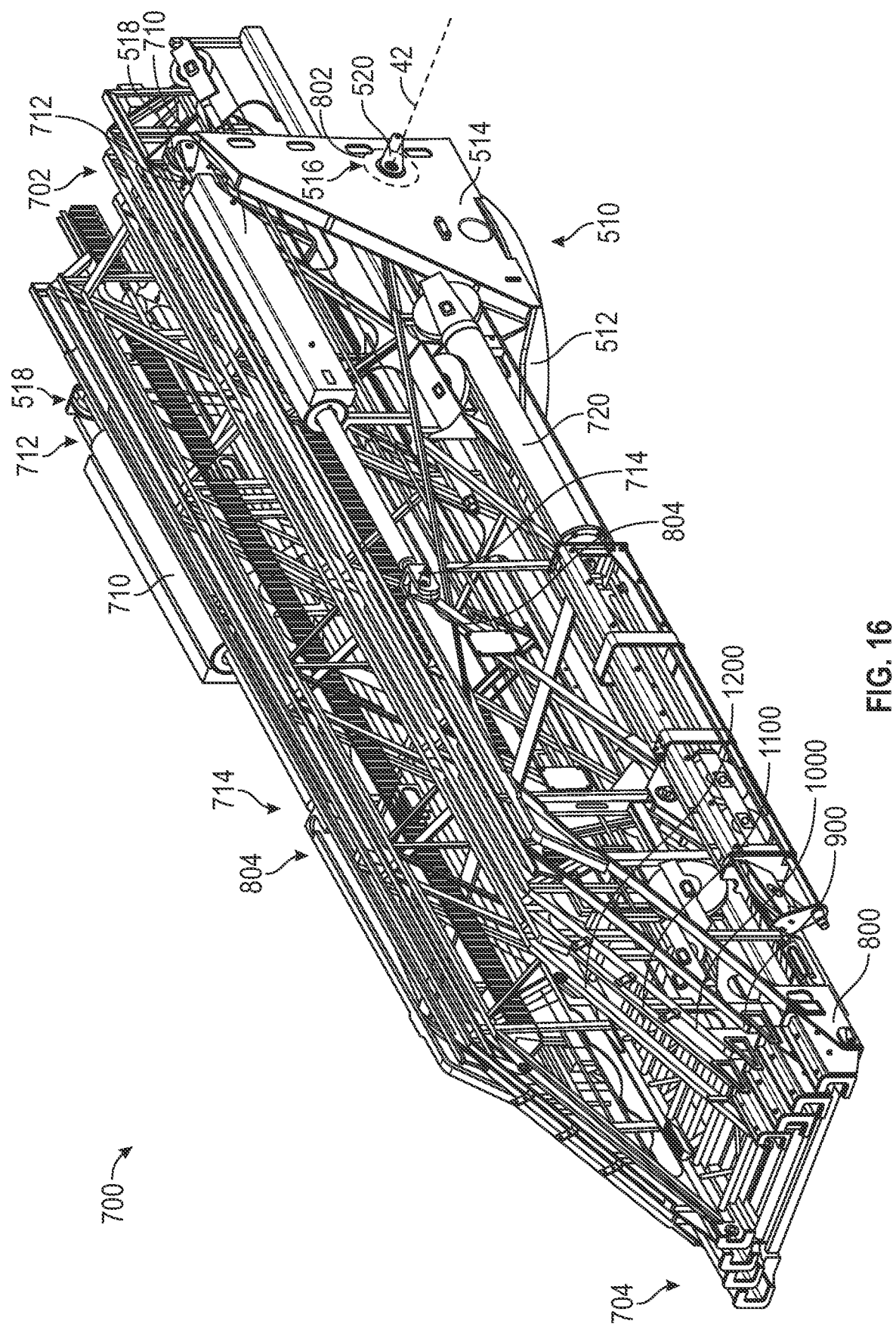
FIG. 16 is a perspective view of an aerial ladder assembly and turntable of the mid-mount fire apparatus of FIG. 1, according to an exemplary embodiment.
Figure 17:
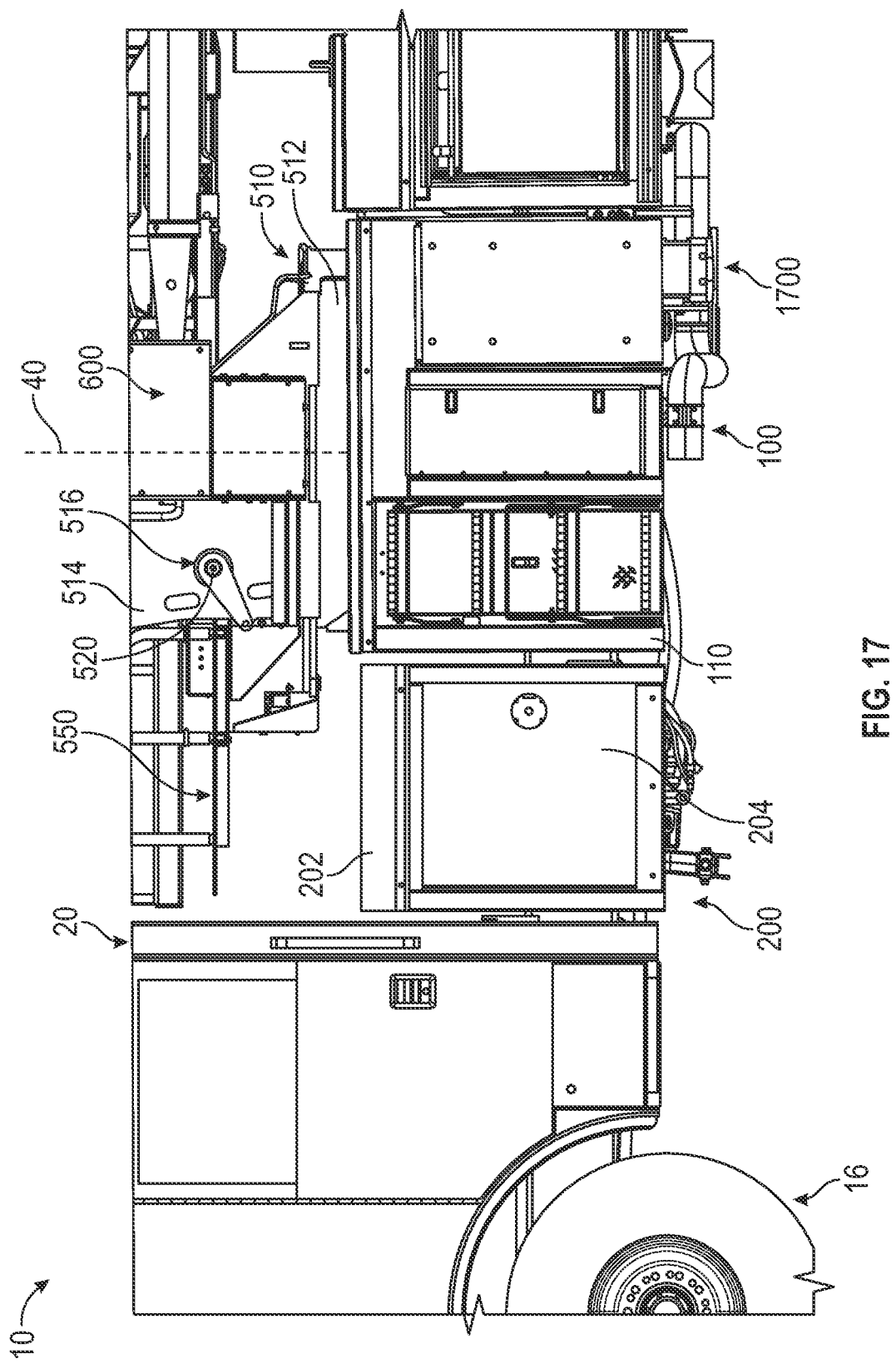
FIG. 17 is a side view of a pump housing of the mid-mount fire apparatus of FIG. 1 in a first configuration, according to an exemplary embodiment.
Figure 18:
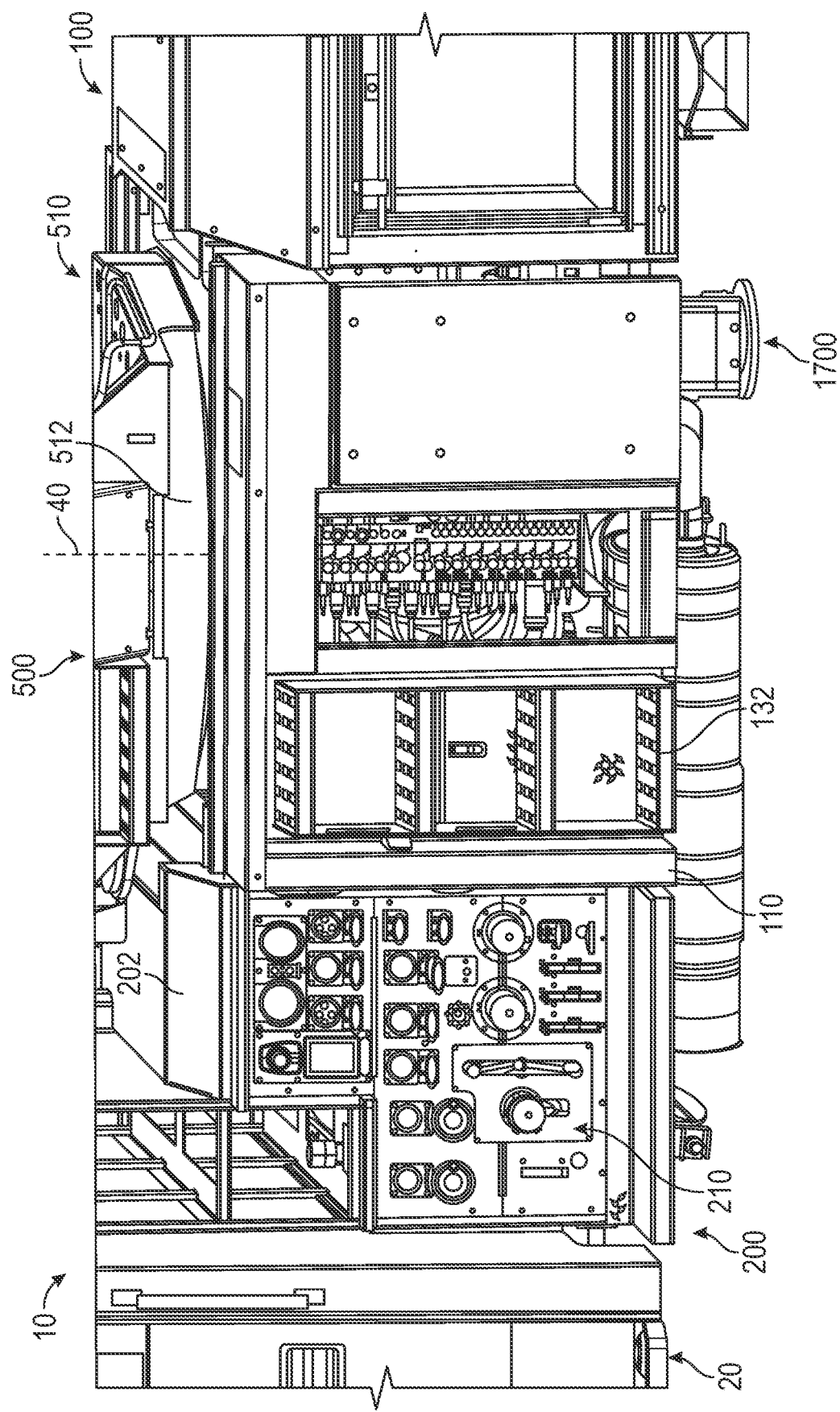
FIG. 18 is a side perspective view of a pump system within the pump housing of FIG. 17 in a second configuration, according to an exemplary embodiment.

As shown in FIG. 16, the aerial ladder assembly 700 has a plurality of nesting ladder sections that telescope with respect to one another including a first section, shown as base section 800; a second section, shown as lower middle section 900; a third ladder section, shown as middle section 1000; a fourth section, shown as upper middle section 1100; and a fifth section, shown as fly section 1200. As shown in FIGS. 16 and 17, the side supports 514 of the turntable 510 define a first interface, shown as ladder interface 516, and a second interface, shown as actuator interface 518. As shown in FIG. 16, the base section 800 of the aerial ladder assembly 700 defines first interfaces, shown as pivot interfaces 802, and second interfaces, shown as actuator interfaces 804. As shown in FIGS. 16 and 17, the ladder interfaces 516 of the side supports 514 of the turntable 510 and the pivot interfaces 802 of the base section 800 are positioned to align and cooperatively receive a pin, shown as heel pin 520, to pivotally couple the proximal end 702 of the aerial ladder assembly 700 to the turntable 510. As shown in FIG. 17, the aerial ladder assembly 700 includes first ladder actuators (e.g., hydraulic cylinders, etc.), shown as pivot actuators 710. Each of the pivot actuators 710 has a first end, shown as end 712, coupled to a respective actuator interface 518 of the side supports 514 of the turntable 510 and an opposing second end, shown as end 714, coupled to a respective actuator interface 804 of the base section 800. According to an exemplary embodiment, the pivot actuators 710 are kept in tension such that retraction thereof lifts and rotates the distal end 704 of the aerial ladder assembly 700 about a lateral axis, shown as lateral pivot axis 42, defined by the heel pin 520. In other embodiments, the pivot actuators 710 are kept in compression such that extension thereof lifts and rotates the distal end 704 of the aerial ladder assembly 700 about the lateral pivot axis 42. In an alternative embodiment, the aerial ladder assembly only includes one pivot actuator 710.

As shown in FIG. 16, the aerial ladder assembly 700 includes one or more second ladders actuators, shown as extension actuators 720. According to an exemplary embodiment, the extension actuators 720 are positioned to facilitate selectively reconfiguring the aerial ladder assembly 700 between an extended configuration and a retracted/stowed configuration (see, e.g., FIGS. 1-3,16, etc.). In the extended configuration (e.g., deployed position, use position, etc.), the aerial ladder assembly 700 is lengthened, and the distal end 704 is extended away from the proximal end 702. In the retracted configuration (e.g., storage position, transport position, etc.), the aerial ladder assembly 700 is shortened, and the distal end 704 is withdrawn towards the proximal end 702.

According to the exemplary embodiment shown in FIGS. 1-3 and 16, the aerial ladder assembly 700 has over-retracted ladder sections such that the proximal ends of the lower middle section 900, the middle section 1000, the upper middle section 1100, and the fly section 1200 extend forward of (i) the heel pin 520 and (ii) the proximal end of the base section 800 along the longitudinal axis 14 of the fire apparatus 10 when the aerial ladder assembly 700 is retracted and stowed. According to an exemplary embodiment, the distal end 704 of the aerial ladder assembly 700 (e.g., the distal end of the fly section 1200, etc.) is extensible to the horizontal reach of at least 88 feet (e.g., 93 feet, etc.) and/or a vertical reach of at least 95 feet (e.g., 100 feet, etc.). According to an exemplary embodiment, the aerial ladder assembly 700 is operable below grade (e.g., at a negative depression angle relative to a horizontal, etc.) within an aerial work envelope or scrub area. In one embodiment, the aerial ladder assembly 700 is operable in the scrub area such that it may pivot about the vertical pivot axis 40 up to 50 degrees (e.g., 20 degrees forward and 30 degrees rearward from a position perpendicular to the longitudinal axis 14, etc.) on each side of the body 110 while at a negative depression angle (e.g., up to negative 15 degrees, more than negative 15 degrees, up to negative 20 degrees, etc. below level, below a horizontal defined by the top platform 122 of the body 110, etc.).

Figure 3:
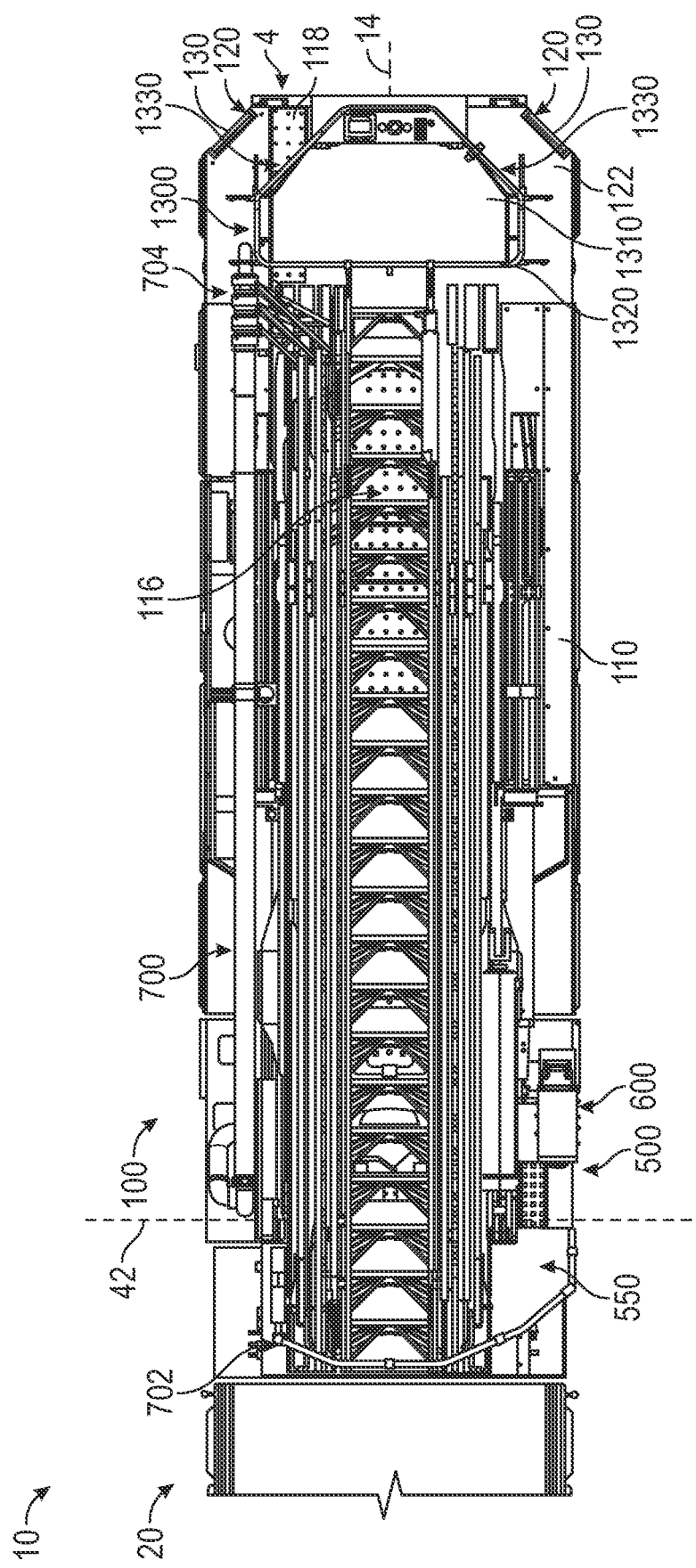
FIG. 3 is a top view of the mid-mount fire apparatus of FIG. 1, according to an exemplary embodiment.
Figure 4:
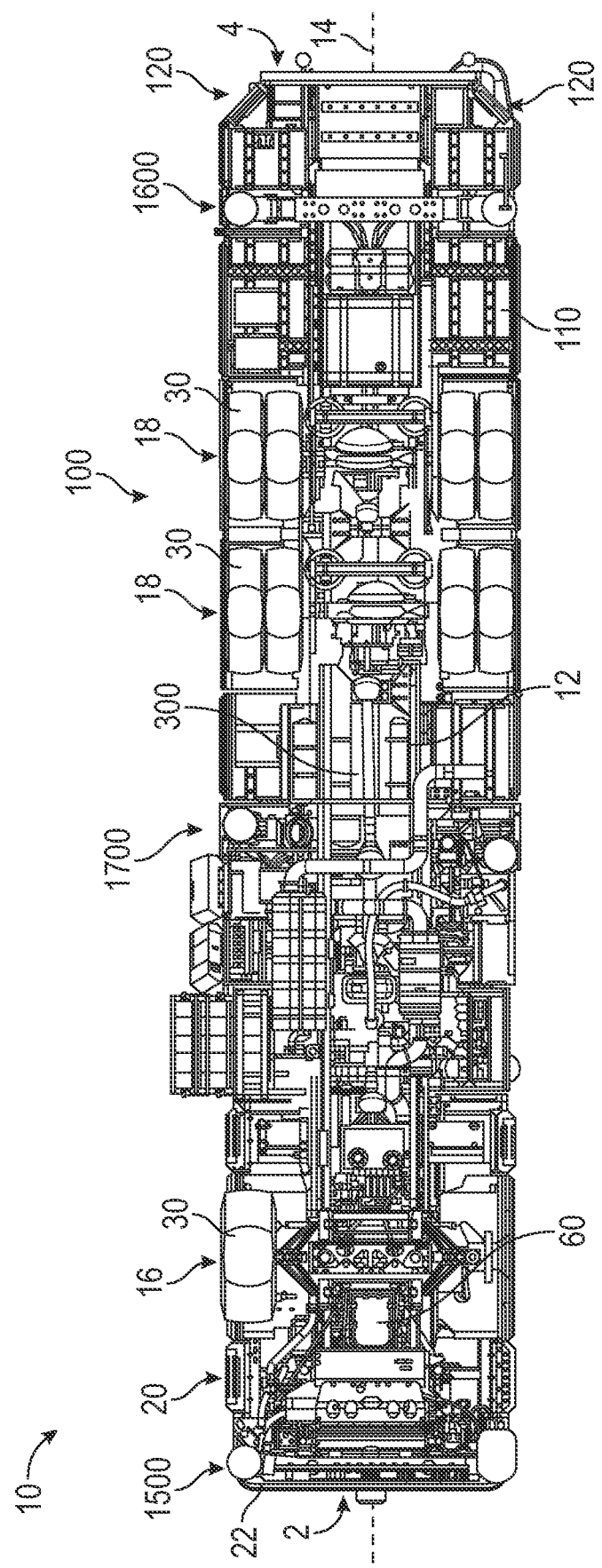
FIG. 4 is a bottom view of the mid-mount fire apparatus of FIG. 1, according to an exemplary embodiment.
Figure 5:
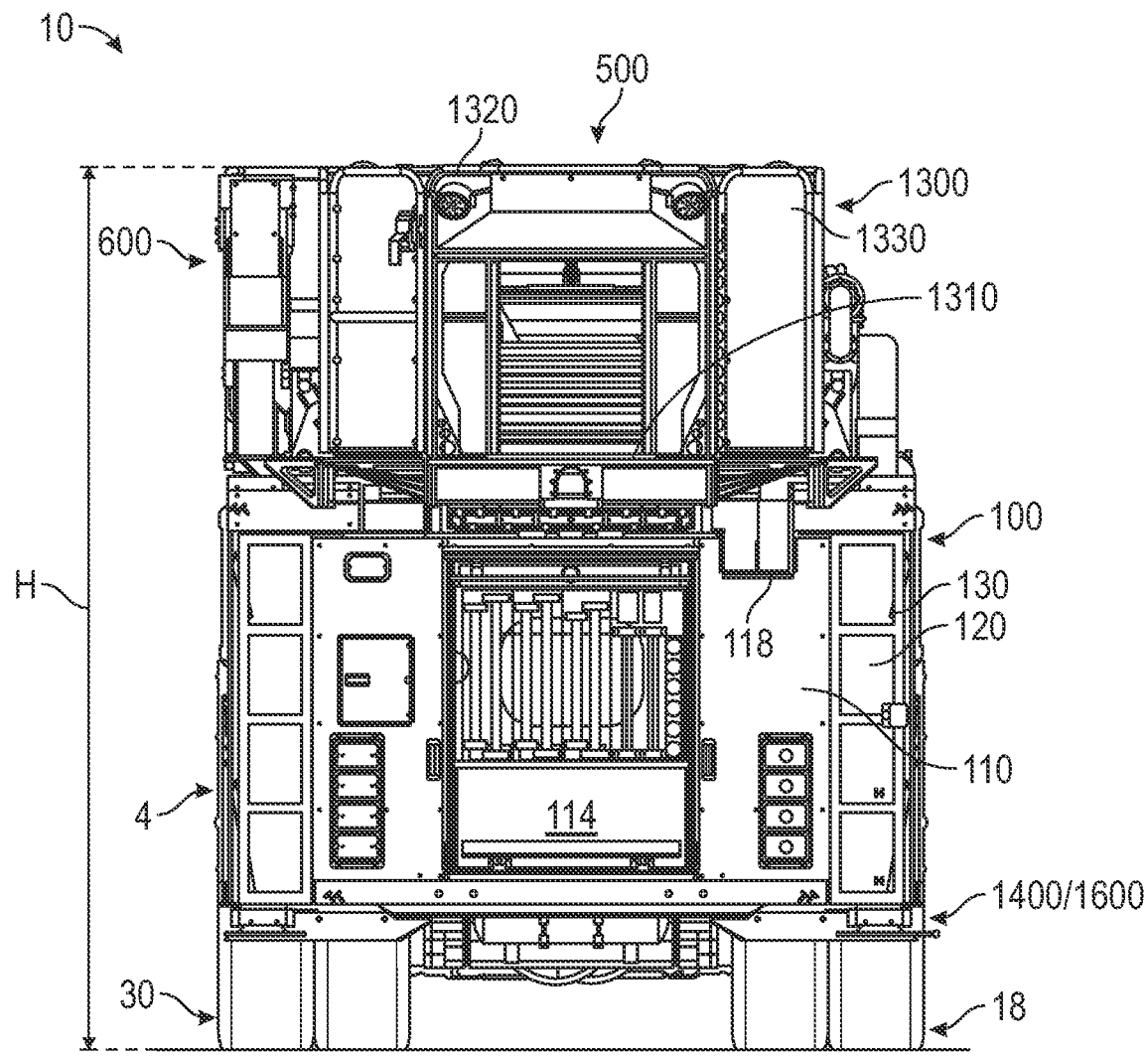
FIG. 5 is a rear view of the mid-mount fire apparatus of FIG. 1, according to an exemplary embodiment.
Figure 10:
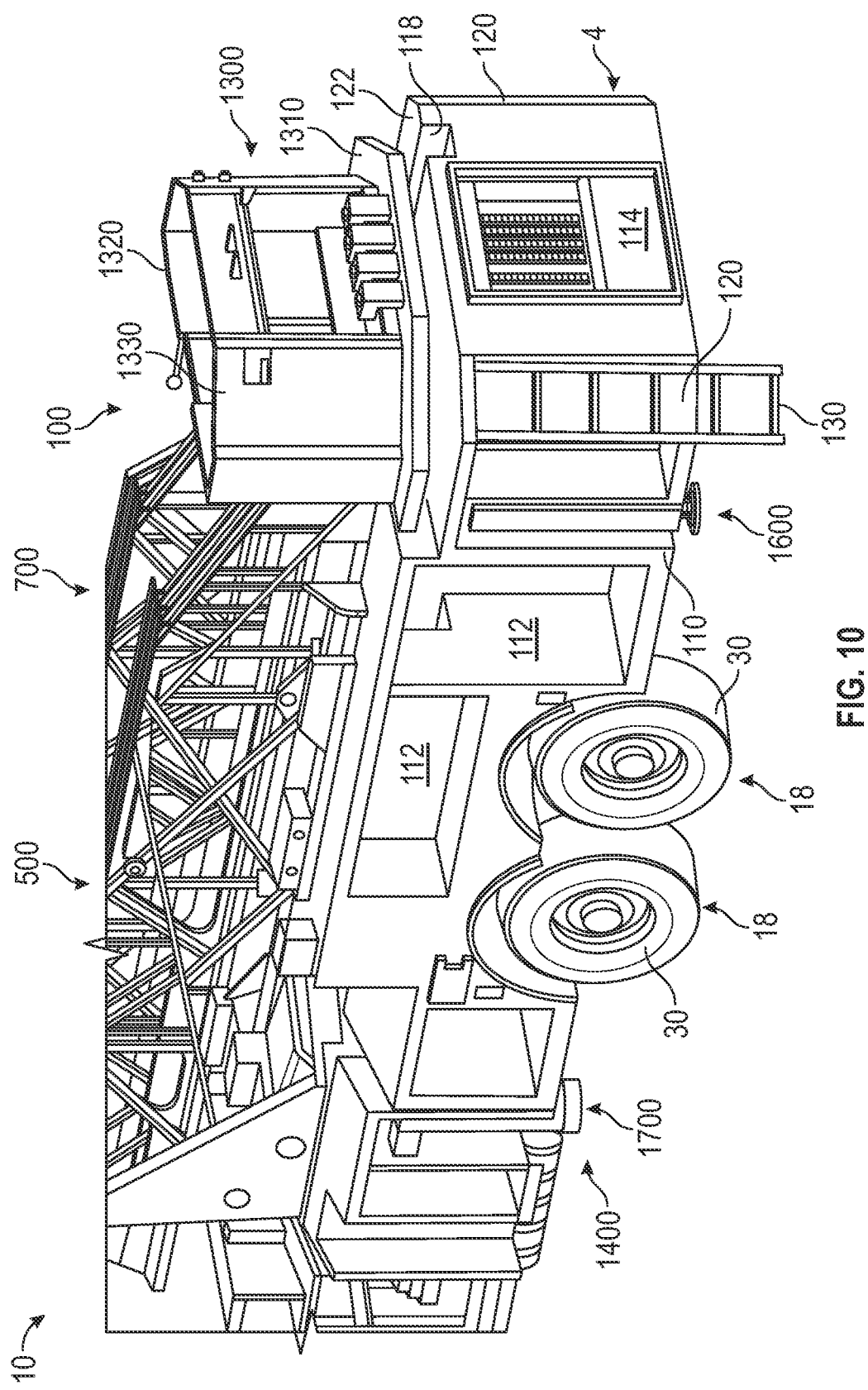
FIG. 10 is a rear perspective view of a rear assembly of the mid-mount fire apparatus of FIG. 1, according to an exemplary embodiment.
Figure 11:
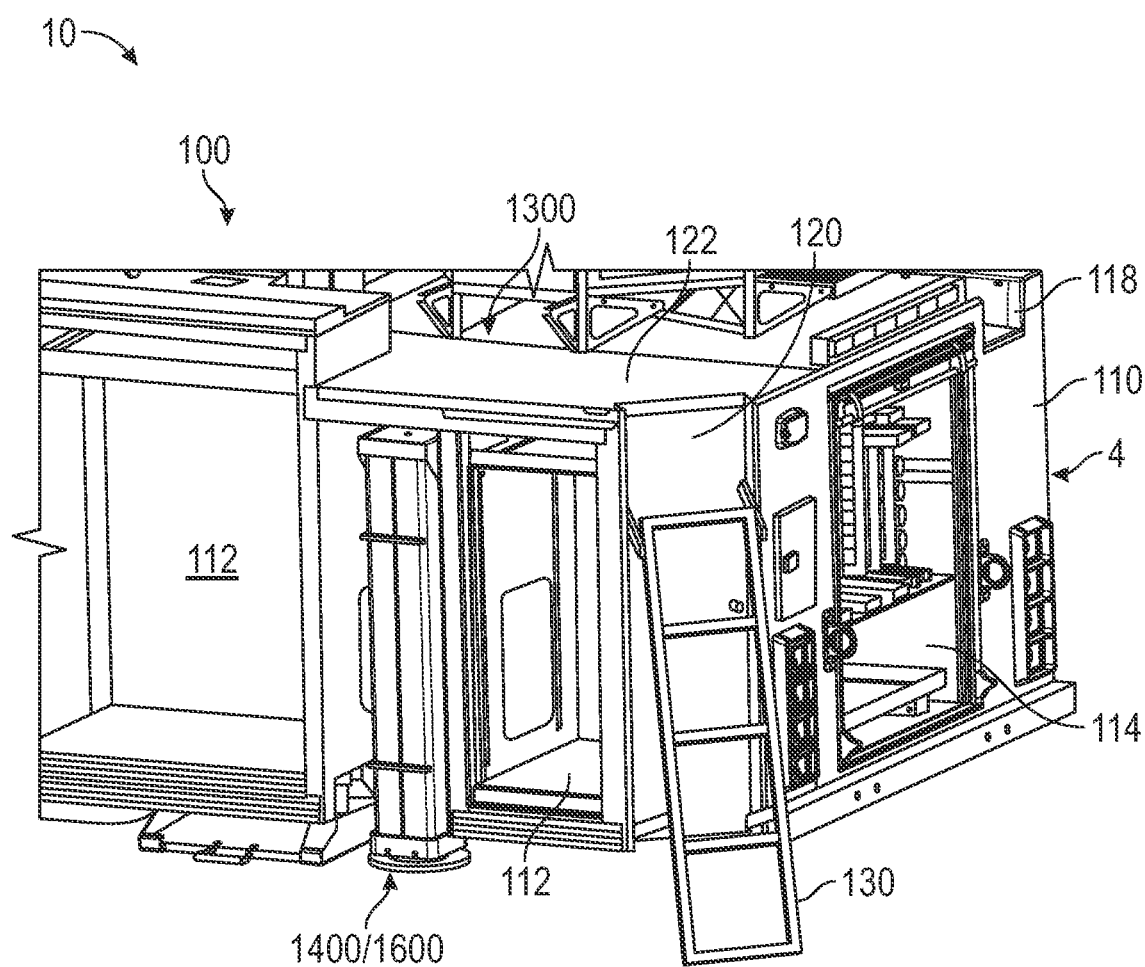
FIG. 11 is detailed rear perspective view of the rear assembly of FIG. 10, according to an exemplary embodiment.

According to an exemplary embodiment, the work basket 1300 is configured to hold at least one of fire fighters and persons being aided by the fire fighters. As shown in FIGS. 3, 5, and 10, the work basket 1300 includes a platform, shown as basket platform 1310; a support, shown as railing 1320, extending around the periphery of the basket platform 1310; and angled doors, shown as basket doors 1330, coupled to the corners of the railing 1320 proximate the rear end 4 of the fire apparatus 10. According to an exemplary embodiment, the basket doors 1330 are angled to correspond with the chamfered corners 120 of the body 110.

In other embodiments, the aerial assembly 500 does not include the work basket 1300. In some embodiments, the work basket 1300 is replaced with or additionally includes a nozzle (e.g., a deluge gun, a water cannon, a water turret, etc.) or other tool. By way of example, the nozzle may be connected to a water source (e.g., the water tank 400, an external source, etc.) with a conduit extending along the aerial ladder assembly 700 (e.g., along the side of the aerial ladder assembly 700, beneath the aerial ladder assembly 700, in a channel provided in the aerial ladder assembly 700, etc.). By pivoting the aerial ladder assembly 700 into a raised position, the nozzle may be elevated to expel water from a higher elevation to facilitate suppressing a fire.

According to an exemplary embodiment, the pump system 200 (e.g., a pump house, etc.) is a mid-ship pump assembly. As shown in FIGS. 1, 2, 12, 17, and 18, the pump system 200 is positioned along the rear assembly 100 behind the front cabin 20 and forward of the vertical pivot axis 40 (e.g., forward of the turntable 510, the torque box 300, the pedestal 308, the slewing bearing 310, the heel pin 520, a front end of the body 110, etc.) such that the work platform 550 and the over-retracted portions of the aerial ladder assembly 700 overhang above the pump system 200 when the aerial ladder assembly 700 is retracted and stowed. According to an exemplary embodiment, the position of the pump system 200 forward of the vertical pivot axis 40 facilitates ease of install and serviceability. In other embodiments, the pump system 200 is positioned rearward of the vertical pivot axis 40.

Figure 19:
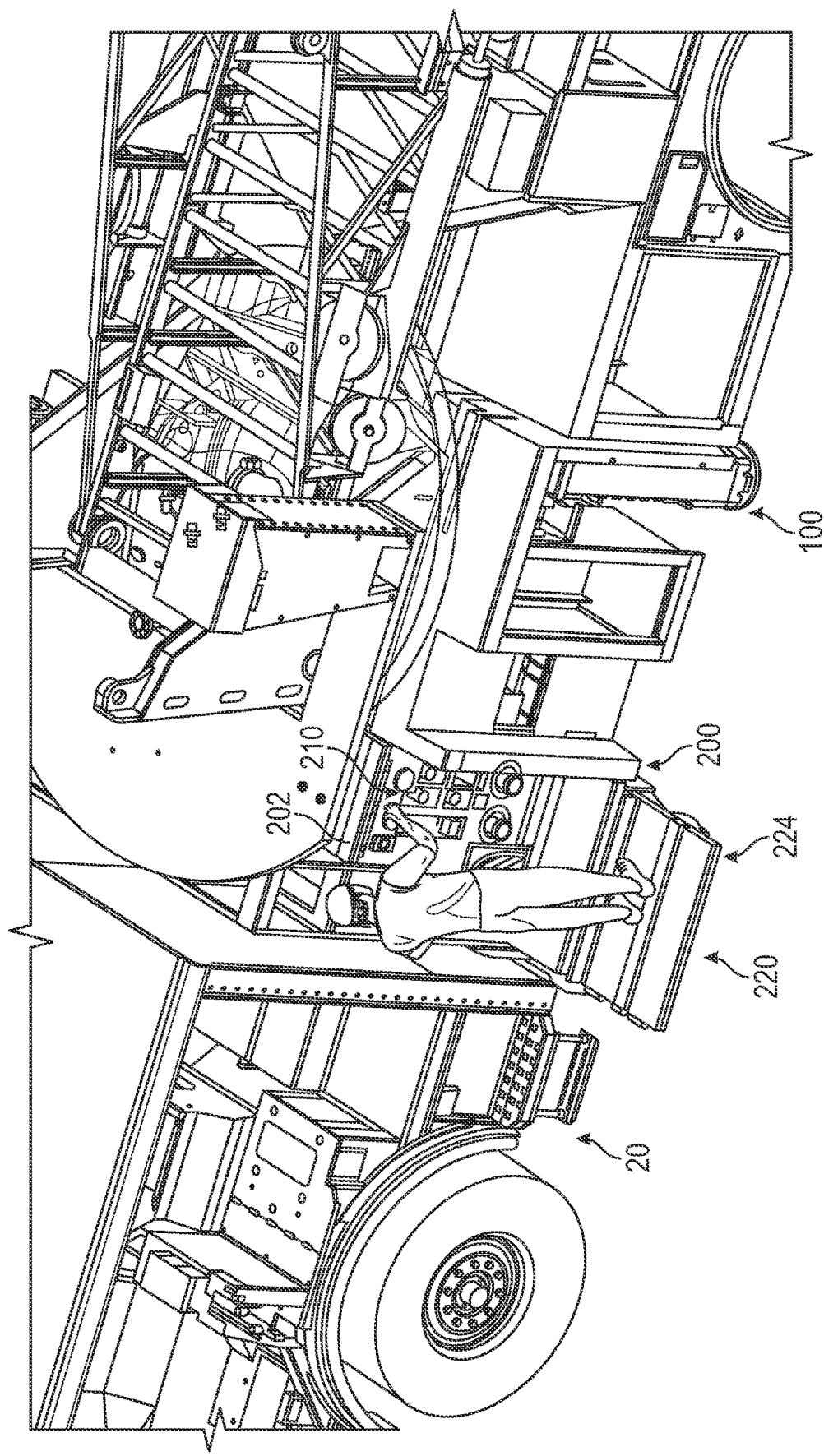
FIG. 19 is a side perspective view of the pump system of FIG. 18 with a platform in a deployed configuration, according to an exemplary embodiment.
Figure 20:
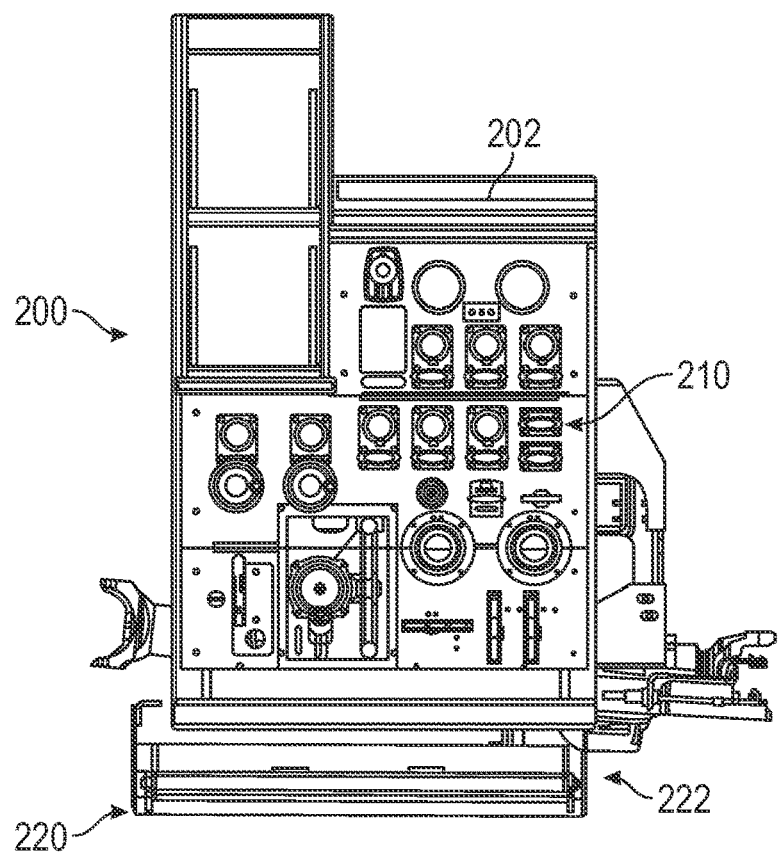
FIGS. 20 and 21 are opposing side views of the pump system of FIG. 18, according to an exemplary embodiment.
Figure 21:
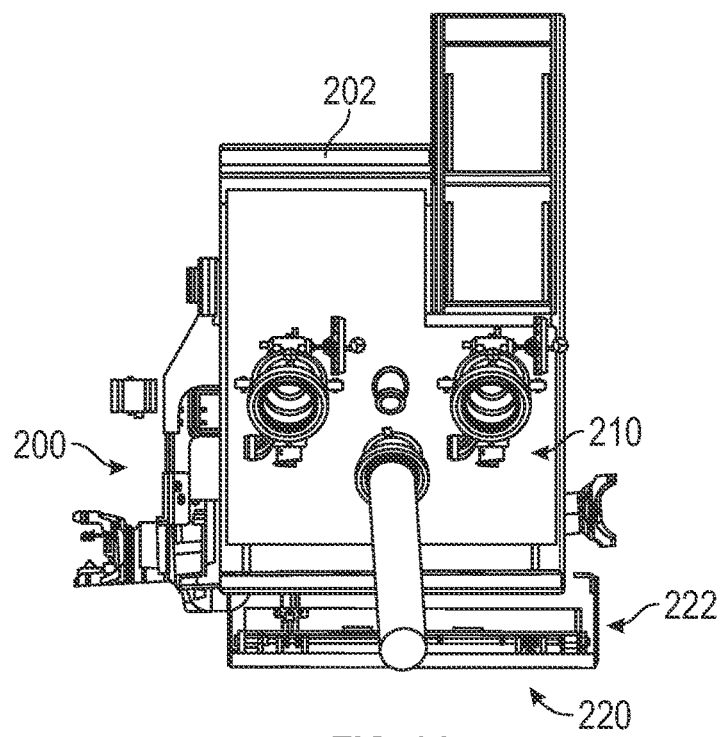

As shown in FIGS. 17-21, the pump system 200 includes a housing, shown as pump house 202. As shown in FIG. 17, the pump house 202 includes a selectively openable door, shown as pump door 204. As shown in FIGS. 18-21, the pump system 200 includes a pumping device, shown as pump assembly 210, disposed within the pump house 202. By way of example, the pump assembly 210 may include a pump panel having an inlet for the entrance of water from an external source (e.g., a fire hydrant, etc.), a pump, an outlet configured to engage a hose, various gauges, etc. The pump of the pump assembly 210 may pump fluid (e.g., water, agent, etc.) through a hose to extinguish a fire (e.g., water received at an inlet of the pump house 202, water stored in the water tank 400, etc.). As shown in FIGS. 19-21, the pump system 200 includes a selectively deployable (e.g., foldable, pivotable, collapsible, etc.) platform, shown as pump platform 220, pivotally coupled to the pump house 202. As shown in FIGS. 20 and 21, the pump platform 220 is in a first configuration, shown as stowed configuration 222, and as shown in FIG. 19, the pump platform 220 is in a second configuration, shown as deployed configuration 224.

Figure 6:
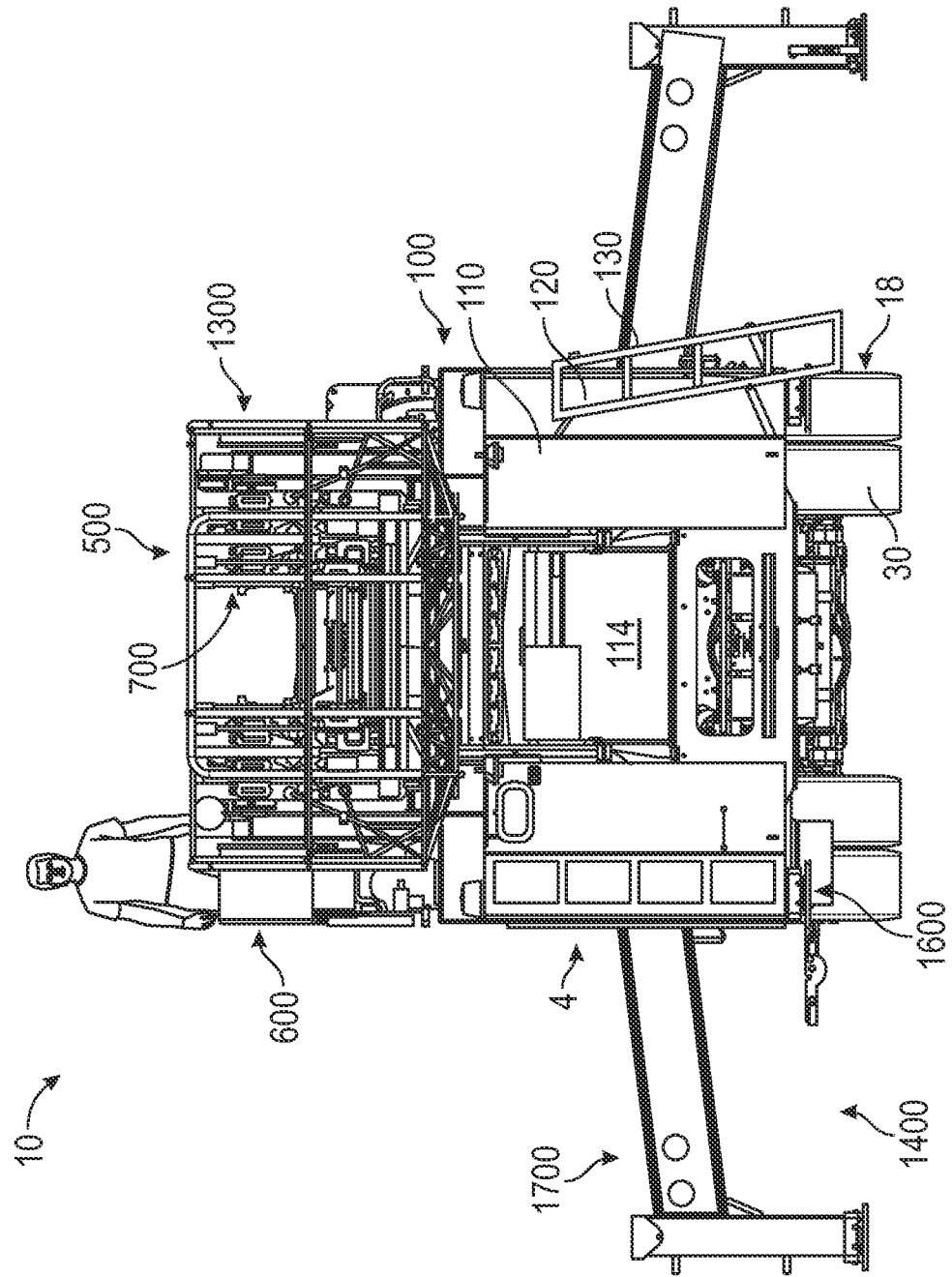
FIG. 6 is a rear view of the mid-mount fire apparatus of FIG. 1 having outriggers in an extended configuration, according to an exemplary embodiment.
Figure 7:
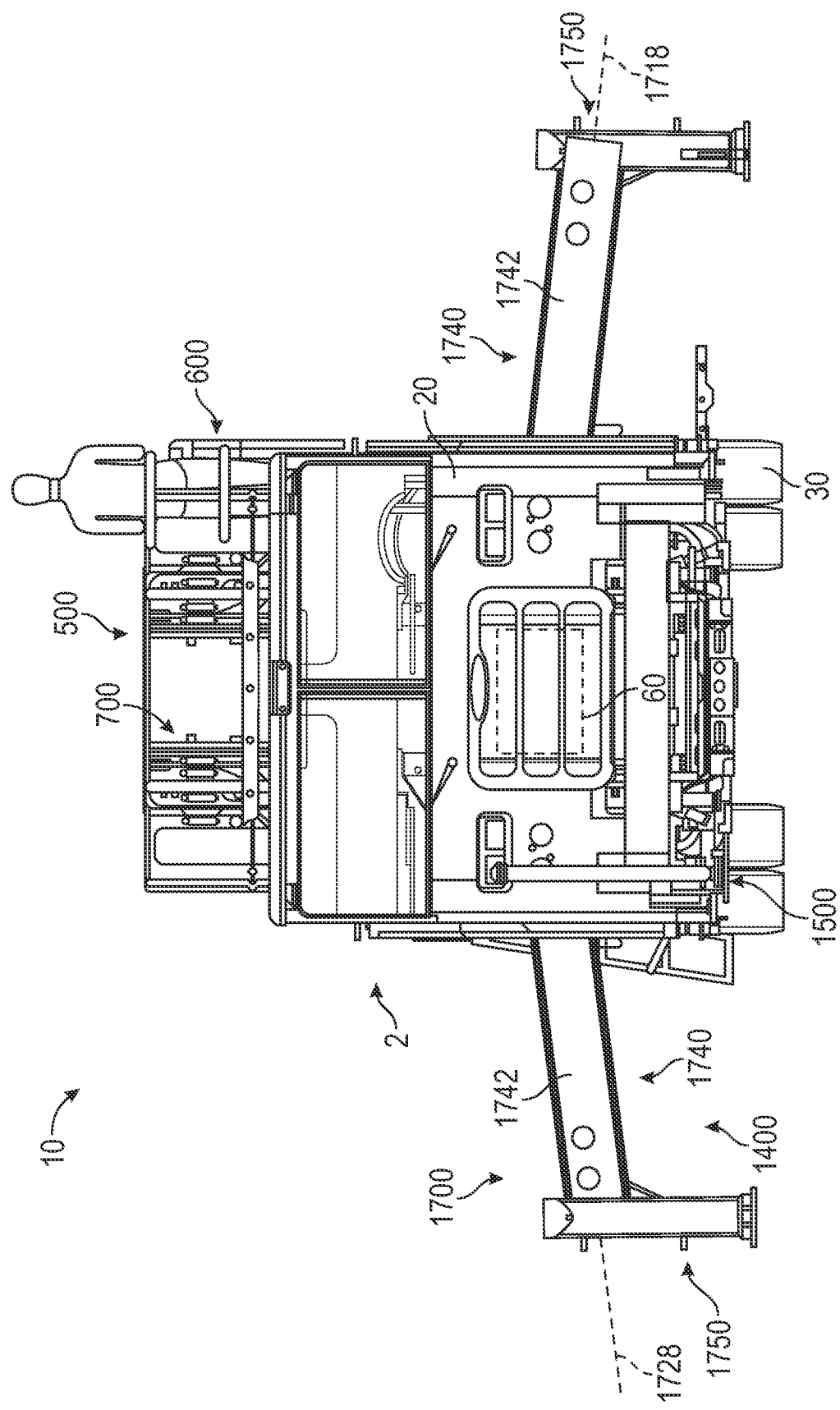
FIG. 7 is a front view of the mid-mount fire apparatus of FIG. 1 having outriggers in an extended configuration, according to an exemplary embodiment.

As shown in FIGS. 1, 2, 4, 6, 7, 10-12, 14, and 15, the fire apparatus 10 includes a stability system, shown as stability assembly 1400. As shown in FIGS. 1, 2, 4, and 7, the stability assembly 1400 includes first stabilizers, shown as front downriggers 1500, coupled to each lateral side of the front bumper 22 at the front end 2 of the front cabin 20. In other embodiments, the front downriggers 1500 are otherwise coupled to the fire apparatus 10 (e.g., to the front end 2 of the frame 12, etc.). According to an exemplary embodiment, the front downriggers 1500 are selectively deployable (e.g., extendable, etc.) downward to engage a ground surface. As shown in FIGS. 1, 2, 4-6, 10-12, 14, and 15, the stability assembly 1400 includes second stabilizers, shown as rear downriggers 1600, coupled to each lateral side of the rear end 4 of the frame 12 and/or the rear end 306 of the torque box 300. According to an exemplary embodiment, the rear downriggers 1600 are selectively deployable (e.g., extendable, etc.) downward to engage a ground surface. As shown in FIGS. 1, 2, 4, 6, 7, 10, 12, 14, 15, 17, and 18, the stability assembly 1400 includes third stabilizers, shown outriggers 1700, coupled to the front end 304 of the torque box 300 between the pedestal 308 and the body 302. As shown in FIGS. 6 and 7, the outriggers 1700 are selectively deployable (e.g., extendable, etc.) outward from each of the lateral sides of the body 110 and/or downward to engage a ground surface. According to an exemplary embodiment, the outriggers 1700 are extendable up to a distance of eighteen feet (e.g., measured between the center of a pad of a first outrigger and the center of a pad of a second outrigger, etc.). In other embodiments, the outriggers 1700 are extendable up to a distance of less than or greater than eighteen feet.

According to an exemplary embodiment, the front downriggers 1500, the rear downriggers 1600, and the outriggers 1700 are positioned to transfer the loading from the aerial ladder assembly 700 to the ground. For example, a load applied to the aerial ladder assembly 700 (e.g., a fire fighter at the distal end 704, a wind load, etc.) may be conveyed into to the turntable 510, through the pedestal 308 and the torque box 300, to the frame 12, and into the ground through the front downriggers 1500, the rear downriggers 1600, and/or the outriggers 1700. When the front downriggers 1500, the rear downriggers 1600, and/or the outriggers 1700 engage with a ground surface, portions of the fire apparatus 10 (e.g., the front end 2, the rear end 4, etc.) may be elevated relative to the ground surface. One or more of the wheel and tire assemblies 30 may remain in contact with the ground surface, but may not provide any load bearing support. While the fire apparatus 10 is being driven or not in use, the front downriggers 1500, the rear downriggers 1600, and the outriggers 1700 may be retracted into a stored position.

According to an exemplary embodiment, with (i) the front downriggers 1500, the rear downriggers 1600, and/or the outriggers 1700 extended and (ii) the aerial ladder assembly 700 fully extended (e.g., at a horizontal reach of up to 88 feet, at a vertical reach of up to 100 feet, etc.), the fire apparatus 10 withstands a rated tip load (e.g., rated meaning that the fire apparatus 10 can, from a design-engineering perspective, withstand a greater tip load, with an associated factor of safety of at least two, meets National Fire Protection Association ("NFPA") requirements, etc.) of at least 1,000 pounds applied to the work basket 1300, in addition to the weight of the work basket 1300 itself (e.g., approximately 700 pounds, etc.). In embodiments where the aerial assembly 500 does not include the work basket 1300, the fire apparatus 10 may have a rated tip load of more than 1,000 pounds (e.g., 1,250 pounds, etc.) when the aerial ladder assembly 700 is fully extended.

According to an exemplary embodiment, the tandem rear axles 18 have a gross axle weight rating of up to 48,000 pounds and the fire apparatus 10 does not exceed the 48,000 pound tandem-rear axle rating. The front axle 16 may have a 24,000 pound axle rating. Traditionally, mid-mount fire trucks have greater than a 48,000 pound loading on the tandem rear-axles thereof. However, some state regulations prevent vehicles having such a high axle loading, and, therefore, the vehicles are unable to be sold and operated in such states. Advantageously, the fire apparatus 10 of the present disclosure has a gross axle weight loading of at most 48,000 pounds on the tandem rear axles 18, and, therefore, the fire apparatus 10 may be sold and operated in any state of the United States.

Figure 8:
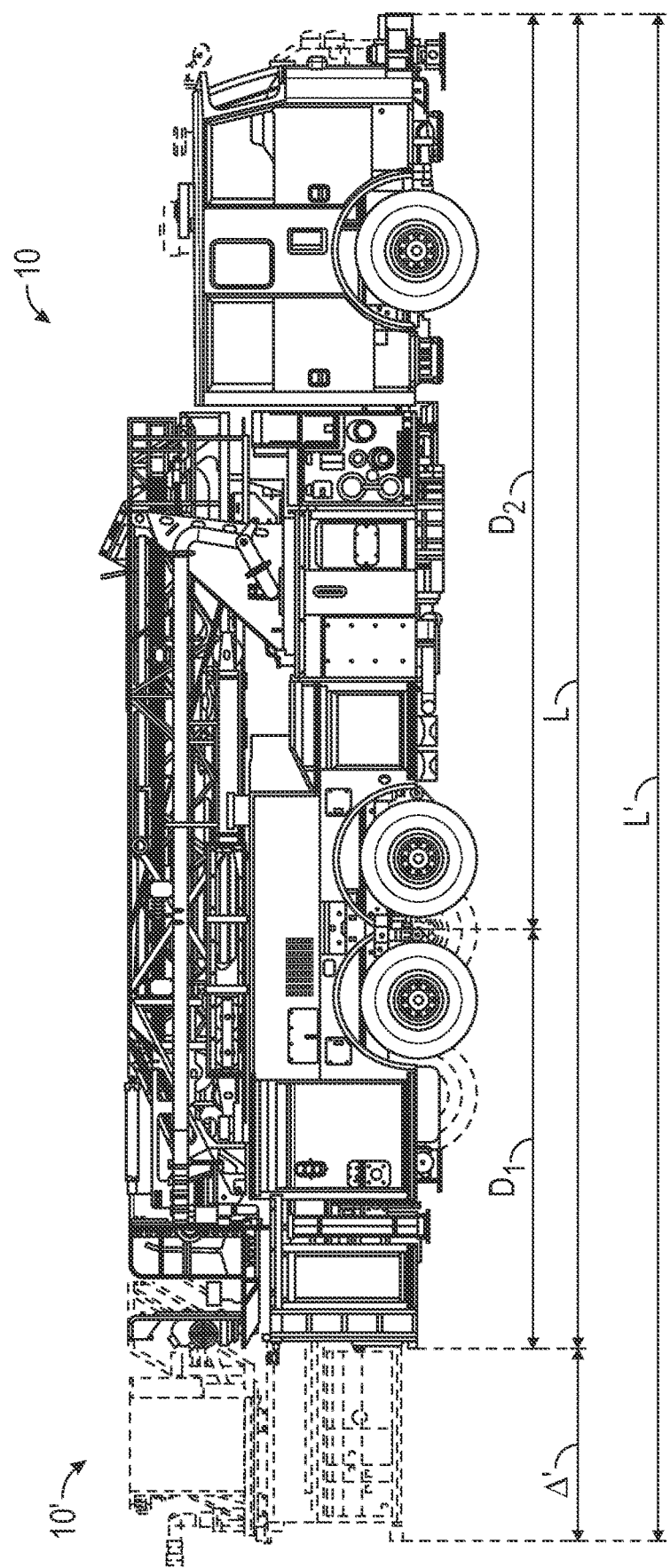
FIG. 8 is a side view of the mid-mount fire apparatus of FIG. 1 relative to a traditional mid-mount fire apparatus, according to an exemplary embodiment.
Figure 9:
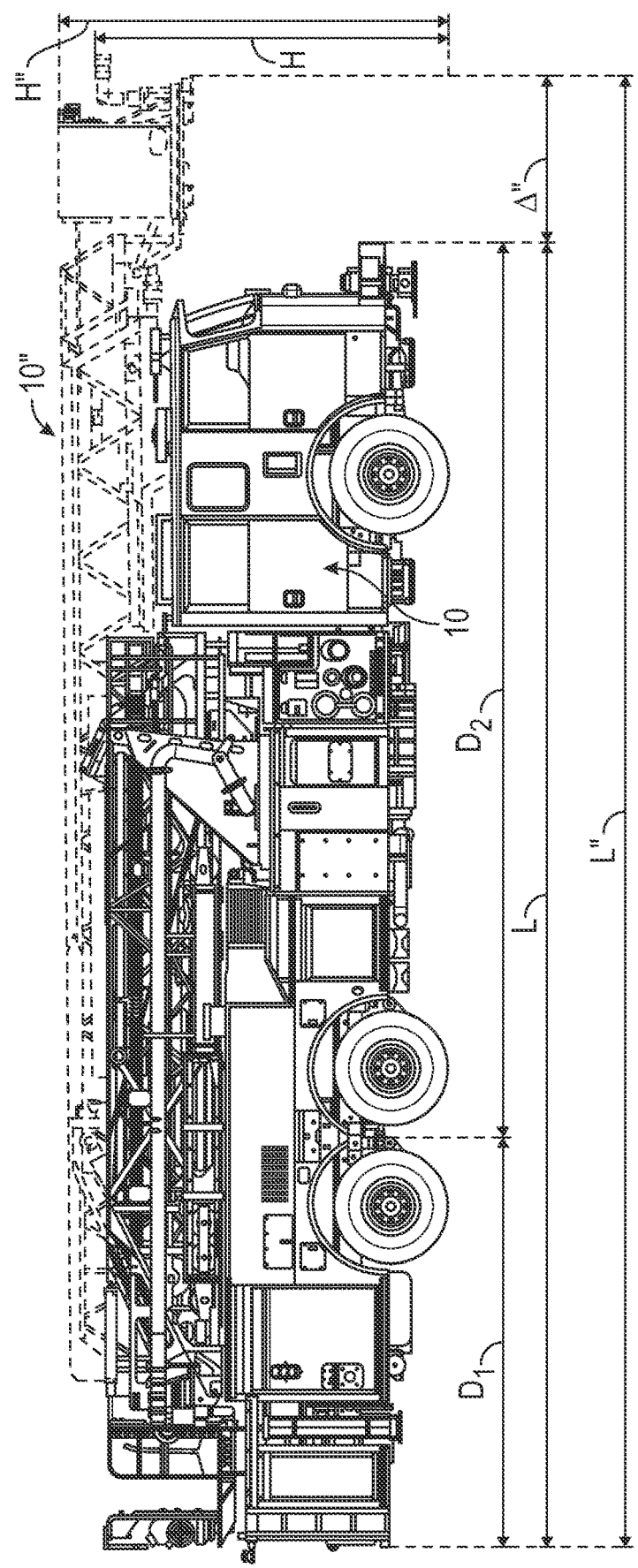
FIG. 9 is a side view of the mid-mount fire apparatus of FIG. 1 relative to a traditional rear-mount fire apparatus, according to an exemplary embodiment.

As shown in FIGS. 5 and 9, the fire apparatus 10 has a height H. According to an exemplary embodiment, the height H of the fire apparatus 10 is at most 128 inches (i.e., 10 feet, 8 inches). In other embodiments, the fire apparatus 10 has a height greater than 128 inches. As shown in FIGS. 8 and 9, the fire apparatus 10 has a longitudinal length L. According to an exemplary embodiment, the longitudinal length L of the fire apparatus 10 is at most 502 inches (i.e., 41 feet, 10 inches). In other embodiments, the fire apparatus 10 has a length L greater than 502 inches. As shown in FIGS. 8 and 9, the fire apparatus 10 has a distance $D_1$ between the rear end 4 of the body 110 and the middle of the tandem rear axles 18 (e.g., a body rear overhang portion, etc.). According to an exemplary embodiment, the distance $D_1$ of the fire apparatus 10 is at most 160 inches (i.e., 13 feet, 4 inches). In other embodiments, the fire apparatus 10 has a distance $D_1$ greater than 160 inches. As shown in FIGS. 8 and 9, the fire apparatus 10 has a distance $D_2$ between the front end 2 of the front cabin 20 (excluding the front bumper 22) and the middle of the tandem rear axles 18. According to an exemplary embodiment, the distance $D_2$ of the fire apparatus 10 is approximately twice or at least twice that of the distance $D_1$ (e.g., approximately 321 inches, approximately 323 inches, at least 320 inches, etc.).

As shown in FIG. 8, the longitudinal length L of the fire apparatus 10 is compared to the longitudinal length L' of a traditional mid-mount fire apparatus 10'. As shown in FIG. 8, when the front axles of the fire apparatus 10 and the fire apparatus 10' are aligned, the fire apparatus 10' extends beyond the longitudinal length L of the fire apparatus 10 a distance $\Delta'$. The distance $\Delta'$ may be approximately the same as the amount of the body 110 rearward of the tandem rear axles 18 of the fire apparatus 10 such that the amount of body rearward of the tandem rear axle of the fire apparatus 10' is approximately double that of the fire apparatus 10. Decreasing the amount of the body 110 rearward of the tandem rear axles 18 improves drivability and maneuverability, and substantially reduces the amount of damage that fire departments may inflict on public and/or private property throughout a year of operating their fire trucks.

One solution to reducing the overall length of a fire truck is to configure the fire truck as a rear-mount fire truck with the ladder assembly overhanging the front cabin (e.g., in order to provide a ladder assembly with comparable extension capabilities, etc.). As shown in FIG. 9, the longitudinal length L of the fire apparatus 10 is compared to the longitudinal length L' of a traditional rear-mount fire apparatus 10". As shown in FIG. 9, when the front axles of the fire apparatus 10 and the fire apparatus 10" are aligned, the ladder assembly of the fire apparatus 10" extends beyond the longitudinal length L of the fire apparatus 10 a distance Δ" such that the ladder assembly overhangs past the front cabin. Overhanging the ladder assembly reduces driver visibility, as well as rear-mount fire trucks do not provide as much freedom when arriving at a scene on where and how to position the truck, which typically requires the truck to be reversed into position to provide the desired amount of reach (e.g., which wastes valuable time, etc.). Further, the height H" of the fire apparatus 10" is required to be higher than the height H of the fire apparatus 10 (e.g., by approximately one foot, etc.) so that the ladder assembly of the fire apparatus 10" can clear the front cabin thereof.

Aerial Configuration

As shown in FIGS. 1-3, the over-retracted portions of the aerial ladder assembly 700 (e.g., the proximal ends of the lower middle section 900, the middle section 1000, the upper middle section 1100, the fly section 1200, etc.) extend forward of (i.e., past) (i) the lateral pivot axis 42 defined by the heel pin 520 and (ii) the proximal end of the base section 800 (i.e., the portion of the base section 800 that is coupled to the heel pin 520) along the longitudinal axis 14 of the fire apparatus 10 when the aerial ladder assembly 700 is retracted and stowed (e.g., such that at least one of the lower middle section 900, the middle section 1000, the upper middle section 1100, the fly section 1200, etc. spans across the lateral pivot axis 42 when the aerial ladder assembly 700 is retracted and stowed). Such over-retraction disposes the over-retracted portions of the aerial ladder assembly 700 to extend over the pump house 202 adjacent (i.e., rearward of) a rearmost wall of the front cabin 20. In other embodiments, at least a portion of the over-retracted portions of the aerial ladder assembly 700 extend past and forward of the rearmost wall of the front cabin 20 (e.g., in an embodiment where the rearmost cab wall is angled, notched, etc.). As shown in FIGS. 1 and 2, at least a portion of the plurality of nesting ladders sections (e.g., at least a base rail of the base section 800, the lower middle section 900, the middle section 1000, the upper middle section 1100, the fly section 1200, etc.) of the aerial ladder assembly 700 is positioned below the top (i.e., roof) of the front cabin 20 (e.g., when the aerial ladder assembly 700 is not pivoted/raised about the lateral pivot axis 42, etc.).

As shown in FIGS. 22-25, (i) the body 110 of the rear assembly 100 within the aerial assembly recess 140 is shaped, (ii) the pump house 202 adjacent the aerial assembly recess 140 is shaped, (iii) the water tank 400 adjacent the aerial assembly recess 140 is shaped, and/or (iv) the outriggers 1700 extend at negative depression angle γ from the body 110 to facilitate a substantial aerial work envelope of the aerial ladder assembly 700, shown as scrub area 730. Such component configurations facilitate operation of the aerial ladder assembly 700 at a negative depression angle below grade (e.g., below horizontal, etc.) of up to an angle θ. According to an exemplary embodiment, the angle θ is approximately negative fifteen degrees. In other embodiments, the angle θ is greater than fifteen degrees (e.g., eighteen, twenty, etc. degrees) or less than fifteen degrees (e.g., ten, twelve, fourteen, etc. degrees). In some embodiments, the angle θ is at least greater than eight degrees.

Figure 22:
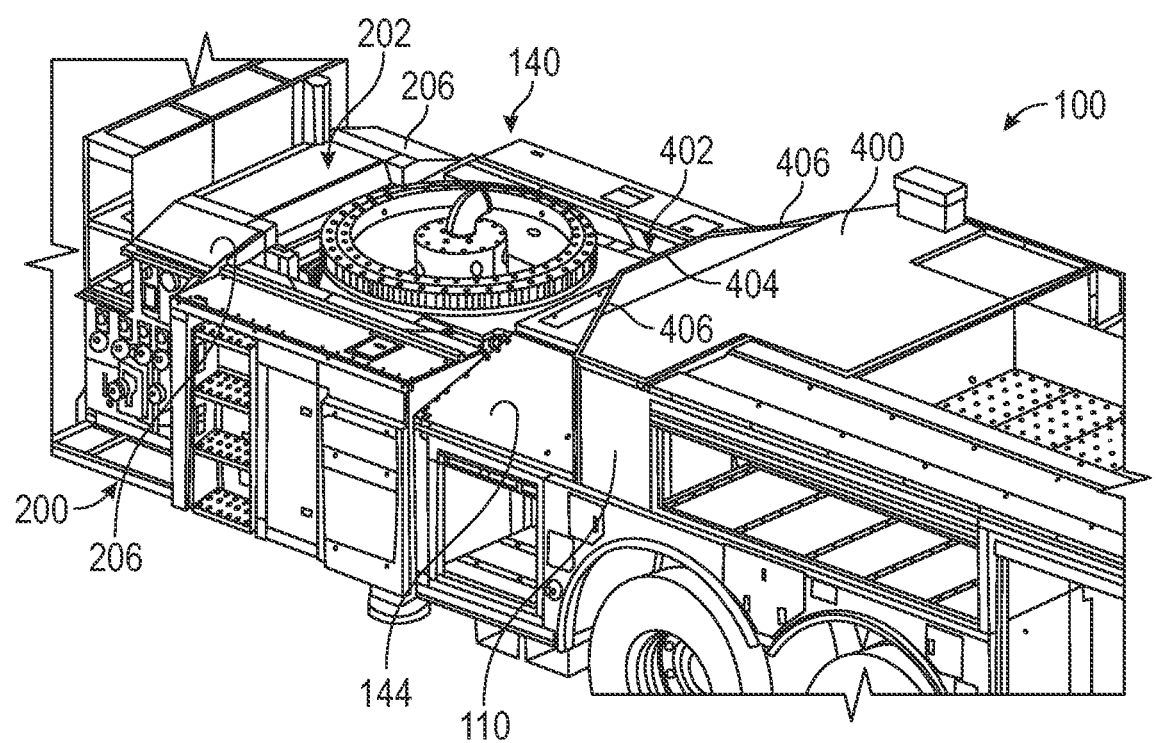
FIG. 22 is a detailed perspective view of an aerial assembly recess of the mid-mount fire apparatus of FIG. 1, according to an exemplary embodiment.
Figure 24:
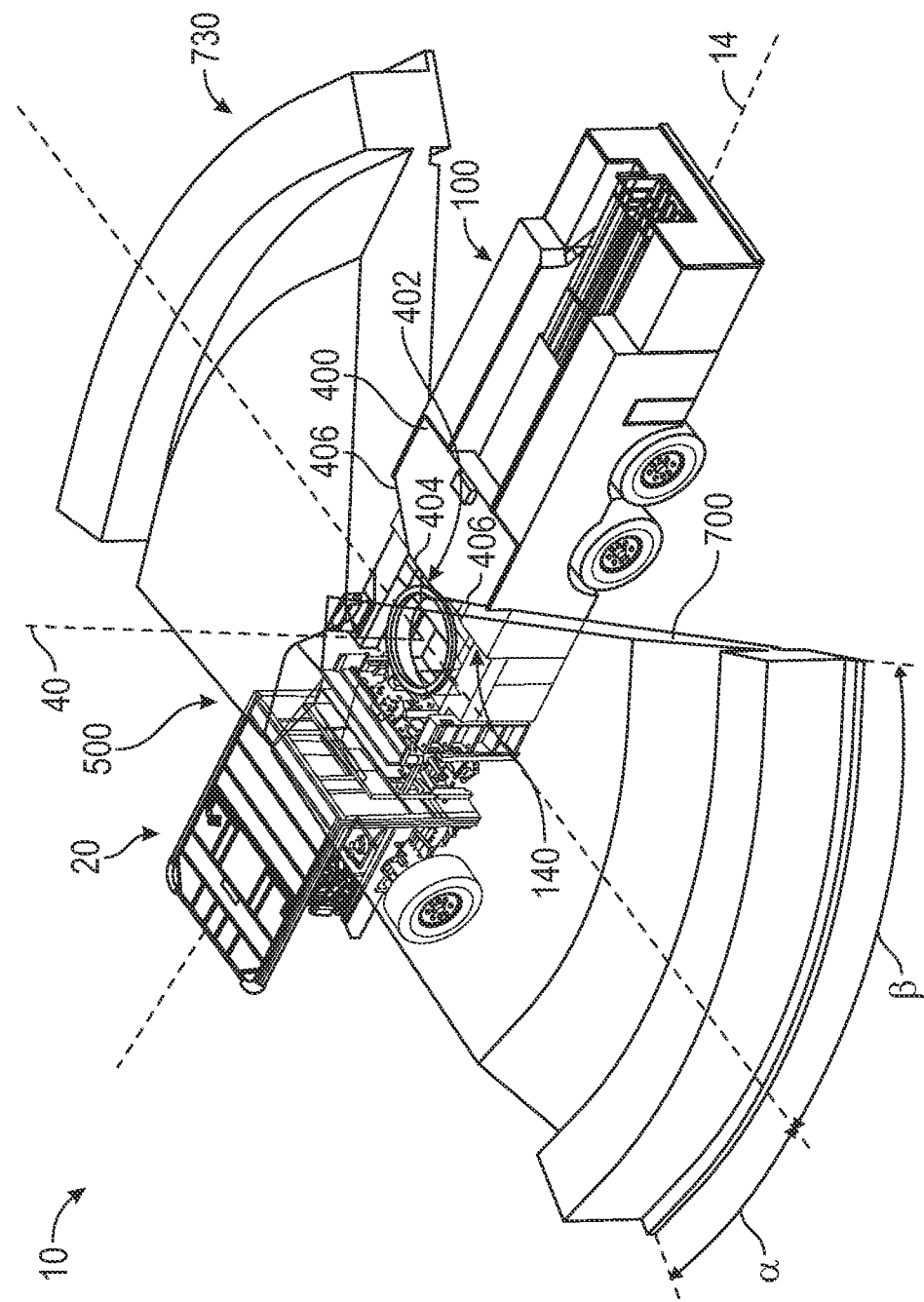

As shown in FIG. 22, the body 110 of the rear assembly 100 includes first angled portions, shown as angled body panels 144, extending at a negative, downward angle within the aerial assembly recess 140. The pump house 202 of the pump system 200 includes second angled portions, shown as angled pump house panels 206, extending at a negative, downward angle within the aerial assembly recess 140. As shown in FIGS. 22 and 24, the water tank 400 has a wall, shown as frontmost wall 402, adjacent the aerial assembly recess 140. The frontmost wall 402 includes a pair of third angled portions, shown as angled wall portions 406, extending from a wall portion perpendicular to the longitudinal axis 14, shown as perpendicular wall portion 404, at a rearward angle (e.g., towards the rear end 4 of the fire apparatus 10, etc.). According to an exemplary embodiment, the angle γ of the outriggers 1700 is approximately in the range of negative eight to negative twelve degrees relative to a horizontal axis. In other embodiments, the angle γ is greater than twelve degrees (e.g., fifteen degrees, etc.) or less than eight degrees (e.g., five degrees, zero degrees, etc.).

Figure 23:
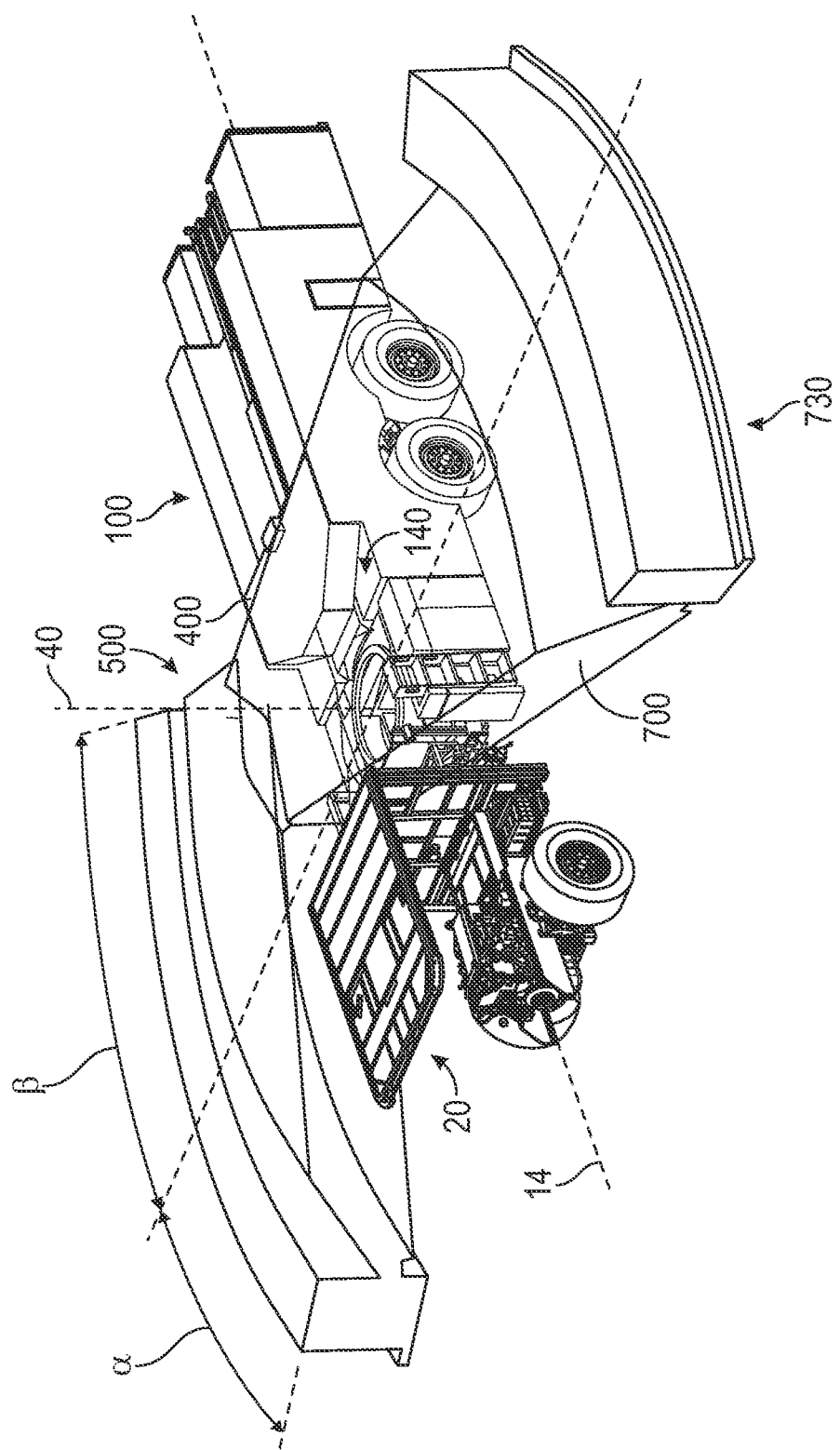
FIGS. 23 and 24 are various perspective views of a scrub area of an aerial assembly of the mid-mount fire apparatus of FIG. 1, according to an exemplary embodiment.

According to an exemplary embodiment, the angled body panels 144 of the body 110, the angled pump house panels 206 of the pump house 202, the angled wall portions 406 of the water tank 400, and/or the angle γ of the outriggers 1700 facilitate operating the aerial ladder assembly within the scrub area 730 up to the angle θ. As shown in FIGS. 23 and 24, the aerial ladder assembly 700 is operable within the scrub area 730 below grade (e.g., at any angle below zero degrees up to angle θ, etc.) about the vertical pivot axis 40 up to (i) an angle α forward of the aerial ladder assembly 700 being perpendicular to the longitudinal axis 14 and (ii) an angle β rearward of the aerial ladder assembly 700 being perpendicular to the longitudinal axis 14. According to an exemplary embodiment, the angle α is approximately twenty degrees. In other embodiments, the angle α is greater than twenty degrees (e.g., twenty-two, twenty-five, thirty, etc. degrees) or less than twenty degrees (e.g., ten, fifteen, eighteen, etc. degrees). According to an exemplary embodiment, the angle β is approximately thirty degrees. In other embodiments, the angle β is greater than thirty degrees (e.g., thirty-two, thirty-five, etc. degrees) or less than thirty degrees (e.g., fifteen, twenty, twenty-five, etc. degrees). The scrub area 730 may therefore have a total sweep angle (e.g., the aggregate of the angle α and the angle β, etc.) of approximately fifty degrees. In other embodiments, the sweep angle of the scrub area 730 is at least more than fifteen degrees. In still other embodiments, the sweep angle of the scrub area 730 is at least more than thirty degrees.

Figure 25:
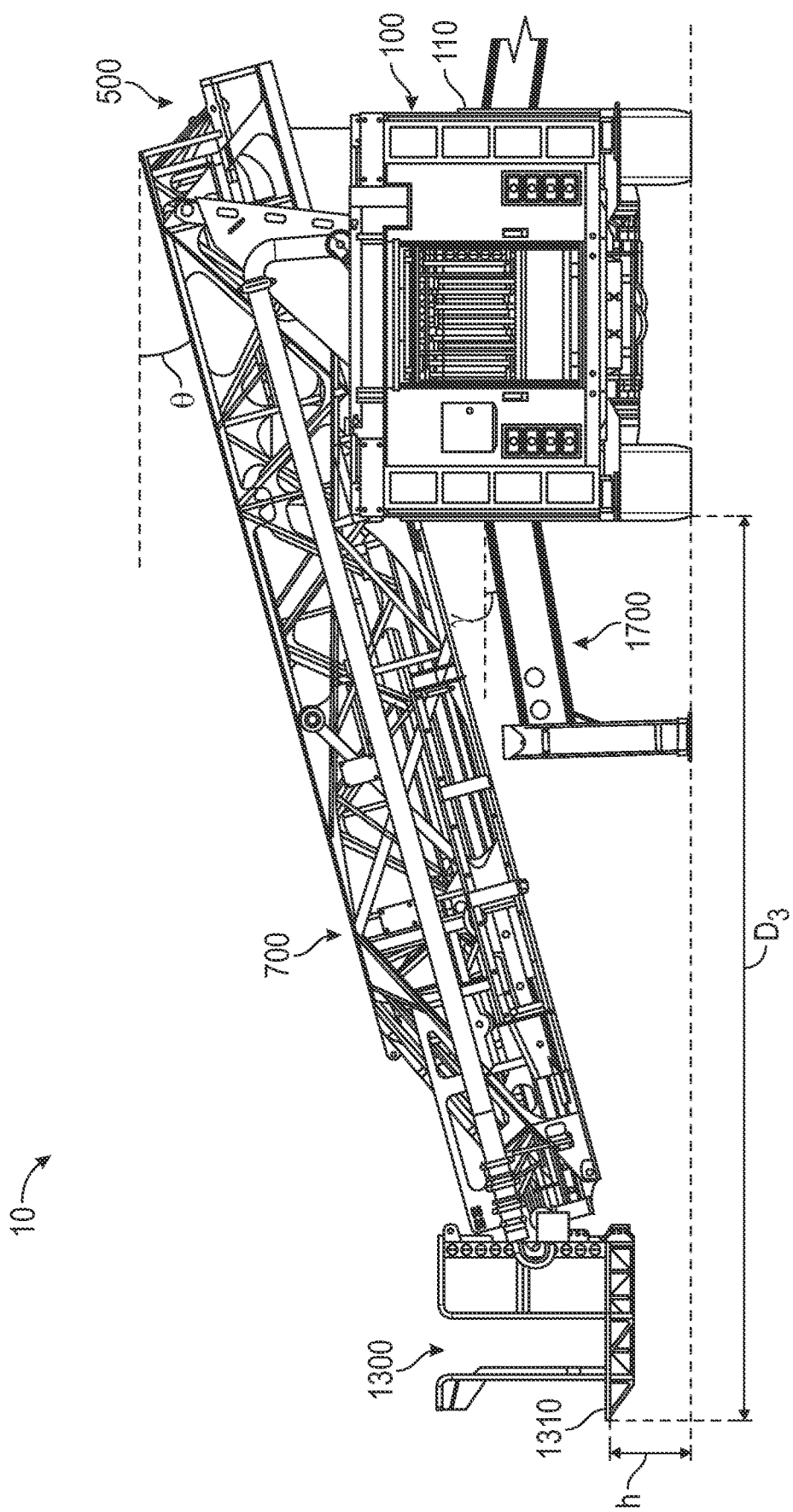
FIG. 25 is a rear view of the mid-mount fire apparatus of FIG. 1 having an aerial assembly at a negative depression angle, according to an exemplary embodiment.

As shown in FIG. 25, the aerial ladder assembly 700 is oriented to extend perpendicularly from the body 110 of the rear assembly 100 (e.g., the aerial ladder assembly 700 is perpendicular relative to the longitudinal axis 14, etc.) and is positioned below grade at the angle θ (e.g., negative fifteen degrees, etc.). When configured in such a position, the aerial ladder assembly 700 extends from the side of the body 110 a distance $D_3$, and the basket platform 1310 of the work basket 1300 is positioned at a height h above a ground surface while none of the plurality of nesting ladder sections (e.g., the lower middle section 900, the middle section 1000, the upper middle section 1100, the fly section 1200, etc.) are extended (e.g., the lower middle section 900, the middle section 1000, the upper middle section 1100, and the fly section 1200 are over-retracted relative to the base section 800 and the heel pin 520, etc.). According to an exemplary embodiment, being able to operate at the angle θ and the over-retracting configuration of the plurality of nesting ladder sections of the aerial ladder assembly 700 facilitate accessing the work basket 1300 from the ground surface without requiring the extension of the aerial ladder assembly 700. The height h of the basket platform 1310 is at most 20.3 inches, according to an exemplary embodiment (e.g., meeting the maximum step height limit as set by NFPA regulations, without requiring extension of the aerial ladder assembly 700, etc.). In some embodiments, the height h is less than 20.3 inches (e.g., in embodiments where the stability assembly 1400 of the fire apparatus 10 has a leaning capability, etc.). According to an exemplary embodiment, the distance $D_3$ is approximately 19.5 feet. In other embodiments, the distance $D_3$ is greater than 19.5 feet (e.g., 20 feet, 22 feet, in embodiments with a longer aerial ladder assembly 700, etc.) or less than 19.5 feet (e.g., 19 feet, 18.5 feet, etc.).

Figure 26:
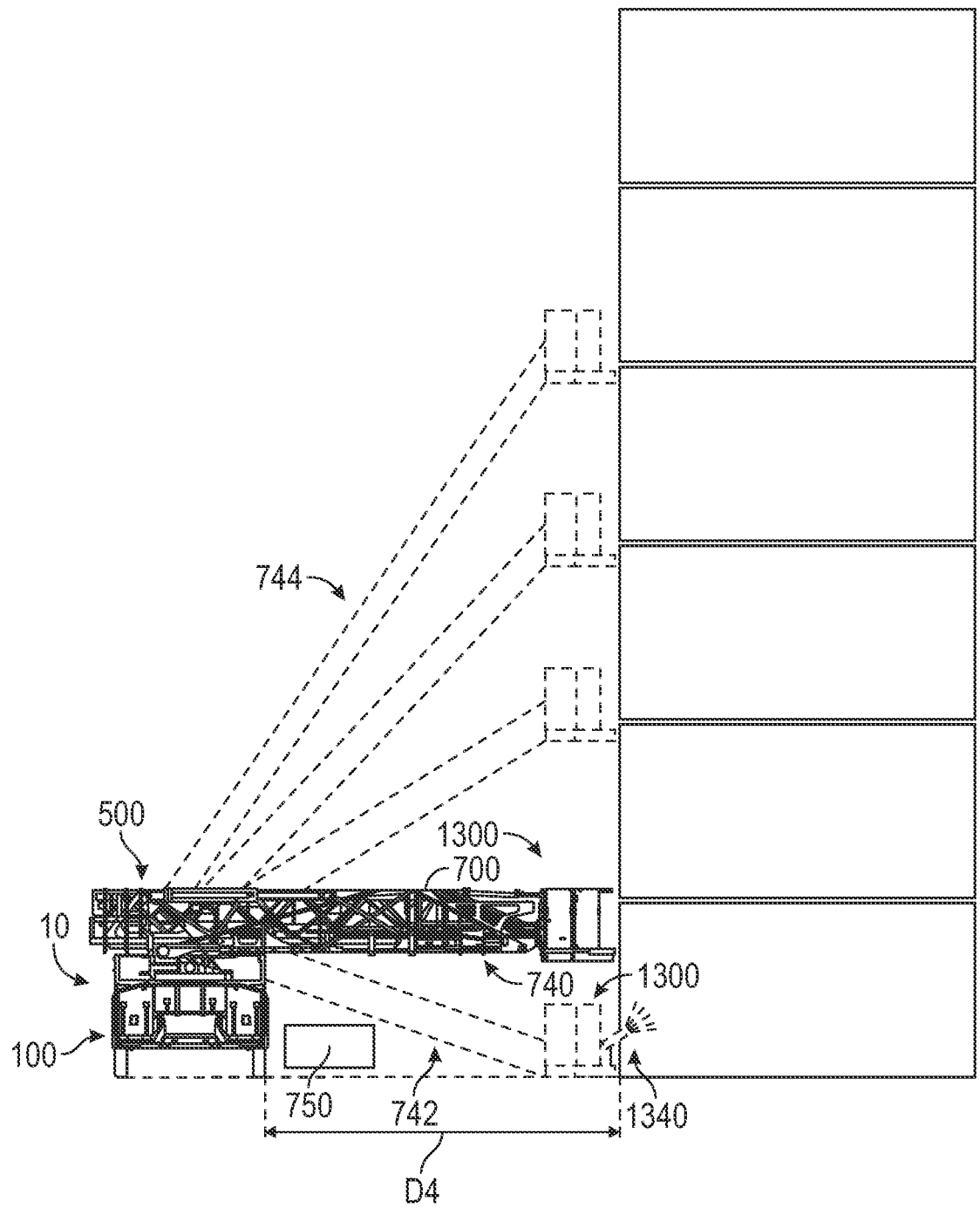
FIG. 26 is a front view of an aerial assembly of the mid-mount fire apparatus of FIG. 1 in a plurality of configurations, according to an exemplary embodiment.

As shown in FIG. 26, the aerial ladder assembly 700 is pivotable about the lateral pivot axis 42 to reposition the aerial ladder assembly 700 at a plurality of different positions including a horizontal position, shown as horizontal set-back configuration 740, a below grade position, shown as blitz configuration 742, and a plurality of above grade positions, shown as raised configurations 744. As shown in FIG. 26, when the aerial ladder assembly 700 is arranged in the horizontal set-back configuration 740 and the longitudinal axis 14 of the fire apparatus 10 is positioned parallel or substantially parallel with a fire scene (e.g., a house, a building, an apartment, etc.), the aerial ladder assembly 700 extends from the side of the body 110 a set-back distance $D_4$. According to an exemplary embodiment, the set-back distance $D_4$ is approximately twenty feet. In other embodiments, the set-back distance $D_4$ is greater than twenty feet (e.g., twenty-seven feet, in an embodiment where the aerial ladder assembly 700 includes a side-mounted e-trac versus a rung-mounted e-trac, etc.) or less than twenty feet (e.g., in embodiments where the fire apparatus 10 includes a shorter aerial ladder assembly 700, in embodiments where the aerial ladder assembly 700 does not include the work basket 1300, etc.; fifteen, sixteen, seventeen, eighteen, nineteen, etc. feet).

As shown in FIG. 26, when the aerial ladder assembly 700 is arranged in the blitz configuration 742, the aerial ladder assembly 700 is oriented at a negative depression angle (e.g., up to the angle θ, etc.) such that the work basket 1300 is positioned substantially close to the ground surface and adjacent the fire scene (e.g., the first level of a building, a store front, etc.). In the blitz configuration 742, the work basket 1300 may be extended from the rear assembly 100 by pivoting the aerial ladder assembly 700 about the vertical pivot axis 40 toward the fire scene and then pivoting aerial ladder assembly 700 about the lateral pivot axis 42 such that the work basket 1300 clears any obstacles 750 (e.g., cars, etc.) positioned in front of the fire scene. A turret, shown as water turret 1340, that is coupled to the work basket 1300 may be manipulated (e.g., using a user input device of the fire apparatus 10, the control console 600, etc.) to expel water or another fire surprising agent from the water tank 400 or other source (e.g., a fire hydrant, an agent tank, etc.) into the first level of the fire scene upward at the ceiling thereof to expel a fire therein (e.g., to prevent a fire from spreading to the upper levels of the building, etc.). In other embodiments, the water turret 1340 is otherwise positioned (e.g., coupled to the distal end of the fly section 1200, in embodiments where the aerial ladder assembly 700 does not include the work basket 1300, etc.).

As shown in FIG. 26, when the aerial ladder assembly 700 is arranged in the raised configurations 744, the aerial ladder assembly 700 is oriented at a positive angle such that the work basket 1300 is positioned above the fire apparatus 10. To extend further in the vertical direction, the plurality of nesting sections of the aerial ladder assembly 700 may begin to be extended. In order to un-bed the aerial ladder assembly 700 (e.g., pivot the aerial ladder assembly 700 upward, etc.), the over-retracted portions of the aerial ladder assembly 700 may need to be extended past the heel pin 520. Such may require that the fire apparatus 10 be set back a distance slightly further than the set-back distance $D_4$ (e.g., twenty-four feet, etc.).

Figure 27:
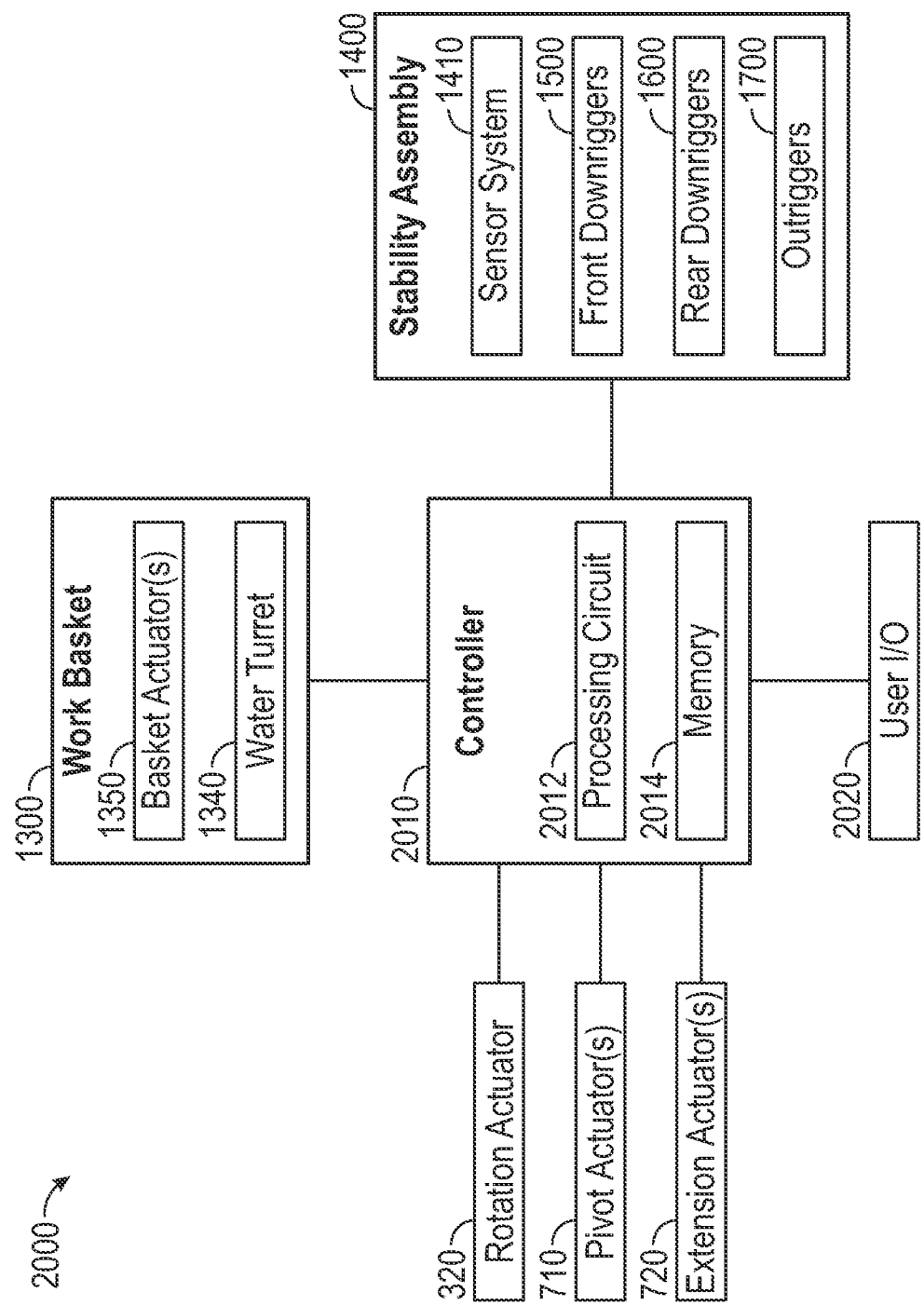
FIG. 27 is a block diagram of a control system of the mid-mount fire apparatus of FIG. 1, according to an exemplary embodiment.

According to the exemplary embodiment shown in FIG. 27, a control system, shown as fire apparatus control system 2000, for the fire apparatus 10 includes a controller 2010. In one embodiment, the controller 2010 is configured to selectively engage, selectively disengage, control, and/or otherwise communicate with components of the fire apparatus 10. As shown in FIG. 27, the controller 2010 is coupled to the rotation actuator 320, the pivot actuator(s) 710, the extension actuator(s) 720, the water turret 1340, basket actuator(s) 1350 positioned to manipulate the work basket 1300 (e.g., a rotation actuator, a pivot actuator, a lift actuator, an extension actuator, etc.) relative to the distal end of the fly section 1200 of the aerial ladder assembly 700, the stability assembly 1400 (e.g., a sensor system 1410, the front downriggers 1500, the rear downriggers 1600, the outriggers 1700, etc.), and a user input/output ("I/O") device 2020. In other embodiments, the controller 2010 is coupled to more or fewer components. By way of example, the controller 2010 may send and/or receive signals with the rotation actuator 320, the pivot actuator(s) 710, the extension actuator(s) 720, the water turret 1340, the basket actuator(s) 1350, the stability assembly 1400, and/or the user I/O device 2020, and/or individual components thereof.

The controller 2010 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 27, the controller 2010 includes a processing circuit 2012 and a memory 2014. The processing circuit 2012 may include an ASIC, one or more FPGAs, a DSP, circuits containing one or more processing components, circuitry for supporting a microprocessor, a group of processing components, or other suitable electronic processing components. In some embodiments, the processing circuit 2012 is configured to execute computer code stored in the memory 2014 to facilitate the activities described herein. The memory 2014 may be any volatile or non-volatile computer-readable storage medium capable of storing data or computer code relating to the activities described herein. According to an exemplary embodiment, the memory 2014 includes computer code modules (e.g., executable code, object code, source code, script code, machine code, etc.) configured for execution by the processing circuit 2012. In some embodiments, controller 2010 represents a collection of processing devices (e.g., servers, data centers, etc.). In such cases, the processing circuit 2012 represents the collective processors of the devices, and the memory 2014 represents the collective storage devices of the devices.

In one embodiment, the user I/O device 2020 includes a display and an operator input. The display may be configured to display a graphical user interface, an image, an icon, and/or still other information. In one embodiment, the display includes a graphical user interface configured to provide general information about the fire apparatus 10 (e.g., vehicle speed, fuel level, warning lights, battery level, etc.). The graphical user interface may also be configured to display a current position of the aerial ladder assembly 700, a current position of the work basket 1300, a current position of the turntable 510, an orientation of the fire apparatus 10 (e.g., an angle relative to a ground surface, etc.), a current configuration and/or positions of components of the stability assembly 1400, and/or still other information relating to the fire apparatus 10, the aerial assembly 500, and/or the stability assembly 1400. The user I/O device 2020 may be or include the control console 600, a user interface within the front cabin 20, a user interface in the work basket 1300, a user interface on the side of the body 110, and/or a portable device wirelessly connected to the controller 2010 (e.g., a mobile device, a smartphone, a tablet, etc.).

The operator input may be used by an operator to provide commands to at least one of the rotation actuator 320, the pivot actuator(s) 710, the extension actuator(s) 720, the water turret 1340, and the basket actuator(s) 1350. The operator input may include one or more buttons, knobs, touchscreens, switches, levers, joysticks, pedals, a steering wheel, or handles. The operator input may facilitate manual control of some or all aspects of the operation of the fire apparatus 10. It should be understood that any type of display or input controls may be implemented with the systems and methods described herein.

According to an exemplary embodiment, the controller 2010 is configured to limit activation of the pivot actuators 710 while the proximal ends of the plurality of nesting ladder sections of the aerial ladder assembly 700 are over-retracted beyond the heel pin 520. By way of example, the controller 2010 may be configured to automatically extend the plurality of nesting ladder sections forward until the proximal ends of each extends along the base section 800 beyond the heel pin 520 (e.g., in response to a lift command while the ladder sections are over-retracted), and then begin pivoting the aerial ladder assembly about the lateral pivot axis 42 and/or continue extending the plurality of nesting ladder sections (e.g., if an extension command is being provided by an operator using the user I/O device 2020, to limit or prevent the risk of the over-retracted portions from pivoting into the work platform 550, etc.).

Stability Assembly

According to an exemplary embodiment, the front downriggers 1500, the rear downriggers 1600, and the outriggers 1700 of the stability assembly 1400 are configured to assist in providing the horizontal and vertical reach capabilities of the aerial ladder assembly 700 and facilitate leveling the fire apparatus 10 when on uneven ground.

Figure 28:
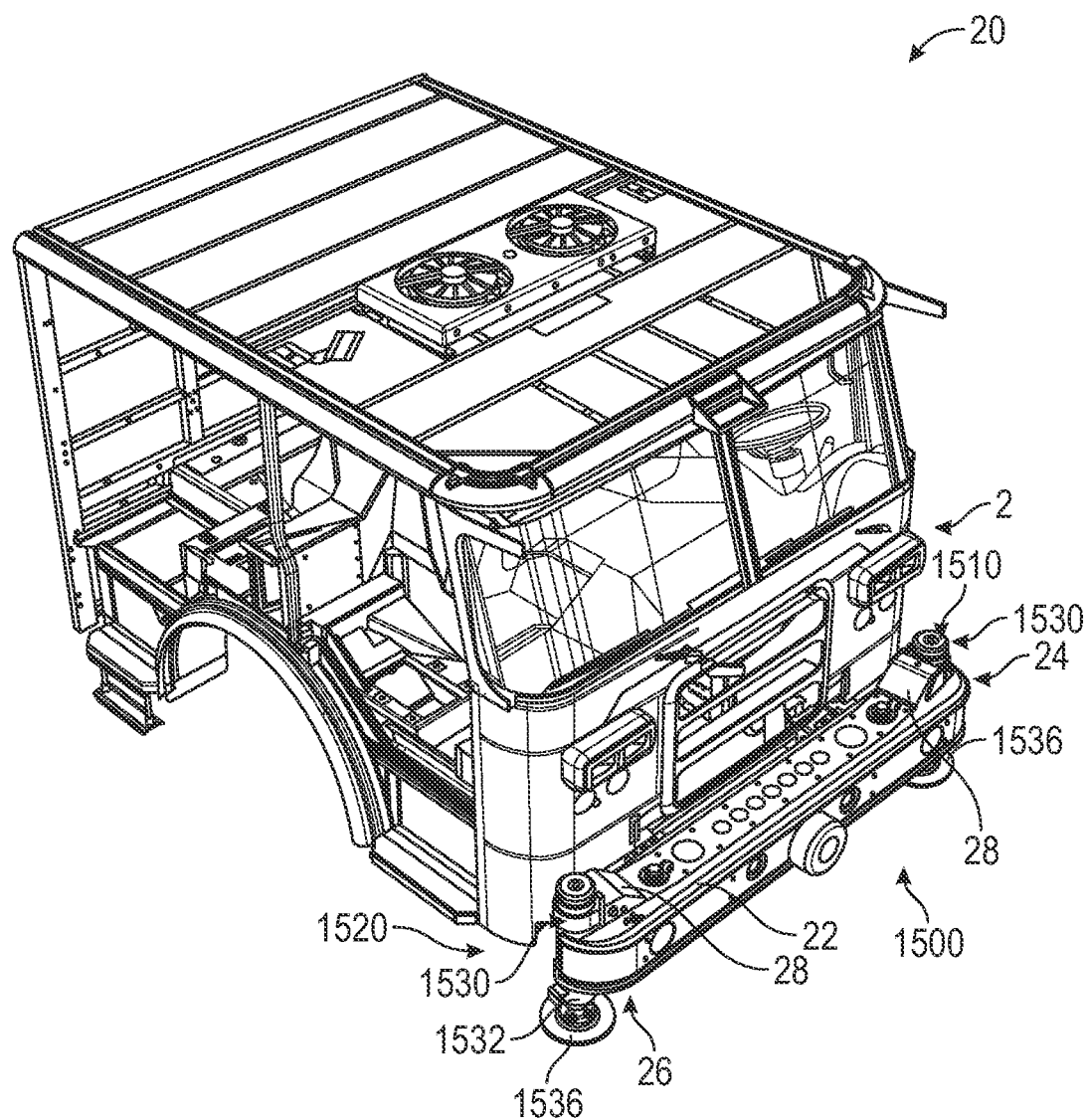
FIG. 28 is a perspective view of a front downrigger assembly of the mid-mount fire apparatus of FIG. 1, according to an exemplary embodiment.

As shown in FIGS. 28-31, the front downriggers 1500 include a first downrigger, shown as first front downrigger 1510, and a second downrigger, shown second front downrigger 1520. In an alternative embodiment, the front downriggers 1500 are replaced with a single front stability foot or the fire apparatus 10 does not include the front downriggers 1500. As shown in FIGS. 28-31, each of the first front downrigger 1510 and the second front downrigger 1520 includes a first actuator assembly, shown as front actuator assembly 1530. According to an exemplary embodiment, the front actuator assemblies 1530 are or include hydraulic actuators. In other embodiments, the front actuator assemblies 1530 are or include pneumatic actuators, electric actuators, and/or mechanically-driven actuators. As shown in FIGS. 28,29, and 31, each of the front actuator assemblies 1530 includes a front extension actuator having a first portion, shown as cylinder housing 1532, and a second portion, shown as rod 1534, with a plate, shown as foot plate 1536, coupled to an end of the rod 1534. According to an exemplary embodiment, the rods 1534 are selectively extendable from the cylinder housings 1532 such that the foot plates 1536 and/or ground pads coupled thereto engage a ground surface.

As shown in FIGS. 28-32, the front bumper 22 has a first lateral end, shown as left end 24, and an opposing second lateral end, shown as right end 26. As shown in FIGS. 28,29, and 31, the front bumper 22 include a coupler, shown as bracket 28, coupled to each of the left end 24 and the right end 26 of the front bumper 22. A first bracket 28 couples the first front downrigger 1510 to the left end 24 of the front bumper 22 and a second bracket 28 couples the second front downrigger 1520 to the right end 26 of the front bumper 22.

Figure 33:
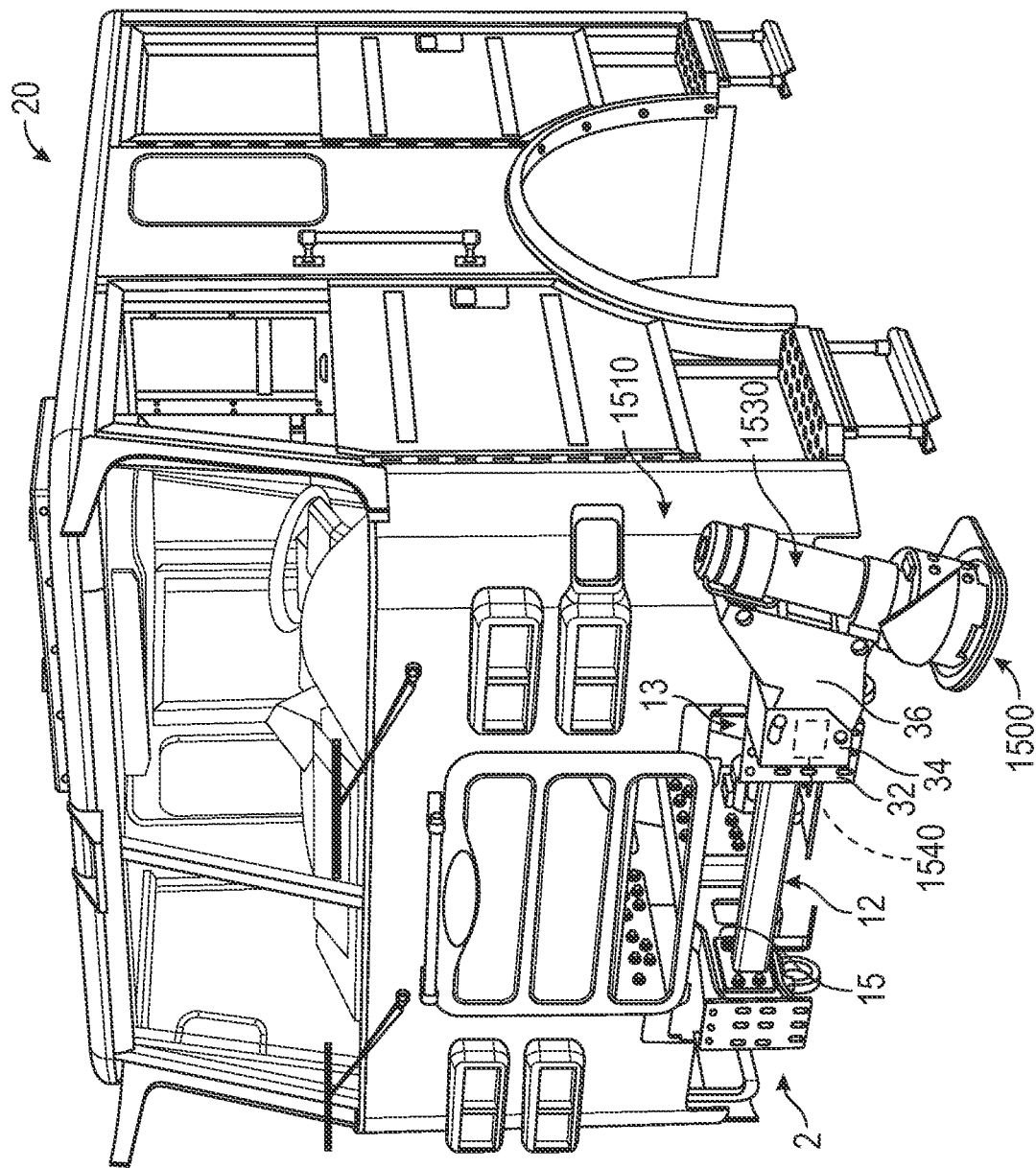
FIG. 33 is a perspective view of the front downrigger assembly of FIG. 32 in a second orientation, according to an exemplary embodiment.
Figure 34:
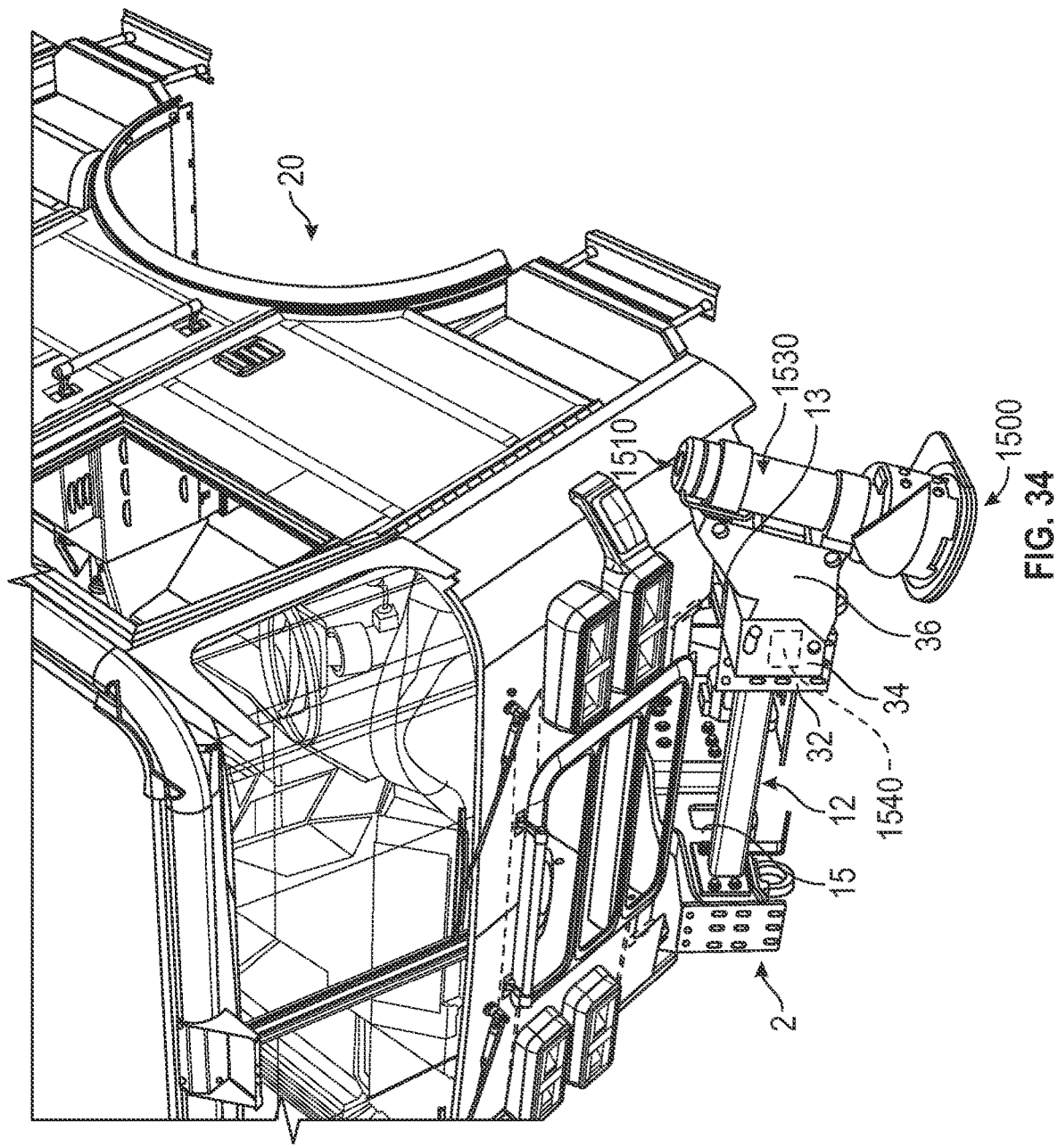
FIG. 34 is a perspective view of a cab of the mid-mount fire apparatus of FIG. 1 pivoted with the front downrigger assembly of FIG. 32 in the second orientation, according to an exemplary embodiment.

As shown in FIGS. 32-34, the front downriggers 1500 are pivotally coupled to the frame 12 of the fire apparatus 10. Specifically, the first front downrigger 1510 is pivotally coupled to a first frame rail 13 of the frame 12 and the second front downrigger is pivotally coupled to a second frame rail 15 of the frame 12. As shown in FIGS. 32-34, the first frame rail 13 has a plate, shown as coupling plate 32, coupled to the front end 2 thereof. A housing, shown as bracket housing 34, is coupled to the coupling plate 32. A bracket, shown as pivotal bracket 36, is received by and pivotally coupled to the bracket housing 34. The pivotal bracket 36 is coupled to the front actuator assembly 1530 of the first front downrigger 1510 such that the first front downrigger 1510 is selectively pivotable therewith between an extension orientation (see, e.g., FIG. 32) and a pivoted orientation (see, e.g., FIGS. 33 and 34). An actuator, shown as pivoting actuator 1540, is positioned to facilitate selectively actuating the first front downrigger 1510 between the extension orientation and the pivoted orientation (e.g., automatically, etc.). In other embodiments, the first front downrigger 1510 is manually pivotable between the extension orientation and the pivoted orientation. According to an exemplary embodiment, the second front downrigger 1520 is similarly coupled to and pivotable relative to the second frame rail 15.

As shown in FIG. 34, the front cabin 20 is pivotable about the front end 2 of the frame 12 when the front downriggers 1500 are pivoted into the pivoted orientation. According to an exemplary embodiment, the first front downrigger 1510 and the second front downrigger 1520 are configured to automatically pivot into the pivoted orientation when the front cabin 20 is pivoted upward about the front end 2 of the frame 12 (e.g., such that the front downriggers 1500 do not impede the lifting of the front cabin 20, etc.). By way of example, the pivoting actuators 1540 positioned to pivot the front downriggers 1500 and an actuator that is positioned to pivot the front cabin 20 may be linked (e.g., hydraulically coupled, fluidly coupled, etc.) such that activation of one activates the other or both are driven by a common source. By way of another example, the controller 2010 may be configured to limit or prevent pivoting of the front cabin 20 until the pivoting actuators 1540 have been engaged to pivot the front downriggers 1500 into the pivoted orientation.

According to an exemplary embodiment, the pivoting capability of the front downriggers 1500 facilitates raising the front downriggers 1500 higher up the front the front cabin 20 relative to a ground surface (e.g., compared to the arrangement in FIGS. 28-31 coupled to the front bumper 22, etc.), effectively increasing the ground clearance of the fire apparatus 10 and thereby the angle of inclines that the fire apparatus 10 may traverse (e.g., increasing drivability, maneuverability, etc. of the fire apparatus 10).

Figure 35:
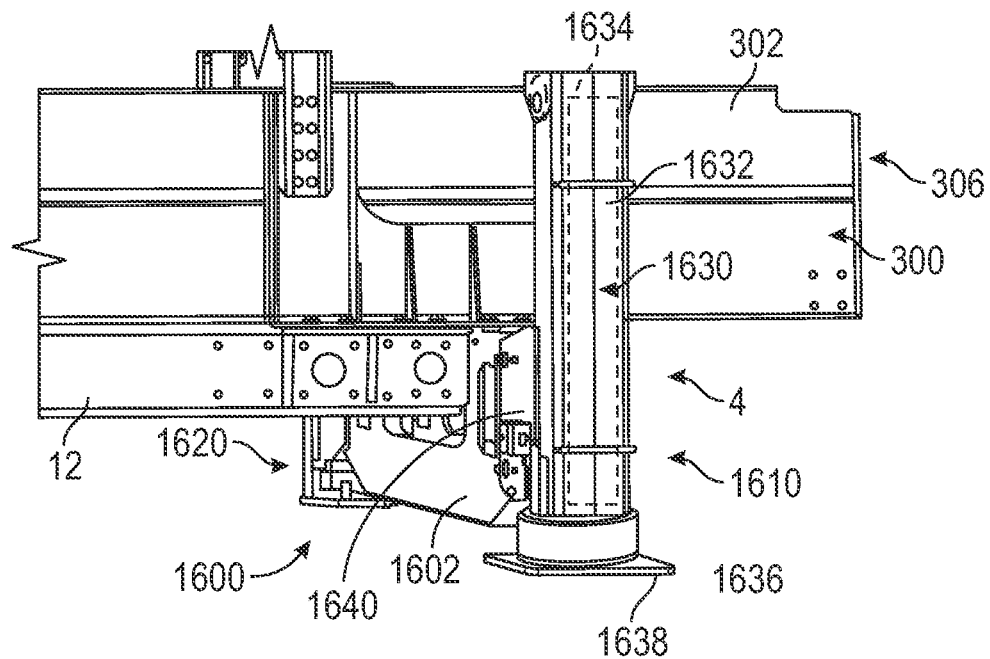
FIGS. 35-37 are various views of a rear downrigger assembly of the mid-mount fire apparatus of FIG. 1, according to an exemplary embodiment.
Figure 36:
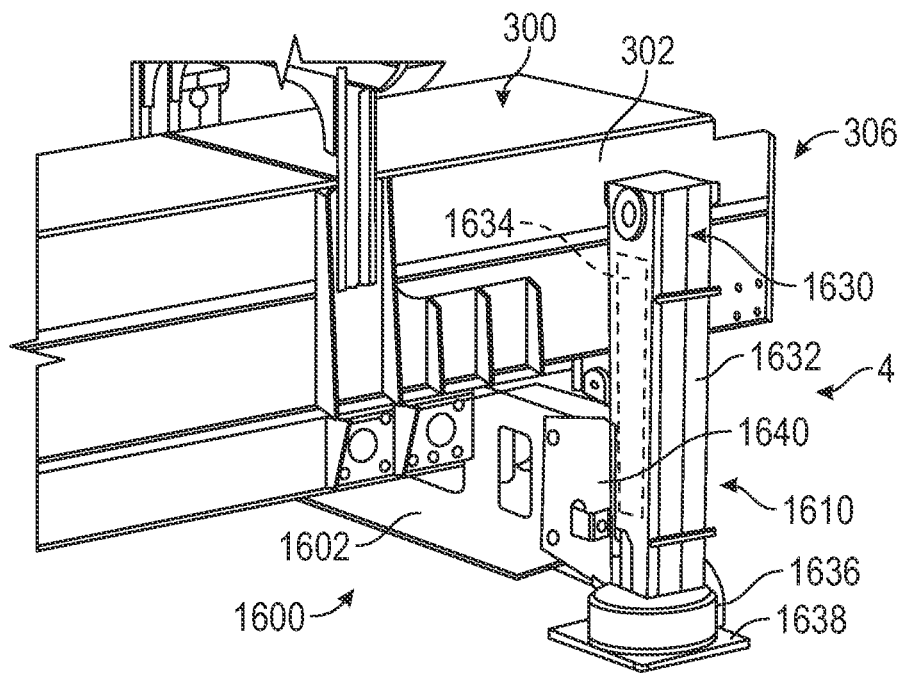
Figure 37:
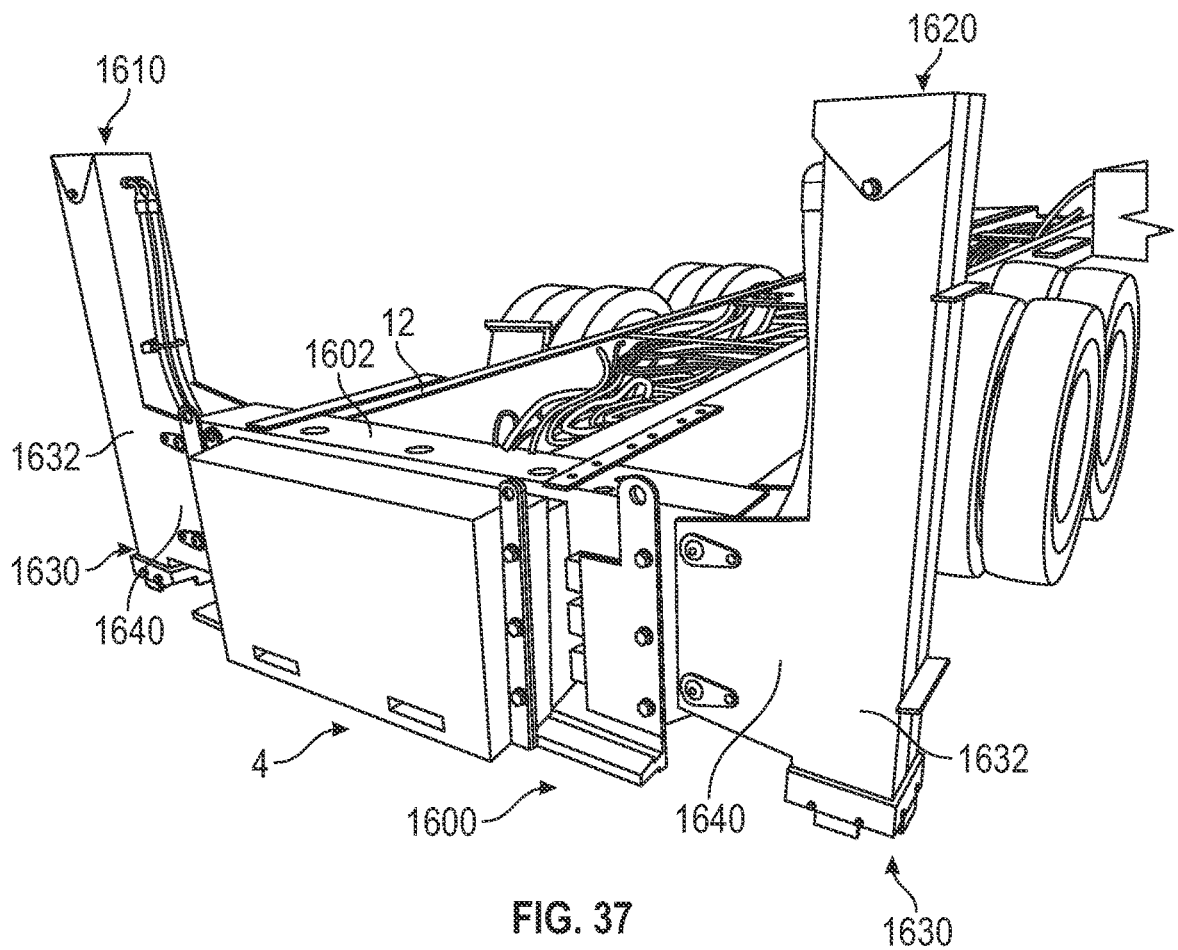

As shown in FIGS. 35-37, the rear downriggers 1600 include a third downrigger, shown as first rear downrigger 1610, and a fourth downrigger, shown second rear downrigger 1620. In an alternative embodiment, the rear downriggers 1600 are replaced with a single rear stability foot. As shown in FIGS. 35-37, each of the first rear downrigger 1610 and the second rear downrigger 1620 includes a second actuator assembly, shown as rear actuator assembly 1630. Each of the rear actuator assemblies 1630 includes a housing, shown as rear actuator receiver 1632, defining an internal cavity that receives an actuator, shown as rear extension actuator 1634. According to an exemplary embodiment, the rear extension actuators 1634 are or include hydraulic actuators. In other embodiments, the rear extension actuators 1634 are or include pneumatic actuators, electric actuators, and/or mechanically-driven actuators. As shown in FIGS. 35 and 36, each of the rear actuator assemblies 1630 includes a foot, shown as rear foot 1636, coupled to an end of the rear extension actuator 1634 and a pad, shown as rear ground pad 1638, coupled to the rear foot 1636. According to an exemplary embodiment, the rear extension actuators 1634 are selectively extendable from the rear actuator receivers 1632 such that the rear ground pads 1638 engage a ground surface.

As shown in FIGS. 35-37, each of the rear actuator assemblies 1630 includes a bracket, shown as rear bracket 1640, extending laterally from each of the rear actuator receivers 1632. The rear brackets 1640 are configured to couple the first rear downrigger 1610 and the second rear downrigger 1620, respectively, to opposing lateral sides of a support, shown as rear downrigger support 1602, coupled the rear end 4 of the frame 12, beneath the body 302 of the torque box 300, and forward of the rear end 306 of the torque box 300. The rear downrigger support 1602 is therefore configured to secure the rear downriggers 1600 to the frame 12, rearward of the rear axles 18.

Figure 38:
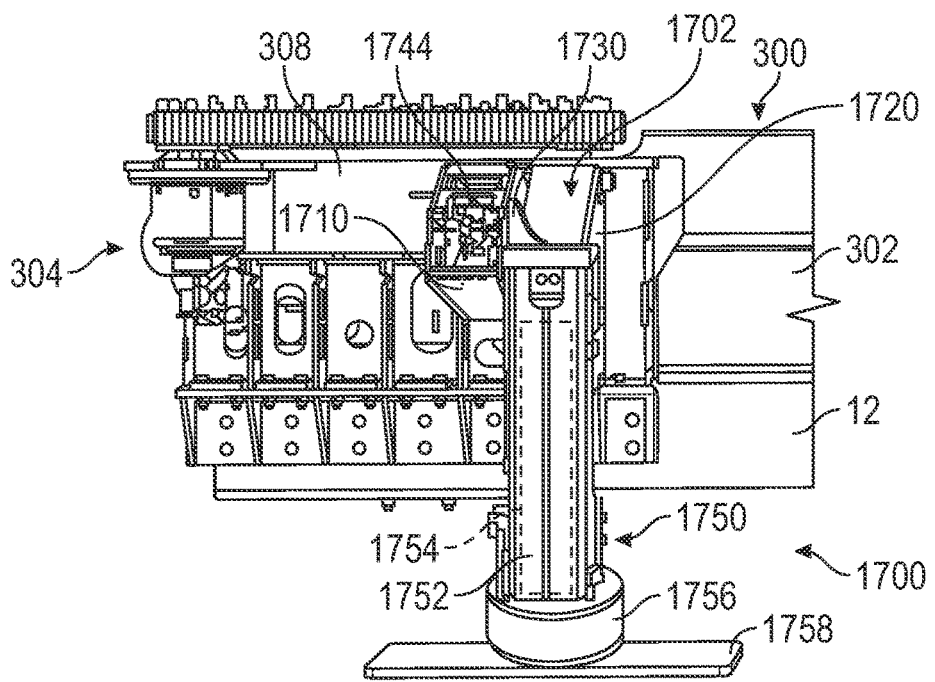
FIGS. 38-40 are various views of an outrigger assembly of the mid-mount fire apparatus of FIG. 1, according to an exemplary embodiment.
Figure 39:
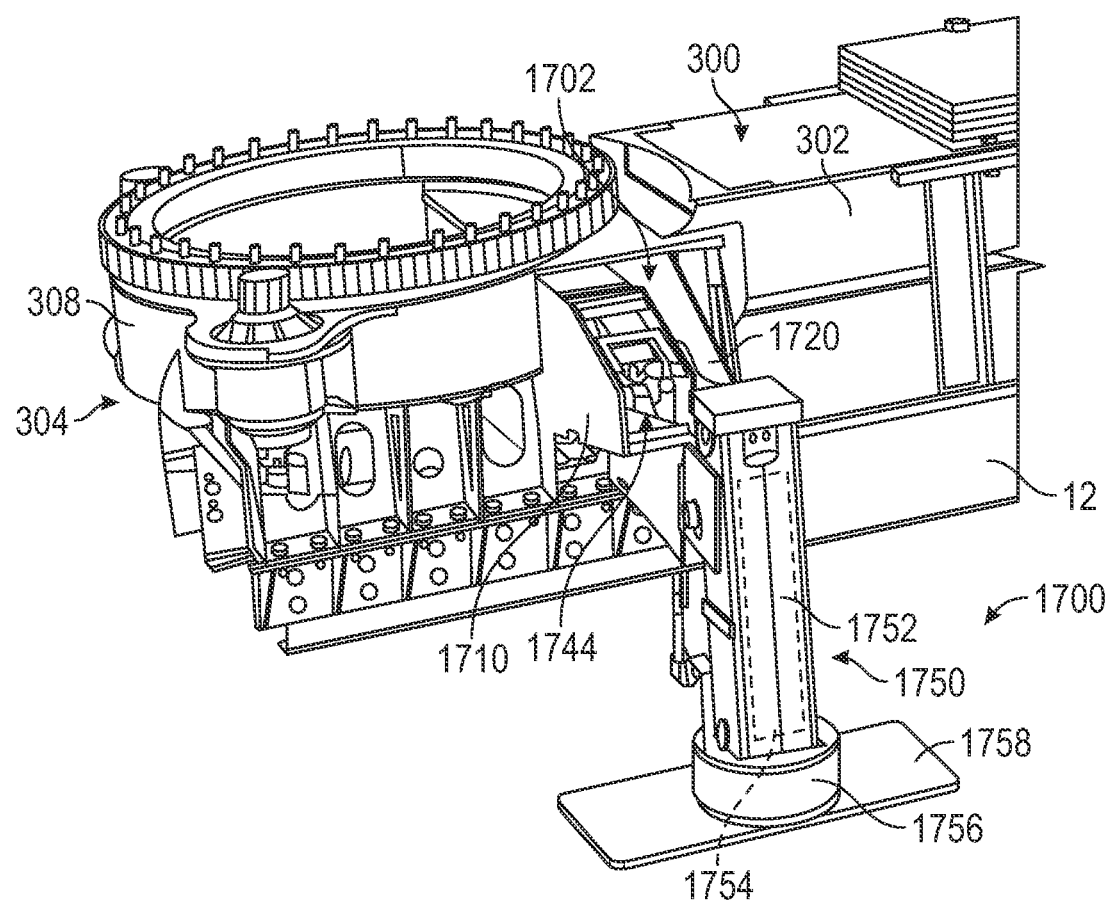

As shown in FIGS. 7 and 38-42, the outrigger assembly of the outriggers 1700 includes a housing, shown as outrigger housing 1702; a pair of first actuator assemblies, shown as lateral actuator assemblies 1740, having components thereof slidably coupled within and selectively laterally extendable from the outrigger housing 1702 and the body 110; and a pair of second actuator assemblies, shown as vertical actuator assemblies 1750, coupled to distal ends of lateral actuator assemblies 1740. As shown in FIGS. 38 and 39, the outrigger housing 1702 is coupled the frame 12, rearward of the vertical pivot axis 40 defined by the pedestal 308 (e.g., not forward of the turntable 510, etc.). As shown in FIG. 39, at least a portion of the outrigger housing 1702 (e.g., a front tube thereof, etc.) extends at least partially through the pedestal 308 (e.g., a rear portion thereof, etc.).

Figure 40:
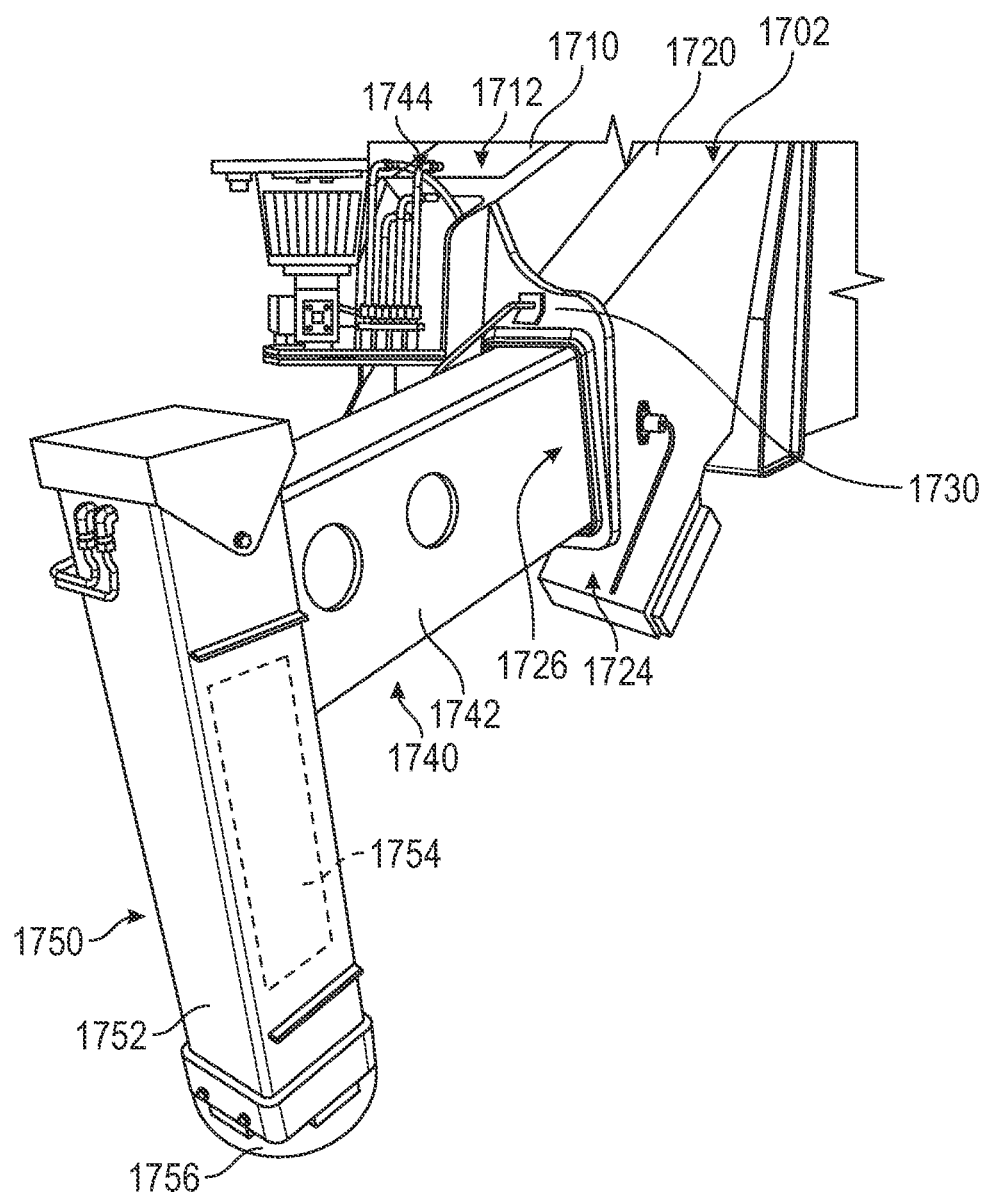
Figure 41:
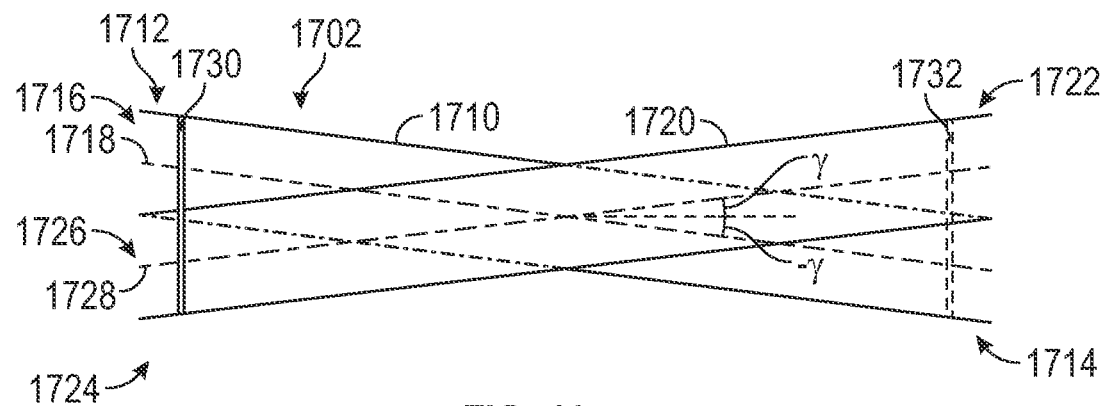
FIG. 41 is a detailed schematic rear view of an outrigger housing of the outrigger assembly of FIGS. 38-40, according to an exemplary embodiment.

As shown in FIGS. 38-42, the outrigger housing 1702 includes a first tube, shown as first track 1710, and a second tube, shown as second track 1720. According to the exemplary embodiment shown in FIGS. 38-42, the first track 1710 is positioned longitudinally forward of the second track 1720. In other embodiments, the first track 1710 is positioned longitudinally rearward of the second track 1720. As shown in FIG. 41, the first track 1710 has a first end, shown as left end 1712, and an opposing second end, shown as right end 1714. The first track 1710 defines a first internal cavity, shown as first internal slot 1716, and a first lateral axis, shown as first lateral extension axis 1718. The second track 1720 has a first end, shown as right end 1722, and an opposing second end, shown as left end 1724. The second track 1720 defines a second internal cavity, shown as second internal slot 1726, and a second lateral axis, shown as second lateral extension axis 1728.

Figure 42:
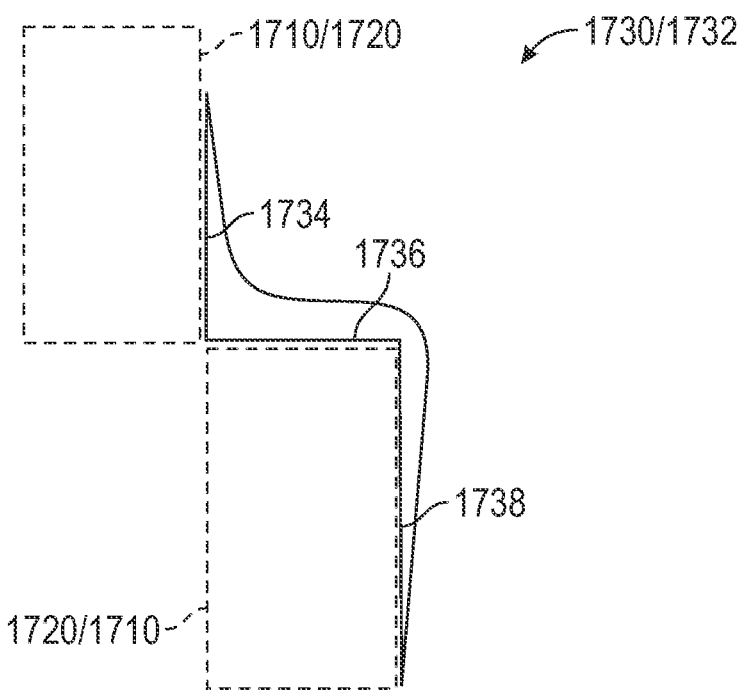
FIG. 42 is a detailed view of a collar for the outrigger housing of the outrigger assembly of FIG. 41, according to an exemplary embodiment.
Figure 43:
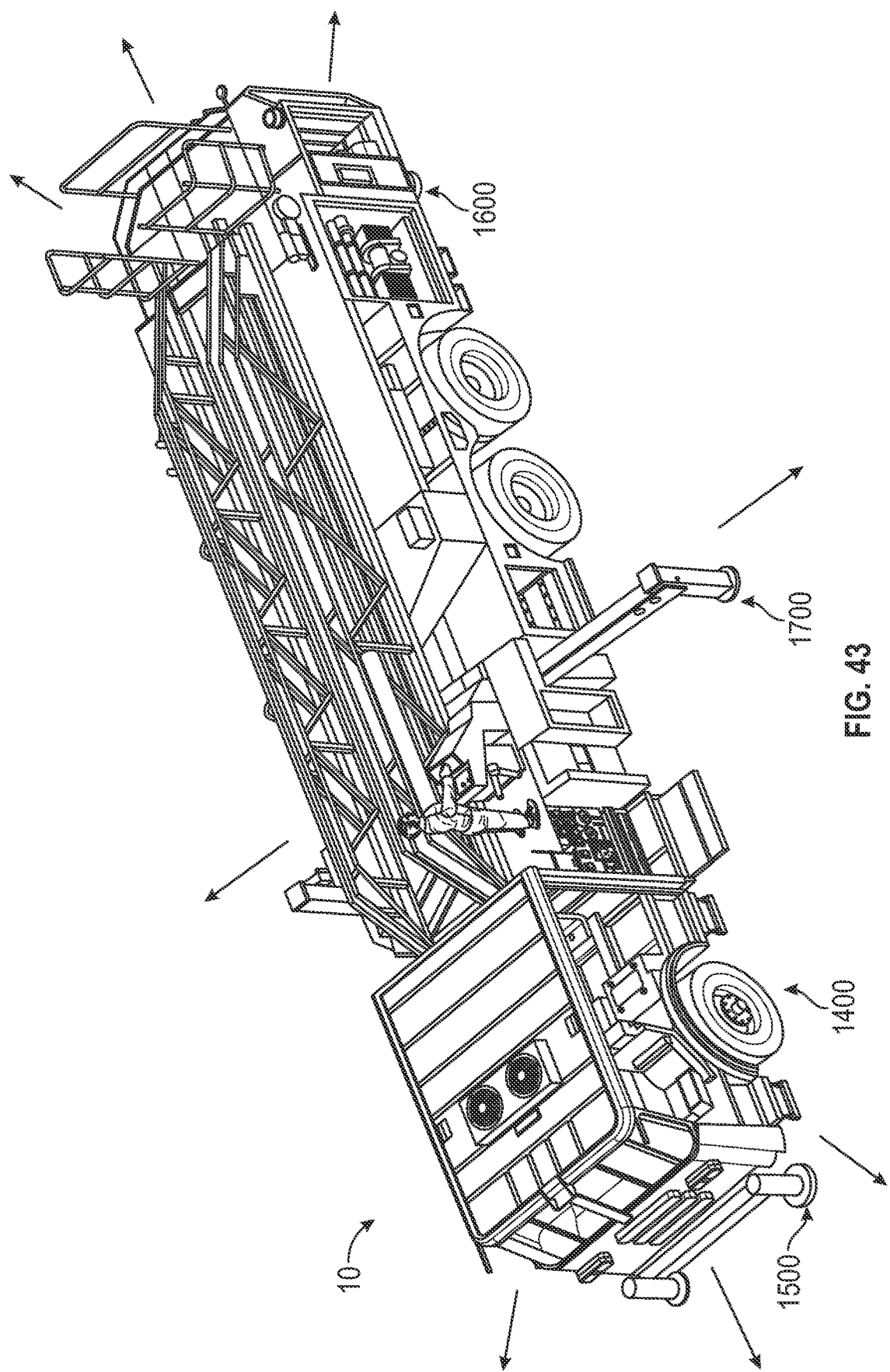
FIG. 43 is a perspective view of the mid-mount fire apparatus of FIG. 1 showing that the mid-mount fire apparatus is selectively leanable in various directions, according to an exemplary embodiment.

According to an exemplary embodiment, the first track 1710 and the second track 1720 extend laterally across the body 110 of the fire apparatus 10. As shown in FIGS. 40-42, the left end 1712 of the first track 1710 is elevated relative the right end 1714 of the first track 1710 such that the first lateral extension axis 1718 of the first track 1710 is oriented with a negative slope (e.g., when viewed from the rear, etc.) having the angle γ (e.g., five to fifteen degrees below a horizontal, eight to twelve degree below a horizontal, etc.). The right end 1722 of the second track 1720 is elevated relative the left end 1724 of the second track 1720 such that the second lateral extension axis 1728 of the second track 1720 is oriented with a positive slope (e.g., when viewed from the rear, etc.) having the angle γ.

As shown in FIGS. 40-42, the outrigger housing 1702 includes a first connector, shown as first collar 1730, and a second connector, shown as second collar 1732. The first collar 1730 is positioned to secure the left end 1724 of the second track 1720 to the left end 1712 of the first track 1710 that is elevated relative to the second track 1720 (i.e., because of the opposite slopes thereof). The second collar 1732 is positioned to secure the right end 1714 of the first track 1710 to the right end 1722 of the second track 1720 that is elevated relative to the first track 1710 (i.e., because of the opposite slopes thereof). As shown in FIG. 42, the first collar 1730 and the second collar 1732 have a z-shaped structure with a first vertical leg, shown as upper leg 1734; a horizontal leg, shown as connector 1736, extending horizontally from a lower end of the upper leg 1734; and a second vertical leg, shown as lower leg 1738, extending vertically downward from an end of the connector 1736 opposite the upper leg 1734. The upper leg 1734 of the first collar 1730 is configured to be secured (e.g., fastened, welded, etc.) to a sidewall of the first track 1710, the connector 1736 of the first collar 1730 is configured to be secured to a top surface of the second track 1720, and the lower leg 1738 of the first collar 1730 is configured to be secured to a sidewall of the second track 1720. The upper leg 1734 of the second collar 1732 is configured to be secured to a sidewall of the second track 1720, the connector 1736 of the second collar 1732 is configured to be secured to a top surface of the first track 1710, and the lower leg 1738 of the second collar 1732 is configured to be secured to a sidewall of the first track 1710.

As shown in FIGS. 7 and 38-40, each of the lateral actuator assemblies 1740 includes an arm, shown as telescoping arm 1742, and an actuator, shown as lateral extension actuator 1744. One of the telescoping arms 1742 is slidably received within the first internal slot 1716 of the first track 1710 and the other of the telescoping arms 1742 is slidably received within the second internal slot 1726 of the second track 1720. The lateral extension actuators 1744 are positioned to facilitate selectively extending the telescoping arms 1742 from the first track 1710 and the second track 1720 along the first lateral extension axis 1718 and the second lateral extension axis 1728, respectively, at the angle γ. According to an exemplary embodiment, the lateral extension actuators 1744 are or include hydraulic actuators. In other embodiments, the lateral extension actuators 1744 are or include pneumatic actuators, electric actuators, and/or mechanically-driven actuators. According to an exemplary embodiment, the angle γ at which the telescoping arms 1742 extend from the first track 1710 and the second track 1720 facilitates pivoting the aerial ladder assembly 700 continuously to a side of the fire apparatus 10 at the maximum depression angle θ without requiring the aerial ladder assembly 700 to be lifted over the telescoping arms 1742 as the aerial ladder assembly 700 passes thereover.

As shown in FIGS. 7 and 38-40, each of the vertical actuator assemblies 1750 includes a housing, shown as vertical actuator receiver 1752, coupled to a distal end of one of the telescoping arms 1742 and defines an internal cavity that receives an actuator, shown as vertical extension actuator 1754. According to an exemplary embodiment, the vertical extension actuators 1754 are or include hydraulic actuators. In other embodiments, the vertical extension actuators 1754 are or include pneumatic actuators, electric actuators, and/or mechanically-driven actuators. As shown in FIGS. 38-40, each of the vertical actuator assemblies 1750 includes a foot, shown as outrigger foot 1756, coupled to an end of each of the vertical extension actuators 1754. According to an exemplary embodiment, the vertical extension actuators 1754 are selectively extendable from the vertical actuator receivers 1752 such that the outrigger feet 1756 and/or ground pads coupled thereto engage a ground surface.

According to an exemplary embodiment, each of the front actuator assemblies 1530 (i.e., the front extension actuators thereof), each of the rear extension actuators 1634, each of the lateral extension actuators 1744, and/or each of the vertical extension actuators 1754 are independently controllable (e.g., by the controller 2010, etc.) to level the fire apparatus 10 (e.g., during use of the aerial ladder assembly 700, etc.). The front actuator assemblies 1530, the rear extension actuators 1634, the lateral extension actuators 1744, and/or the vertical extension actuators 1754 may be actively controllable (e.g., by the controller 2010, etc.) as the aerial ladder assembly 700 is pivoted about the vertical pivot axis 40, as the aerial ladder assembly 700 is pivoted about the lateral pivot axis 42, and/or as the plurality of nesting ladder sections of the aerial ladder assembly 700 are extended or retracted to maintain stability of the fire apparatus 10. If a scenario were to arise where the aerial ladder assembly 700 is moved into a position that approaches a limit of the aerial ladder assembly 700 and/or the fire apparatus 10, the controller 2010 may (i) limit or prevent further extension and/or pivoting of the aerial ladder assembly 700, (ii) retract the plurality of nesting ladder sections, and/or (iii) dynamically adjust the front downriggers 1500, the rear downriggers 1600, and/or the outriggers 1700 to increase the current capability of the aerial ladder assembly 700 and/or the fire apparatus 10.

Set-Up and Leaning Control

According to an exemplary embodiment, the stability assembly 1400 and the controller 2010 are configured to provide automatic set-up control and/or leaning control for the fire apparatus 10. The controller 2010 may provide the automatic set-up control and/or the leaning control based on various pre-stored parameters and/or characteristics regarding the fire apparatus 10 and/or various current operating parameters of the fire apparatus 10 (e.g., of the stability assembly 1400, of the aerial ladder assembly 700, etc.) received from the sensor system 1410.

According to an exemplary embodiment, the controller 2010 is configured to receive and store various parameters and/or characteristics of the fire apparatus 10. By way of example, the parameters and/or characteristics of the fire apparatus 10 may include information regarding the type of vehicle the fire apparatus 10 is (e.g., a tandem rear axle fire apparatus, a single rear axle fire apparatus, a mid-mount fire apparatus, a rear-mount fire apparatus, etc.), wheelbase, axle track, weight, longitudinal length, lateral width, center of gravity, center of mass, performance characteristics of the stability assembly 1400 (e.g., a maximum lateral extension distance, a maximum vertical extension distance, etc. of the outriggers 1700, the front downriggers 1500, the rear downriggers 1600; the number and/or placement of the outriggers 1700, the front downriggers 1500, the rear downriggers 1600; etc.), performance characteristics of the aerial ladder assembly 700 (e.g., rated tip load, maximum horizontal reach, maximum vertical reach, etc.), and/or still other parameters and/or characteristics of the fire apparatus 10. According to an exemplary embodiment, the controller 2010 is configured to use the pre-stored parameters and/or characteristics of the fire apparatus 10 to determine the operational capability of the fire apparatus 10.

According to an exemplary embodiment, the controller 2010 is additionally or alternatively configured to receive and store various operational thresholds and/or operational ranges for the fire apparatus 10. The operational thresholds and/or operational ranges for the fire apparatus 10 may define the operational capability of and the ability to stabilize the fire apparatus 10 while on uneven ground and/or while the aerial ladder assembly 700 is in use. According to an exemplary embodiment, the operational thresholds and/or operational ranges for a vehicle vary based on vehicle type, vehicle model, etc. (e.g., the operational thresholds and/or operational ranges are vehicle specific, etc.). According to the exemplary embodiment, the operational thresholds and/or the operational ranges may be defined based on the grade and/or the slope of the fire apparatus 10 prior to set-up and ladder use.

According to an exemplary embodiment, the sensor system 1410 includes various sensors that are configured (e.g., designed, positioned, etc.) to facilitate monitoring one or more current operating parameters of the fire apparatus 10 and the various systems thereof (e.g., the aerial ladder assembly 700, the stability assembly 1400, etc.). The one or more current operating parameters may include a current amount the fire apparatus 10 is leaning (e.g., intentionally in response to a leaning command, unintentionally based on an unlevel ground surface, etc.), a current load on the aerial ladder assembly 700 (e.g., at a distal end thereof, etc.), a current position of the aerial ladder assembly 700 (e.g., positioned to the front, back, side, about the vertical pivot axis 40, etc.), a current angle of the aerial ladder assembly 700 (e.g., at a depression angle, horizontal, at an elevation angle, about the lateral pivot axis 42, etc.), a current horizontal reach of the aerial ladder assembly 700, a current vertical reach of the aerial ladder assembly 700, a current position of the front downriggers 1500 (e.g., an amount of vertical extension relative to a nominal or fully-retracted position, etc.), a current position of the rear downriggers 1600 (e.g., an amount of vertical extension relative to a nominal or fully-retracted position, etc.), and/or a current position of the outriggers 1700 (e.g., an amount of lateral extension relative to a nominal or fully-retracted position, an amount of vertical extension relative to a nominal or fully-retracted position, etc.).

By way of example, the sensor system 1410 may include sensors (e.g., position sensors, potentiometers, etc.) positioned to facilitate monitoring the current position (e.g., amount of vertical extension, vertical retraction, lateral extension, lateral retraction, etc.) of the front downriggers 1500, the rear downriggers 1600, and/or the outriggers 1700. By way of another, the sensor system 1410 may include sensors (e.g., gyroscopes, accelerometers, level sensors, grade sensors, slope sensors, etc.) positioned to facilitate monitoring the slope and/or grade of the fire apparatus 10 to determine the orientation of the fire apparatus 10 relative to level and/or the current amount the fire apparatus 10 is leaning. By way of still another example, the sensor system 1410 may include sensors (e.g., position sensors, potentiometers, load sensors, strain gauges, angle sensors, rotary sensors, etc.) positioned to facilitate monitoring the current load on the aerial ladder assembly 700, the current position of the aerial ladder assembly 700, the current angle of the aerial ladder assembly 700, the current horizontal reach of the aerial ladder assembly 700, and/or the current vertical reach of the aerial ladder assembly 700.

According to an exemplary embodiment, the controller 2010 is configured to control the stability assembly 1400 to automatically level the fire apparatus 10 relative to an uneven ground surface in response to receiving an auto-level command or set-up command (e.g., from the operator through the user I/O device 2020, etc.). By way of example, the controller 2010 may be configured to receive stability data including grade data regarding the grade of the fire apparatus 10 (e.g., the amount the fire apparatus 10 is leaning laterally from right to left, etc.) and/or slope data regarding the slope of the fire apparatus 10 (e.g., the amount the fire apparatus 10 is leaning longitudinally from front to back, etc.). The controller 2010 may be configured to compare the stability data to the operational thresholds and operational ranges for the fire apparatus 10 to determine whether the stability assembly 1400 may be activated in such a way that the fire apparatus 10 is reconfigurable to facilitate (i) full, unrestricted operation or (ii) at least partially limited or partially restricted operation of the fire apparatus 10. Such a determination may take into account the pre-stored parameters and/or characteristics of the fire apparatus 10. The controller 2010 may thereby be configured to make the determination regarding the operational capability of the fire apparatus 10 based on (i) the stability data, (ii) the operational thresholds and operational ranges for the fire apparatus 10, and/or (iii) the parameters and/or characteristics of the fire apparatus 10. The controller 2010 may make the determination using a look-up table, an algorithm, a model, and/or still another suitable method. Further information regarding the set-up determination capability of the controller 2010 may be found in U.S. patent application Ser. No. 15/880,241, filed Jan. 25, 2018, which is incorporated by reference herein in its entirety.

According to an exemplary embodiment, the controller 2010 is configured to implement the auto-leveling process in response to (i) receiving the auto-level command or set-up command and/or (ii) determining that set-up of the fire apparatus 10 in the current location is permissible for operation of the aerial ladder assembly 700 (e.g., the fire apparatus 10 is reconfigurable to facilitate full, unrestricted operation of the aerial ladder assembly 700; the fire apparatus 10 is reconfigurable to facilitate at least partially limited or partially restricted operation of the fire apparatus 10; etc.). The outriggers 1700 may first be manually or automatically activated to contact the ground surface before the auto-leveling process begins (e.g., the outrigger feet 1756 just touch the ground surface and don't lift the fire apparatus 10, etc.). In one embodiment, the controller 2010 is configured to laterally level the fire apparatus 10 first and then longitudinally level the fire apparatus 10. By way of example, the controller 2010 may be configured to activate the outriggers 1700 based on the grade data such that the fire apparatus 10 is leveled laterally (e.g., from left to right, etc.). The controller 2010 may then be configured to activate one of the front downriggers 1500 and the rear downriggers 1600 based on the slope data. For example, if the fire apparatus 10 is leaning forward, the controller 2010 may be configured to activate the front downriggers 1500 to level the fire apparatus 10 longitudinally (e.g., front to back, etc.). As another example, if the fire apparatus 10 is leaning backward, the controller 2010 may be configured to activate the rear downriggers 1600 to level the fire apparatus 10 longitudinally (e.g., front to back, etc.). Once the fire apparatus 10 is leveled longitudinally, the controller 2010 may be configured to activate the other of the front downriggers 1500 and the rear downriggers 1600 such that they engage the ground surface (e.g., the other of the front downriggers 1500 and the rear downriggers 1600 may not lift the respective end of the fire apparatus 10, but take any loading off of the wheel and tire assemblies 30, etc.). After the fire apparatus 10 has been leveled, the operator may manually lean or the controller 2010 may automatically lean the fire apparatus 10 to effectively improve an operating parameter or operating capability of the aerial ladder assembly 700 as needed (e.g., within the operational thresholds and operational ranges for the fire apparatus 10, etc.) relative to if the fire apparatus 10 were not leanable or remained level.

Figure 44:
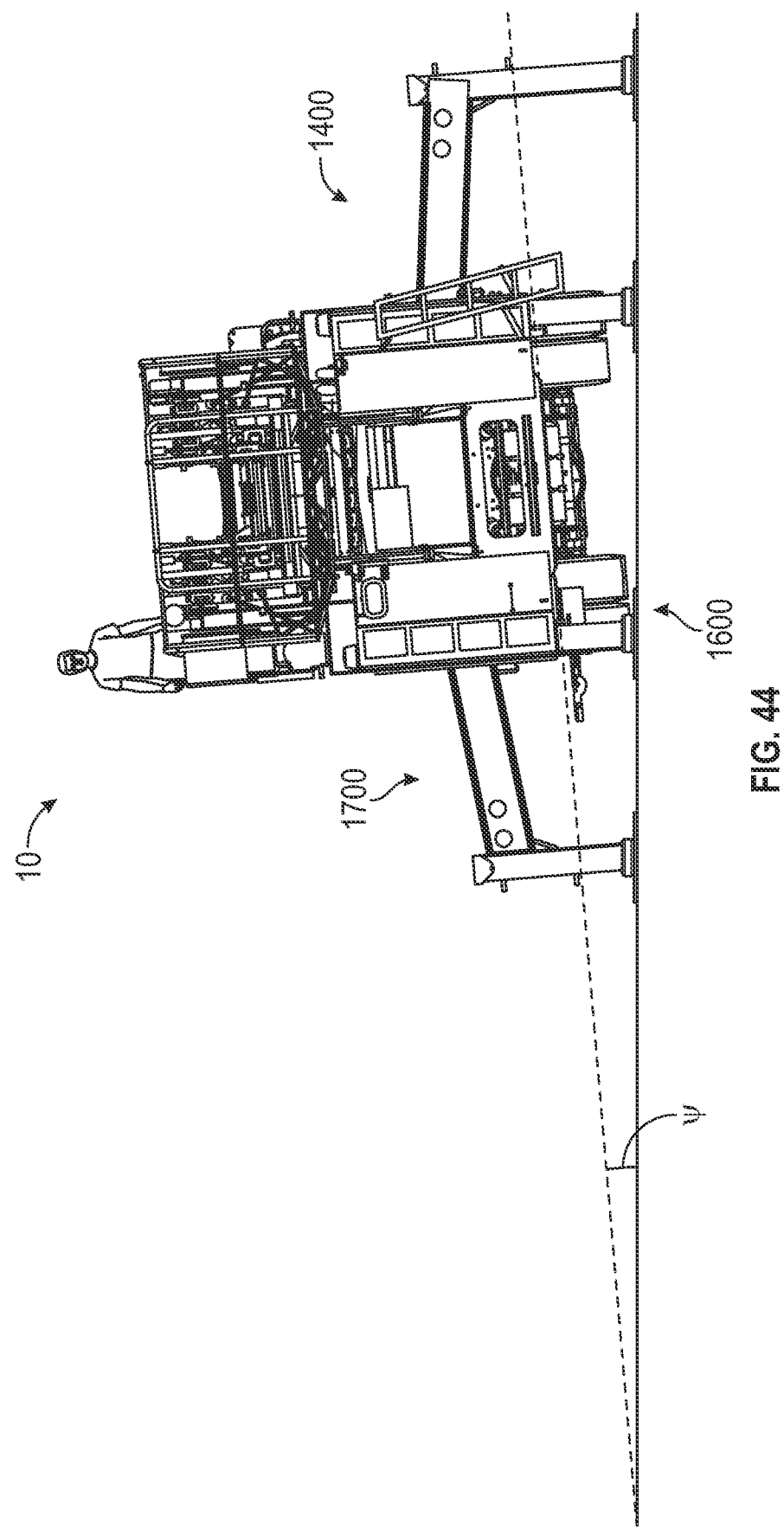
FIG. 44 is a rear view of the mid-mount fire apparatus of FIG. 1 being leaned to the left, according to an exemplary embodiment.
Figure 45:
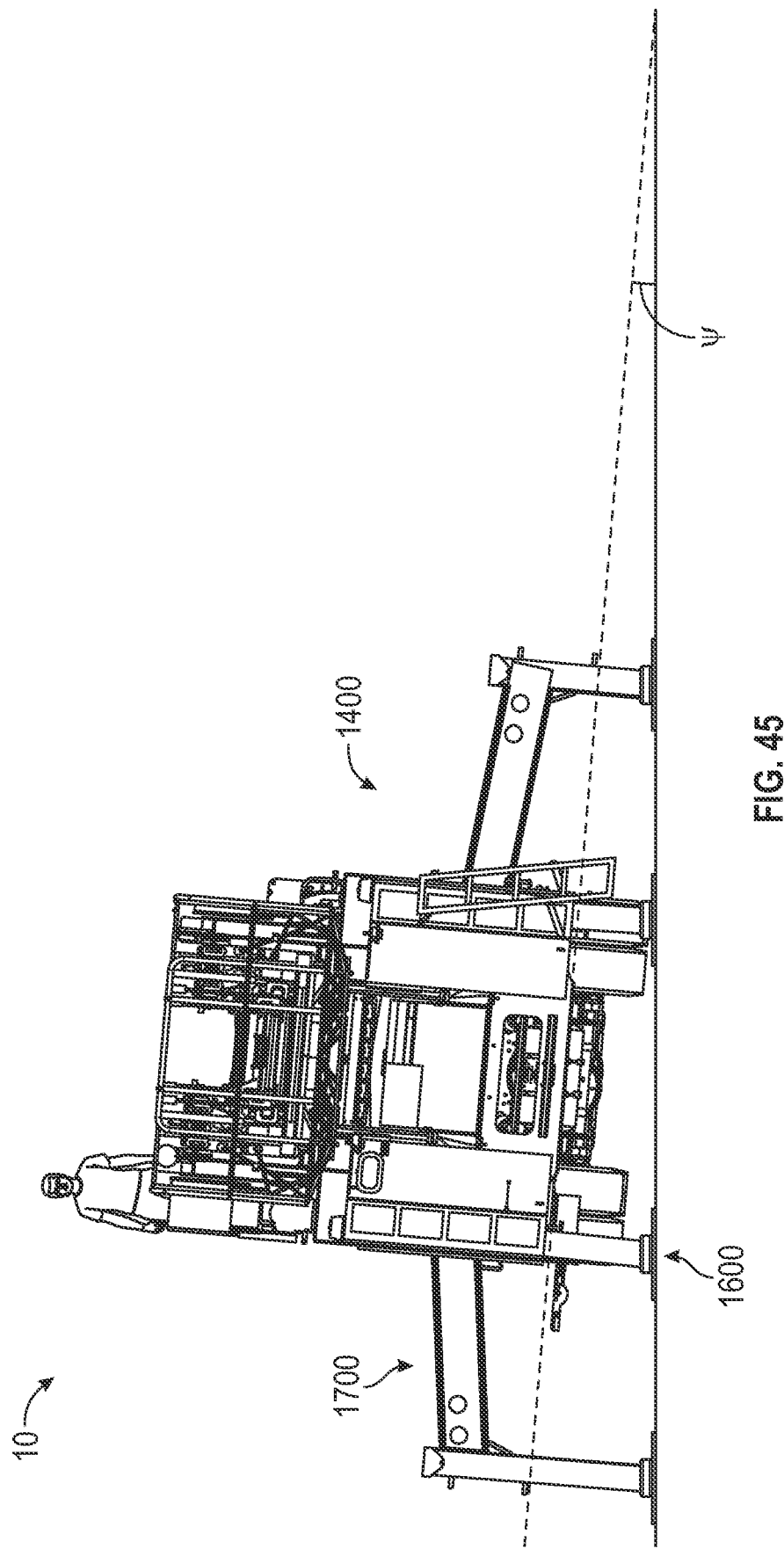
FIG. 45 is a rear view of the mid-mount fire apparatus of FIG. 1 being leaned to the right, according to an exemplary embodiment.
Figure 46:
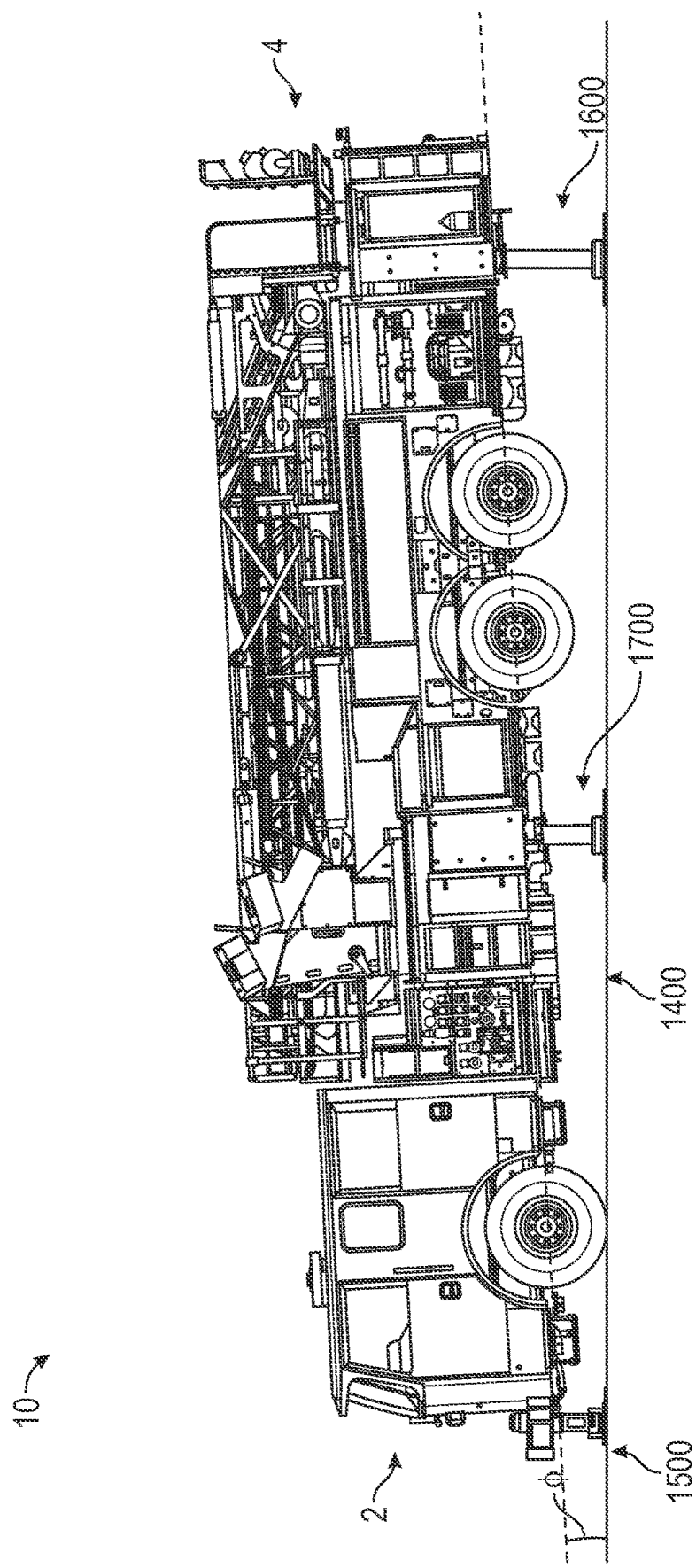
FIG. 46 is a side view of the mid-mount fire apparatus of FIG. 1 being leaned forward, according to an exemplary embodiment.
Figure 47:
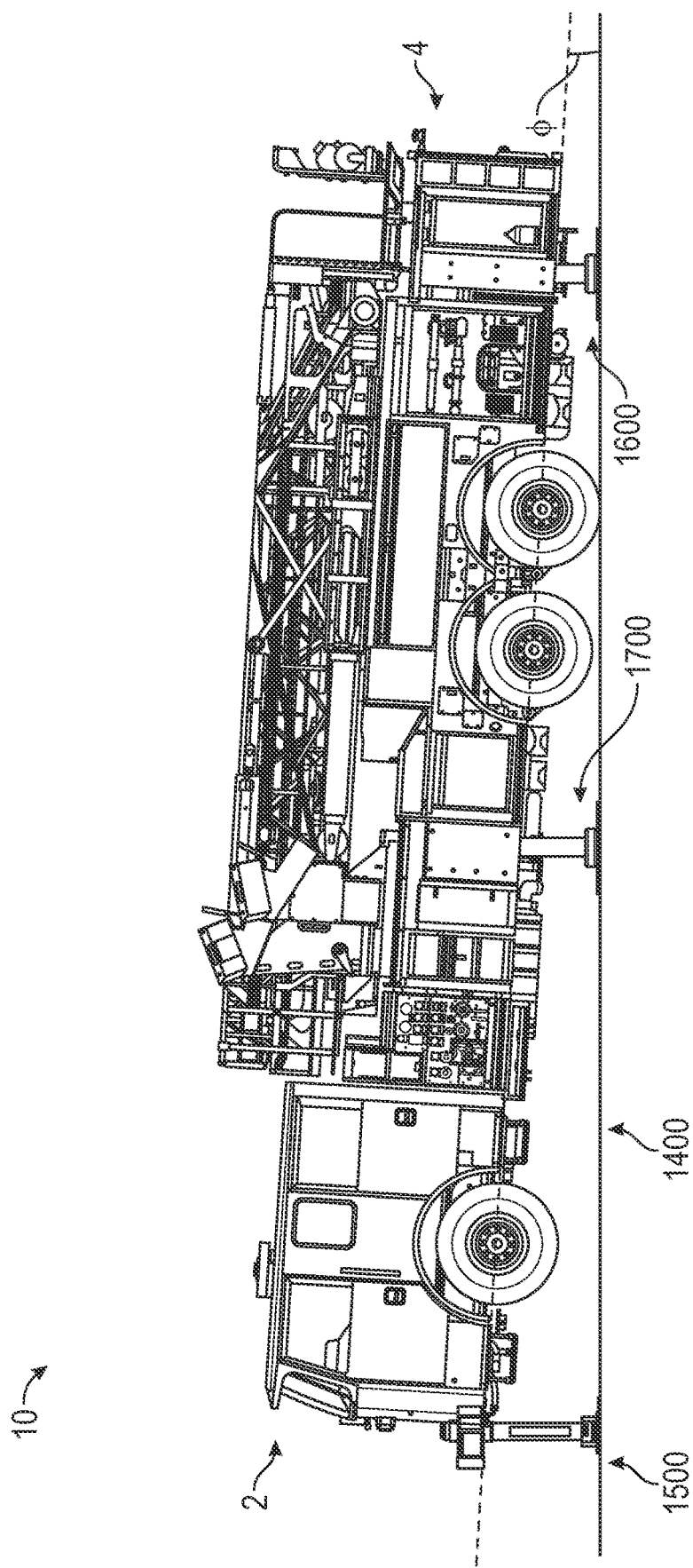
FIG. 47 is a side view of the mid-mount fire apparatus of FIG. 1 being leaned to backward, according to an exemplary embodiment.

As shown in FIGS. 43-47, the stability assembly 1400 (e.g., the front downriggers 1500, the rear downriggers 1600, the outriggers 1700, etc.) is configured to facilitate leaning the fire apparatus 10 relative to a surface (e.g., a horizontal surface, a ground surface, etc.) in various directions (e.g., front, back, left, right, diagonally at an angle, etc.; based on an operator input using a joystick of the user I/O device 2020, etc.) when entered into a lean or tilt mode. As shown in FIGS. 44 and 45, the stability assembly 1400 is configured to facilitate leaning the fire apparatus 10 laterally (e.g., left, right, about the longitudinal axis 14, etc.) up to an angle $\psi$ relative to a horizontal surface (e.g., while still maintaining full operational capability of the aerial ladder assembly 700, unrestricted operation, etc.). As shown in FIGS. 46 and 47, the stability assembly 1400 is configured to facilitate leaning the fire apparatus 10 longitudinally (e.g., forward such that the rear end 4 is elevated relative to the front end 2, backward such that the front end 2 is elevated relative to the rear end 4, etc.) up to an angle $\phi$ relative to a horizontal surface (e.g., while still maintaining full operational capability of the aerial ladder assembly 700, unrestricted operation, etc.). In one embodiment, the angle $\psi$ and/or the angle $\phi$ are at least two degrees. In another embodiment, the angle $\psi$ and/or the angle $\phi$ are at least three degrees. In still another embodiment, the angle $\psi$ and/or the angle $\phi$ are at least five degrees. In some embodiments, the angle $\psi$ and the angle $\phi$ are the same. In some embodiments, the angle $\psi$ and the angle $\phi$ are different. While only lateral and longitudinal leaning are shown in FIGS. 44-47, it should be understood that the fire apparatus 10 may be leaned in any direction (e.g., forward, backward, left, right, diagonally in any direction, etc.) and/or up to similar angles as the angle $\psi$ and the angle $\phi$ (e.g., while still maintaining full operational capability of the aerial ladder assembly 700, etc.).

According to an exemplary embodiment, the controller 2010 is configured to control extension and retraction of each of the front downriggers 1500, each of the rear downriggers 1600, and/or each of the outriggers 1700 of the stability assembly 1400 during the lean or tilt mode to lean the fire apparatus 10 and effectively improve an operating parameter or operating capability of the aerial ladder assembly 700 (e.g., relative to if the fire apparatus 10 were on a horizontal surface and not leaning, relative to if the fire apparatus 10 were completely level, etc.). By way of example, the controller 2010 may be configured to control the stability assembly 1400 to lean the fire apparatus 10 to (i) effectively increase the horizontal reach of the aerial ladder assembly 700, (ii) effectively increase the vertical reach of the aerial ladder assembly 700, (iii) effectively increase the depression angle at which the aerial ladder assembly 700 is orientable, (iv) effectively increase an elevation angle at which the aerial ladder assembly 700 is orientable, (v) effectively decrease a distance between a distal end of the aerial ladder assembly 700 and a reference surface, and/or (vi) effectively increase a tip load rating of the aerial ladder assembly 700.

By way of example, the stability assembly 1400 may be configured to facilitate leaning the fire apparatus 10 such that the distal end thereof or the basket platform 1310 of the work basket 1300 is positionable closer to a ground surface while the plurality of nesting ladder sections of the aerial ladder assembly 700 are over-retracted. Specifically, referring back to FIG. 25, when the aerial ladder assembly 700 is oriented at the maximum depression angle θ (e.g., fifteen degrees, etc.), the basket platform 1310 may be the height h above the ground surface (i.e., a horizontal ground surface). However, with the leaning functionality of the stability assembly 1400, the angle θ can be effectively increased by the angle ψ. By effectively increasing the maximum depression angle of the aerial ladder assembly 700, the height h of the basket platform 1310 may be effectively reduced (e.g., less than 20.3 inches, etc.).

The same may be true for the maximum elevation angle of the aerial ladder assembly 700. Specifically, the maximum elevation angle of the aerial ladder assembly 700 may be effectively increased by leaning the fire apparatus 10 and based on the current position of the aerial ladder assembly 700 about the vertical pivot axis 40. By way of example, if the aerial ladder assembly 700 is at its maximum elevation angle and pivoted to a side of the fire apparatus 10, and then the fire apparatus 10 is leaned by the angle ψ, the elevation angle of the aerial ladder assembly 700 will effectively increase in response to the leaning (e.g., greater than the non-leaning maximum elevation angle, the aerial ladder assembly 700 is oriented more vertically when leaned and at the maximum elevation angle thereof, etc.). Effectively increasing the maximum elevation angle of the aerial ladder assembly 700 may also thereby effectively increase the maximum vertical reach of the fire apparatus 10 (e.g., greater than the non-leaning maximum vertical reach, greater than 100 feet, the aerial ladder assembly 700 becomes more vertical than before the leaning, etc.).

By way of another example, the stability assembly 1400 may be configured to facilitate leaning the fire apparatus 10 such that the maximum horizontal reach of the aerial ladder assembly 700 is effectively increased (e.g., greater than the non-leaning maximum horizontal reach, greater than 88 feet, etc.). For example, if the aerial ladder assembly 700 is oriented forward of the front cabin 20 and the fire apparatus 10 is leaned by the angle φ forward, the aerial ladder assembly 700 will effectively reach further, as well as lower off the front end 2 of the fire apparatus 10. As another example, if the aerial ladder assembly 700 is oriented rearward of the body 110 and the fire apparatus 10 is leaned by the angle φ rearward, the aerial ladder assembly 700 will effectively reach further, as well as lower off the rear end 4 of the fire apparatus 10. As still another example, example, if the aerial ladder assembly 700 is oriented to a side of fire apparatus 10 and the fire apparatus 10 is leaned left or right by the angle ψ, the aerial ladder assembly 700 will effectively reach further, as well as lower off the side of the fire apparatus 10.

By way of another example, the stability assembly 1400 may be configured to facilitate leaning the fire apparatus 10 such that the tip load rating of the aerial ladder assembly 700 is effectively increased (e.g., greater than the non-leaning tip load rating, etc.). For example, if the aerial ladder assembly 700 is oriented rearward of the body 110 and the fire apparatus 10 is leaned forward by the angle φ, the capability of the aerial ladder assembly 700 to support weight at the distal end thereof is effectively increased because of the forward tilt of the fire apparatus 10 (e.g., a greater portion of the weight on the end of the aerial ladder assembly 700 is directed along the longitudinal axis of the aerial ladder assembly 700 than prior to the forward tilt, thereby reducing the component of the weight perpendicular to the aerial ladder assembly 700 that would otherwise contribute to tipping, etc.).

According to an exemplary embodiment, the controller 2010 is configured to automatically derate operational capability of the aerial ladder assembly 700 (e.g., vertical reach, horizontal reach, a first angle of the aerial ladder assembly 700 about the vertical pivot axis 40, a second angle of the aerial ladder assembly 700 about the lateral pivot axis 42, operation of the aerial ladder assembly 700 is at least partially limited or partially restricted, etc.) in response to the stability assembly 1400 leaning the fire apparatus 10 more than a threshold amount (e.g., more than five degrees in one direction; determined by the controller 2010 based on the current load conditions, current lean angle, operational thresholds/ranges, etc.). By way of example, the controller 2010 may limit or prevent the aerial ladder assembly 700 from extending beyond a certain reach, begin retracting the aerial ladder assembly 700, or lean the fire apparatus 10 back in the opposite direction in response to determining that the current loading conditions and the current lean angle indicate that certain operational thresholds are being met such that derated operation or releveling is needed to maintain stability.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire apparatus 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A fire apparatus comprising:
a chassis;
a front axle coupled to the chassis;
a rear axle coupled to the chassis;
a ladder assembly coupled to the chassis; and
a stability system including at least one of (i) a front downrigger coupled to the chassis, (ii) a rear downrigger coupled the chassis, or (iii) an outrigger coupled to the chassis;
wherein the stability system is controllable to facilitate leaning the fire apparatus at least two degrees relative to a ground surface while maintaining full operational capability of the ladder assembly.
2. The fire apparatus of claim 1, wherein the stability system facilitates leaning the fire apparatus at least two degrees relative to the ground surface in more than one direction while maintaining full operational capability of the ladder assembly.

3. The fire apparatus of claim 1, wherein the stability system facilitates leaning the fire apparatus at least three degrees relative to the ground surface while maintaining full operational capability of the ladder assembly.

4. The fire apparatus of claim 1, further comprising a control system configured to control the stability system to automatically level the fire apparatus relative to the ground surface in response to receiving an auto-level command.

5. The fire apparatus of claim 1, further comprising a control system configured to automatically derate operational capability of the ladder assembly in response to the stability system leaning the fire apparatus more than a threshold amount, wherein the operational capability includes at least one of a horizontal reach of the ladder assembly, a vertical reach of the ladder assembly, a first angle at which the ladder assembly is pivoted about a vertical pivot axis, or a second angle at which the ladder assembly is pivoted about a lateral pivot axis.

6. The fire apparatus of claim 1, further comprising a basket coupled to a distal end of the ladder assembly, the basket including a platform, wherein the platform is positionable less than or equal to 20.3 inches above the ground surface while at least one of (i) the ladder assembly is fully-retracted or (ii) the fire apparatus is leaned.

7. The fire apparatus of claim 1, wherein the stability system facilitates leaning the fire apparatus such that the ladder assembly is orientable at a depression angle or an elevation angle that is greater than the depression angle or the elevation angle prior to being leaned.

8. The fire apparatus of claim 7, wherein the stability system facilitates leaning the fire apparatus such that the depression angle of the ladder assembly is greater than 15 degrees.

9. The fire apparatus of claim 1, wherein the stability system facilitates leaning the fire apparatus such that the ladder assembly is extendable to a vertical reach that is greater than the vertical reach prior to being leaned.

10. The fire apparatus of claim 9, wherein the stability system facilitates leaning the fire apparatus such that the ladder assembly is extendable to the vertical reach of greater than 100 feet.

11. The fire apparatus of claim 1, wherein the stability system facilitates leaning the fire apparatus such that the ladder assembly is extendable to a horizontal reach greater than the horizontal reach prior to being leaned.

12. The fire apparatus of claim 11, wherein the stability system facilitates leaning the fire apparatus such that the ladder assembly is extendable to the horizontal reach of greater than 88 feet.

13. The fire apparatus of claim 1, wherein the stability system facilitates leaning the fire apparatus such that the ladder assembly can sustain a maximum tip load greater than the maximum tip load prior to being leaned.

14. The fire apparatus of claim 1, wherein the stability system includes the front downrigger, the rear downrigger, and the outrigger.

15. A vehicle comprising:
a chassis;
a ladder assembly coupled to the chassis;
a stability system coupled to the chassis, the stability system including extendable components that selectively engage a ground surface; and
a control system configured to:
control the stability system to level the vehicle; and
enable the stability system to lean the vehicle when an operational capability of the ladder assembly is at a limit thereof while the vehicle is level to effectively improve the operational capability relative to when the vehicle is level.

16. The vehicle of claim 15, wherein the operational capability of the vehicle is a reach of the ladder assembly, wherein the control system is configured to enable the stability system to lean the vehicle when a reach limit of the ladder assembly is reached while the vehicle is level to increase the reach of the ladder assembly, and wherein the reach is a vertical reach or a horizontal reach.

17. The vehicle of claim 15, wherein the operational capability of the vehicle is an angle of the ladder assembly, wherein the control system is configured to enable the stability system to lean the vehicle when an angle limit of the ladder assembly is reached while the vehicle is level to increase the angle of the ladder assembly, and wherein the angle is a depression angle or an elevation angle.

18. The vehicle of claim 15, wherein the operational capability of the vehicle is a tip load capacity of the ladder assembly, and wherein the control system is configured to enable the stability system to lean the vehicle when a tip load limit of the ladder assembly is reached while the vehicle is level to increase the tip load capacity of the ladder assembly.

19. The vehicle of claim 15, wherein the stability system facilitates leaning the vehicle at least two degrees relative to the ground surface.

20. A vehicle comprising:
a chassis;
a ladder coupled to the chassis; and
a stability system coupled to the chassis, the stability system including a plurality of front downriggers, a plurality of rear downriggers, and a plurality of outriggers;
wherein the stability system is controllable to facilitate leaning the fire apparatus at least two degrees relative to a ground surface to effectively improve an operational capability of the ladder.

\* \* \* \* \*